US008509092B2

(12) United States Patent
Shimada et al.

(10) Patent No.: US 8,509,092 B2
(45) Date of Patent: Aug. 13, 2013

(54) SYSTEM, APPARATUS, METHOD, AND PROGRAM FOR SIGNAL ANALYSIS CONTROL AND SIGNAL CONTROL

(75) Inventors: Osamu Shimada, Tokyo (JP); Toshiyuki Nomura, Tokyo (JP); Akihiko Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 329 days.

(21) Appl. No.: 12/933,066

(22) PCT Filed: Apr. 17, 2009

(86) PCT No.: PCT/JP2009/057735
§ 371 (c)(1), (2), (4) Date: Sep. 16, 2010

(87) PCT Pub. No.: WO2009/131066
PCT Pub. Date: Oct. 29, 2009

(65) Prior Publication Data

US 2011/0019761 A1 Jan. 27, 2011

(30) Foreign Application Priority Data

Apr. 21, 2008 (JP) ................................ 2008-110754

(51) Int. Cl.
*G06F 11/00* (2006.01)
*H04J 1/16* (2006.01)
*H04L 1/00* (2006.01)

(52) U.S. Cl.
USPC .......................................... 370/241; 370/535

(58) Field of Classification Search
USPC ................ 704/500, 501; 370/532–536, 464, 370/465, 241, 522, 527, 528, 529
See application file for complete search history.

(56) References Cited

U.S. PATENT DOCUMENTS 6,339,758 B1 1/2002 Kanazawa et al.
7,590,249 B2 * 9/2009 Jang et al. ........................ 381/61
2004/0049383 A1 * 3/2004 Kato et al. .................... 704/226
2005/0195981 A1 * 9/2005 Faller et al. ...................... 381/23
2005/0226426 A1 * 10/2005 Oomen et al. .................. 381/23
2007/0233470 A1 * 10/2007 Goto et al. ..................... 704/208
2008/0097750 A1 * 4/2008 Seefeldt et al. ............... 704/201

(Continued)

FOREIGN PATENT DOCUMENTS

JP 2000-047699 A 2/2000
JP 2002-152158 A 5/2002

(Continued)

OTHER PUBLICATIONS

Ryoichi Kawada, et al., "Status of Three-dimensional video communications research—idea and challenges of free-viewpoint video streaming-", Proceedings of the 2005 IEICE Engineering Sciences Society Conference, Sep. 7, 2005, pp. SS-11 to SS-12.

(Continued)

*Primary Examiner* — Chuong T Ho
(74) *Attorney, Agent, or Firm* — Sughrue Mion, PLLC

(57) ABSTRACT

Disclosed is a signal control method that is characterized by receiving a first signal, a second signal comprising multiple components, component information indicating the relationship between the components, and analysis control information comprising information indicating the relationship between the components and the second signal. The signal control method is further characterized by controlling the first signal or the second signal on the basis of the components and the analysis control information.

27 Claims, 34 Drawing Sheets

(56) References Cited

U.S. PATENT DOCUMENTS

| | | | | |
|---|---|---|---|---|
| 2008/0221907 | A1 * | 9/2008 | Pang et al. | 704/500 |
| 2009/0172060 | A1 * | 7/2009 | Taleb et al. | 708/322 |
| 2010/0283536 | A1 * | 11/2010 | Nomura et al. | 327/551 |
| 2011/0002225 | A1 * | 1/2011 | Nomura et al. | 370/241 |
| 2011/0019761 | A1 * | 1/2011 | Shimada et al. | 375/285 |

FOREIGN PATENT DOCUMENTS

| | | | |
|---|---|---|---|
| JP | 2002-204175 | A | 7/2002 |
| JP | 2006-222838 | A | 8/2006 |
| WO | 2008/004499 | A1 | 1/2008 |

OTHER PUBLICATIONS

Kazuhiro Yamato, "Post-Processing Noise Suppressor with Adaptive Gain-Flooring for Cell-Phone Handsets and IC Recorders", IEEE International Conference on Consumer Electronics, 6.1-4, Jan. 2007, 2 pages.

N. S. Jayant, "Digital Coding of Waveforms Principles and Applications to Speech and Video", Prentice-Hall, 1975, 28 pages.

Alan V. Oppenheim, "Digital Signal Processing", Prentice-Hall, 1975, pp. 238-251.

P. P. Vaidyanathan, "Multirate Systems and Filter Banks", Prentice-Hall, 1993, pp. 43.

Manfred R. Schroeder, et al. "Code-Excited Linear Prediction (CELP): High-Quality Speech at Very Low Bit Rates", IEEE International Conference on Acoustic, Speech, and Signal Processing, 25.1.1, Mar. 1985, pp. 937-940.

Yariv Ephraim, "Speech Enhancement Using a Minimum Mean-Square Error Short-Time Spectral Amplitude Estimator", IEEE Transactions on Acoustics, Speech, and Signal Processing, Dec. 1984, pp. 1109-1121, vol. ASSP-32, No. 6.

Y. Ephraim, et al., "Speech Enhancement Using a Minimum Mean-Square Error Log-Spectral Amplitude Estimator", IEEE Transactions on Acoustics, Speech, and Signal Processing, Apr. 1985, vol. ASSP-33, No. 2.

Thomas Lotter, "Speech Enhancement by MAP Spectral Amplitude Estimation Using a SuperGaussain Speech Model", IEEE Transactions on Acoustic, Speech, and Signal Processing, pp. 1110-1126, vol. 33, No. 2.

"Information technology-MPEG audio technologies-", International Standard, ISO/IEC 23003-1:2007 Part 1 MPEG Surround, pp. 1-19.

* cited by examiner

SYSTEM, APPARATUS, METHOD, AND PROGRAM FOR SIGNAL ANALYSIS CONTROL AND SIGNAL CONTROL

APPLICABLE FIELD IN THE INDUSTRY

The present invention relates to a system, an apparatus, a method, and a program of a signal analysis control and a signal control.

BACKGROUND ART

As a system for suppressing background noise of an input signal having a plurality of sound sources each of which is configured of desired sound and background noise, a noise suppression system (hereinafter, referred to as a noise suppressor) is known. The noise suppressor is a system for suppressing noise superposed upon a desired sound signal. The noise suppressor, as a rule, estimates a power spectrum of a noise component by employing an input signal converted in a frequency region, and subtracts the estimated power spectrum of the noise component from the input signal. With this, the noise coexisting in the desired sound signal is suppressed. In addition, these noise suppressors are applied also for the suppression of non-constant noise by successively estimating the power spectrum of the noise component. There exists, for example, the technique described in Patent document 1 as a prior art related to these noise suppressors (hereinafter, referred to as a first related prior art).

Normally, the noise suppressor of the first related prior art, which is utilized for communication, fulfils a function as a pretreatment of an encoder. An output of the noise suppressor is encoded, and is transmitted to a communication path. In a receiving unit, the signal is decoded, and an audible signal is generated. The noise suppressor of the first related prior art is a one-input noise suppression system, in which, as a rule, residual noise that stays as a result of being not suppressed, and distortion of emphasized sound that is outputted are in a relation of trade-off. Reducing the residual noise leads to an increase in the distortion, and reducing the distortion leads to an increase in the residual noise. The best status of a balance between the residual noise and the distortion differs dependent upon individual users. However, with a configuration in which the noise suppressor exists in the upstream side of the encoder, namely, exists in a transmission unit, the user cannot adjust a balance between the residual noise and the distortion to its own taste.

As a noise suppressor assuming a configuration capable of solving this problem, a receiving side noise suppressor shown in FIG. 40 disclosed in Non-patent document 1 is known (hereinafter, referred to as a second related prior art). In the configuration of the second related prior art, a noise suppression unit 9501 is included not in the transmission unit, but in the receiving unit. The noise suppression unit 9501 performs a process of suppressing the noise of the signal inputted from a decoder. This enables the user to adjust a balance between the residual noise and the distortion to its own taste.

Patent document 1: JP-P2002-204175A

Non-patent document 1: IEEE INTERNATIONAL CONFERENCE ON CONSUMER ELECTRONICS, 6.1-4, January 2007

DISCLOSURE OF THE INVENTION

Problems to be Solved by the Invention

The foregoing first related prior art causes a problem that the user cannot adjust a balance between the residual noise and the distortion to its own taste. The foregoing second related prior art exists as a means for solving this problem.

However, the second related prior art causes a problem that an arithmetic quantity of the receiving unit is augmented because the receiving unit performs a process of suppressing the noise, which the transmission unit performs in the first related prior art. In addition, the second related prior art causes a problem that a noise suppression function cannot be incorporated when an important function other than the function of the noise suppressor exists in the receiving unit, or a problem that the other functions cannot be incorporated due to the incorporation of the noise suppression function. The reason is that a limit is put to a total of the arithmetic quantity of the receiving unit. Further, the arithmetic quantity of the receiving unit (or a reproduction unit) is much, which incurs a decline in a sound quality and in convenience due to a limit put to a receiver function. In addition, there is a problem that the configurations as well of the first related prior art and the second related prior art cannot be applied for general separation of the signal because they aim for separating the sound from the background noise.

Thereupon, the present invention has been accomplished in consideration of the above-mentioned problems, and an object thereof is to provide a signal analysis control system capable of configuring the receiving unit with a small arithmetic quantity, and of independently controlling all sorts of the input signals for each of elements constituting the input signal.

Means for Solving the Problems

The present invention for solving the aforementioned problem is a signal control method, comprising: receiving a first signal, a second signal including a plurality of component elements, component element information indicative of a relation between said component elements, and analysis control information including information indicative of a relation between said component element and said second signal; and controlling said first signal or said second signal based upon said component element information and said analysis control information.

The present invention for solving the aforementioned problem is a signal analysis method, comprising: receiving a first signal, a second signal including a plurality of component elements, and analysis control information including information indicative of a relation between said second signal; and generating component element information indicative of a relation between said component elements based upon said first signal, said second signal, and said analysis control information.

The present invention for solving the aforementioned problem is a signal analysis control method, comprising: receiving a first signal, a second signal including a plurality of component elements, and analysis control information including information indicative of a relation between said second signal; generating component element information indicative of a relation between said component elements based upon said first signal, said second signal, and said analysis control information; and controlling said first signal or said second signal based upon said component element information and said analysis control information.

The present invention for solving the aforementioned problem is a signal control apparatus, comprising a signal control unit for: receiving a first signal, a second signal including a plurality of component elements, component element information indicative of a relation between said component elements, and analysis control information including informationtion indicative of a relation between said component element and said second signal; and controlling said first signal or said second signal based upon said component element information and said analysis control information.

The present invention for solving the aforementioned problem is a signal analysis apparatus, comprising a component element information generation unit for: receiving a first signal, a second signal including a plurality of component elements, and analysis control information including information indicative of a relation between said second signal; and generating component element information indicative of a relation between said component elements based upon said first signal, said second signal, and said analysis control information.

The present invention for solving the aforementioned problem is a signal analysis control system, comprising: a component element information generation unit for: receiving a first signal, a second signal including a plurality of component elements, and analysis control information including information indicative of a relation between said second signal; and generating component element information indicative of a relation between said component elements based upon said first signal, said second signal, and said analysis control information; and a signal control unit for controlling said first signal or said second signal based upon said component element information and said analysis control information.

The present invention for solving the aforementioned problem is a signal control program for causing a computer to execute: a process of receiving a first signal, a second signal including a plurality of component elements, component element information indicative of a relation between said component elements, and analysis control information including information indicative of a relation between said component element and said second signal; and a signal control process of controlling said first signal or said second signal based upon said component element information and said analysis control information.

The present invention for solving the aforementioned problem is a signal analysis program for causing a computer to execute: a process of receiving a first signal, a second signal including a plurality of component elements, and analysis control information including information indicative of a relation between said second signal; and a component element information generation process of generating component element information indicative of a relation between said component elements based upon said first signal, said second signal, and said analysis control information.

The present invention for solving the aforementioned problem is a signal analysis control program for causing a computer to execute: a process of receiving a first signal, a second signal including a plurality of component elements, and analysis control information including information indicative of a relation between said second signal; a component element information generation process of generating component element information indicative of a relation between said component elements based upon said first signal, said second signal, and said analysis control information; and a signal control process of controlling said first signal or said second signal based upon said component element information and said analysis control information.

An Advantageous Effect of the Invention

The present invention enables the receiving unit to reduce the arithmetic quantity relating to the signal analysis because the transmission unit analyzes the signal.

DESCRIPTION OF NUMERALS

Figure 1:
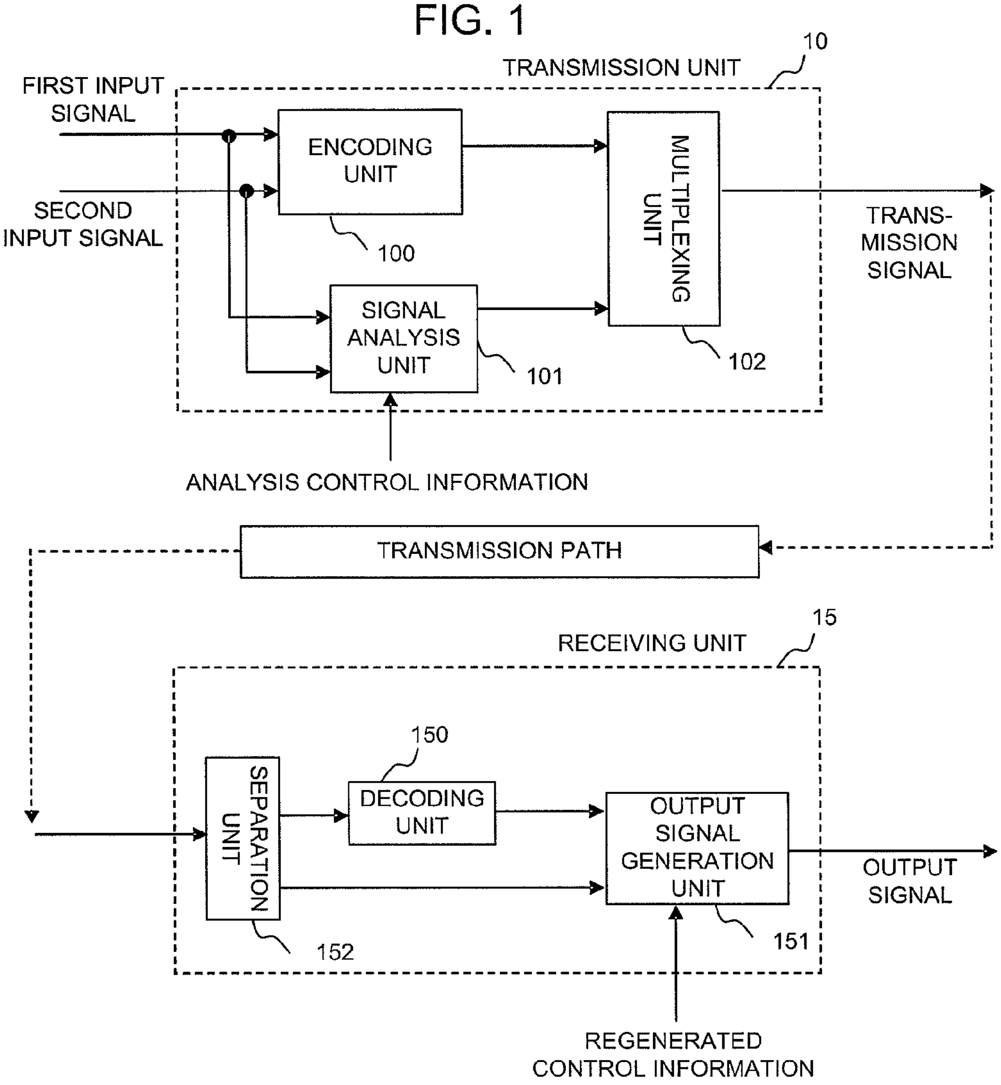
FIG. 1 is a block diagram illustrating a first embodiment to an eighth embodiment of the present invention.

10 transmission unit
15 receiving unit
100 encoding unit
101 signal analysis unit
102 multiplexing unit
110, 111, 114, 120, 121, and 171 conversion units
112 and 115 quantization units
113 and 116 down-mixing units
122 analysis information calculation unit
150 decoding unit
151 output signal generation unit
152 separation unit
160 inverse quantization unit
161 and 173 inverse conversion units
172 signal control unit
200 inter-signal information calculation unit
201, 202, 206, 207, 209, 210, 212, and 213 suppression coefficient calculation units
203 and 307 gain inverse-conversion units
204, 208, 211, 214, 220, 221, 222, and 223 analysis information encoding units
205 switch
300, 312, 316, 317, 320, 321, 322, and 323 analysis information decoding units
301 and 304 rendering control information separation units
302 and 303 rendering units
305 and 313 gain correction units
306 gain conversion unit
308, 309, and 314 sub-gain correction units
310 and 315 sub-gain lower-limit value modification units
311 sub-gain lower-limit value estimation unit
1300 and 1301 computers

BEST MODE FOR CARRYING OUT THE INVENTION

Embodiments of the signal analysis control system of the present invention will be explained in details by making a reference to the accompanied drawings.

First Embodiment

A first embodiment of the signal analysis control system of the present invention will be explained in details by making a reference to FIG. 1. The signal analysis control system of the present invention assumes a configuration in which a transmission unit 10 and a receiving unit 15 are connected via a transmission path. The transmission unit 10 receives a plurality of input signals each of which is configured of a plurality of the sound sources, and outputs a transmission signal. The transmission signal is inputted into the receiving unit 15 via the transmission path. The receiving unit 15 receives the transmission signal, and outputs a plurality of output signals or one output signal. Further, the transmission unit, the transmission path, and the receiving unit could be a recording unit, a storage medium, and a reproduction unit, respectively. Additionally, in FIG. 1, for simplicity, explanation is made on the assumption that the number of the input signals is two, i.e. two signals of a first input signal and a second input signal.

The transmission unit 10 is configured of an encoding unit 100, a signal analysis unit 101, and a multiplexing unit 102. A plurality of the input signals, i.e. the first input signal and the second input signal are inputted into the encoding unit 100 and the signal analysis unit 101. At least one input signal of respective input signals includes a plurality of the component elements. The signal analysis unit 101 receives the first input signal, the second input signal, and the analysis control information. And, the signal analysis unit 101 analyzes each input signal based upon the analysis control information, and calculates component element information associated with a component element constituting the input signal. The signal analysis unit 101 outputs encoded analysis information that is obtained by encoding the component element information and the analysis control information. The analysis control information includes information indicative of a relation between each component element and the input signal. The information indicative of a relation between each component element and the input signal may include dependency information indicating which input signal is employed for generating the component element, to begin with. In addition, the analysis control information includes information associated with classification of each component element. For example, the analysis control information may include classification of the objective sound and the background sound, classification of sound and music, by-instrument classification being included in the music, and the like as information associated with classification. The component element information may include, for example, an energy ratio and a phase difference between respective component elements being included in the input signal, coherence thereof, and the like.

The signal analysis unit 101 outputs the encoded analysis information to the multiplexing unit 102. The encoding unit 100 encodes a plurality of the input signals, respectively. The encoding unit 100 outputs the encoded signal information corresponding to each input signal to the multiplexing unit 102. The multiplexing unit 102 multiplexes the encoded signal information being inputted from the encoding unit 100, and the encoded analysis information being inputted from the signal analysis unit 101. The multiplexing unit 102 outputs the multiplexed signal to the transmission path as a transmission signal.

The receiving unit 15 is configured of a decoding unit 150, an output signal generation unit 151, and a separation unit 152. At first, the transmission signal is inputted into the separation unit 152. The separation unit 152 separates the transmission signal into the encoded signal information and the encoded analysis information. Continuously, the separation unit 152 outputs the encoded signal information to the decoding unit 150, and outputs the encoded analysis information to the output signal generation unit 151, respectively. The decoding unit 150 decodes the encoded signal information, and generates the decoded signal. And, the decoding unit 150 outputs the decoded signal to the output signal control unit 151. The output signal generation unit 151 manipulates the decoded signal received from the decoding unit 150 for each component element based upon the encoded analysis information received from the separation unit 152 and the regenerated control information. The output signal generation unit 151 outputs the manipulated signal as an output signal. The output signal generation unit 151 may manipulate the decoded signal with the component element group, which is configured of a plurality of the component elements, defined as a unit instead of the component element. Further, the component element being included in the input signal could be a sound source. At this time, the output signal control unit 151 manipulates the decoded signal for each sound source that corresponds to the component element. The regenerated control information may include signal control information or rendering information.

The signal control information is information for controlling each component element of the input signal frequency component by frequency component. That is, the signal control information is information for controlling a relation between the component elements. For example, the signal control information is information for changing an energy level of the objective sound and the background sound in the case that the component element is the objective sound and the background sound. A configuration may be made so that the signal control information is inputted from the outside by a user. For example, as signal control information being inputted from the outside, there exists personal information such as a taste of the user pre-registered into the receiving unit, an operational status of the receiving unit (including external environment information such as a switched-off loudspeaker), a kind or a format of the receiving unit, a use status of a power source and a cell or its residual quantity, and a kind and a status of an antenna (a shape of being folded in, its direction, etc.). Further, a configuration may be made so that the signal control information is automatically captured in the other formats. A configuration may be made so that the signal control information is automatically captured via a sensor installed inside or near to the receiving unit. For example, a quantity of the external noise, brightness, a time band, a geometric position, a temperature, information synchronous with video, barcode information captured through a camera, and so on may be employed as signal control information being automatically captured.

The rendering information is information for outputting a plurality of the component elements being including in the input signal to a plurality of the output channels respectively. That is, the rendering information is information indicating a relation between the component element and the output signal for each frequency component. For example, the rendering information may include localization information of each of the component elements being mixed in the decoded signal. The rendering information may include information for manipulating localization feeling, for example, by shading-off the sound image. Utilizing the rendering information makes it possible to control the signal outputted to each output channel for each component element. Each component element may be output from a specific one output channel (for example, a loudspeaker) in some cases, and may be distributed and outputted to a plurality of the output channels in some cases. For example, outputting the objective sound only from a specific output channel and outputting the background sound from the other output channels when the component elements are the objective sound and the background sound makes it possible to clearly localize the objective sound and to improve realistic sensation by environmental sound.

Continuously, a first configuration example of the encoding unit 100 will be explained in details by making a reference to FIG. 2. The encoding unit 100 receives a plurality of the input signals, i.e. the first input signal and the second input signal, and outputs the encoded signal information. The encoding unit 100 is configured of conversion units 110 and 111 and a quantization unit 112. The first input signal is inputted into the conversion unit 110. The second input signal is inputted into the conversion unit 111. The conversion unit 110 decomposes the first input signal into frequency components, and generates a first converted signal. The conversion unit 110 outputs the first converted signal to the quantization unit 112. The conversion unit 111 decomposes the second input signal into frequency components, and generates a second converted signal. The conversion unit 111 outputs the second converted signal to the quantization unit 112. And, the quantization unit 112 quantizes the first converted signal and the second converted signal, and outputs them as the encoded signal information.

Each of the conversion units 110 and 111 configures one block by collecting a plurality of input signal samples, and applies a frequency conversion for this block. As an example of the frequency conversion, a Fourier transform, a cosine transform, a KL (Karhunen Loeve) transform, etc. are known. The technology related to a specific arithmetic operation of these transforms, and its properties are disclosed in Non-patent document 2 (DIGITAL CODING OF WAVEFORMS, PRINCIPLES AND APPLICATIONS TO SPEECH AND VIDEO, PRENTICE-HALL, 1990).

Each of the conversion unit 110 and 111 also can apply the foregoing transforms for a result obtained by weighting one block of the input signal samples with a window function. As such a window function, the window functions such as a Hamming window, a Hanning (Hann) window, a Kaiser window, and a Blackman window are known. Further, more complicated window functions can be employed. The technology related to these window functions is disclosed in Non-patent document 3 (DIGITAL SIGNAL PROCESSING, PRENTICE-HALL, 1975) and Non-patent document 4 (MULTIRATE SYSTEMS AND FILTER BANKS, PRENTICE-HALL, 1993).

An overlap of each block may be permitted at the moment that each of the conversion units 110 and 111 configures one block from a plurality of the input signal samples. For example, with the case of applying an overlap of 30% of a block length, the last 30% of the signal sample belonging to a certain block is repeatedly employed in a plurality of the blocks as the first 30% of the signal sample belonging to the next block. The technology relating to the blocking involving the overlap and the conversion is disclosed in the Non-patent document 2.

In addition, each of the conversion units 110 and 111 may be configured of a band-division filter bank. The band-division filter bank is configured of a plurality of band-pass filters. The band-division filter bank divides the received input signal into a plurality of frequency bands, and outputs them to the quantization unit 112. An interval of each frequency band of the band-division filter bank could be equal in some cases, and unequal in some cases. Band-dividing the input signal at an unequal interval makes it possible to lower/raise a time resolution, that is, the time resolution can be lowered by dividing the input signal into narrows bands with regard to a low-frequency area, and the time resolution can be raised by dividing the input signal into wide bands with regard to a high-frequency area. As a typified example of the unequal-interval division, there exists an octave division in which the band gradually halves toward the low-frequency area, a critical band division that corresponds to an auditory feature of a human being, or the like. The technology relating to the band-division filter bank and its design method is disclosed in the Non-patent document 4.

The quantization unit 112 removes redundancy of the inputted signal, and outputs the encoded signal. As a method of removing redundancy, there exists the method of taking a control such that a correlation between the inputted signals is minimized. In addition, the signal component that is not auditorily recognized may be removed by utilizing the auditory feature such as a masking effect. As a quantization method, the quantization methods such as a linear quantization method and a non-linear quantization method are known. The redundancy of the quantized signal can be furthermore removed by employing Huffman coding etc.

Figure 3:
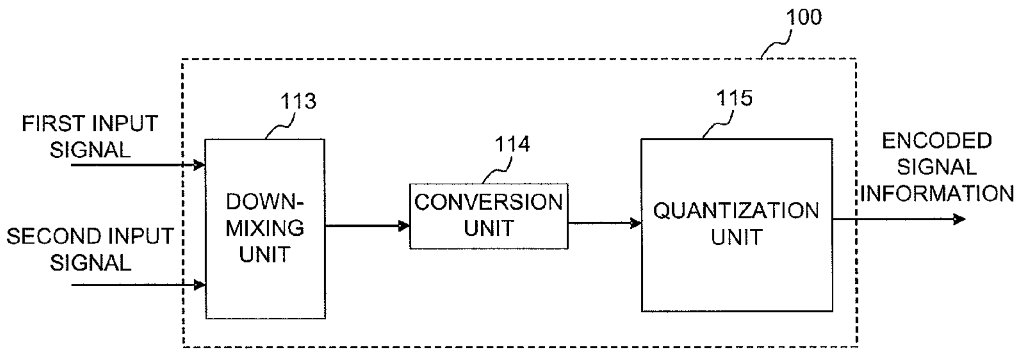
FIG. 3 shows a second configuration example the encoding unit 100.

Next, a second configuration example of the encoding unit 100 will be explained in details by making a reference to FIG. 3. The encoding unit 100 receives a plurality of the input signals, i.e. the first input signal and the second input signal, and outputs the encoded signal information. The encoding unit 100 is configured of a down-mixing unit 113, a conversion unit 114, and a quantization unit 115. The first input signal and the second input signal are inputted into the down-mixing unit 113. The down-mixing unit 113 generates a down-mixed signal from the first input signal and the second input signal, and output the down-mixed signal to the conversion unit 114. The conversion unit 114 decomposes the down-mixed signal into frequency components, and generates a down-mixed converted signal. The conversion unit 114 outputs the down-mixed converted signal to the quantization unit 115. And, the quantization unit 115 quantizes the down-mixed converted signal and outputs it as the encoded signal information. The conversion unit 114 can employ a process similar to that of the conversion units 110 and 111, so its explanation is omitted. Further, the quantization unit 115 can employ a process similar to that of the quantization unit 112, so its explanation is omitted.

In the down-mixing process of the down-mixing unit 113, for example, the first input signal and the second input signal may be summed up in some cases, and the first input signal and the second input signal may be summed up after compensating a phase difference between them in some cases. Employing the down-mixing unit 113 enables the second configuration example to reduce a processing quantity related to the conversion unit as compared with the first configuration example. In addition, the signal, being a target of quantization, becomes a down-mixed signal, thereby making it possible to reduce an information quantity of the encoded signal information as compared with the case of the first configuration example.

Figure 4:
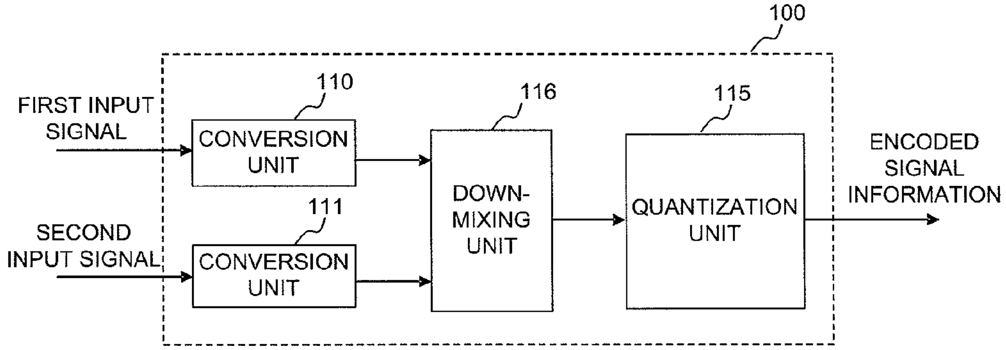
FIG. 4 shows a third configuration example the encoding unit 100.

Next, a third configuration example of the encoding unit 100 will be explained in details by making a reference to FIG. 4. The encoding unit 100 receives a plurality of the input signals, i.e. the first input signal and the second input signal, and outputs the encoded signal information. The encoding unit 100 is configured of conversion units 110 and 111, a down-mixing unit 116, and a conversion unit 115. The first input signal is inputted into the conversion unit 110. The second input signal is inputted into the conversion unit 111. The conversion unit 110 decomposes the first input signal into frequency components, and generates a first converted signal. The conversion unit 110 outputs the first converted signal to the down-mixing unit 116. The conversion unit 111 decomposes the second input signal into frequency components, and generates a second converted signal. The conversion unit 111 outputs the second converted signal to the down-mixing unit 116. The down-mixing unit 116 calculates a down-mixed converted signal from the first converted signal and the second converted signal, and outputs the down-mixed converted signal to the quantization unit 115. And, the quantization unit 115 quantizes the down-mixed converted signal and outputs it as the encoded signal information.

In the down-mixing process of the down-mixing unit 116, for example, the first converted signal and the second converted signal may be summed up frequency by frequency in some cases, and the first converted signal and the second converted signal may be summed up after subjecting them to energy correction or phase difference compensation that differs frequency by frequency in some cases. The third configuration example makes it possible to realize a detailed down-mixing process because the down-mixing process is performed in a frequency region as compared with the case of the second configuration example. Further, the third configuration example as well, similarly to the second configuration example, makes it possible to reduce an information quantity of the encoded signal information because the signal, being a target of quantization, becomes a down-mixed signal as compared with the case of the first configuration example.

A configuration example of the decoding unit 150 will be explained in details by making a reference to FIG. 5. The decoding unit 150 receives the encoded signal information, and outputs the decoded signal. The decoding unit 150 is configured of an inverse quantization unit 160 and an inverse conversion unit 161. The inverse quantization unit 160 inverse-quantizes the received encoded signal information of each frequency, and generates a plurality of decoded converted signals or one decoded converted signal that are configured of a plurality of the frequency components. And, the inverse quantization unit 160 outputs the decoded converted signal to the inverse conversion unit 161. The inverse conversion unit 161 inverse-converts the decoded converted signal, and generates the decoded signal. And, the inverse conversion unit 161 outputs the decoded signal. Additionally, the decoded signal becomes a signal in which the first input signal and the second input signal have been multiplexed when the first configuration example of FIG. 2 is employed as a configuration of the encoding unit. With the case of the second configuration example of FIG. 3 and the case of the third configuration example of FIG. 4, the decoded signal becomes a down-mixed signal.

As an inverse conversion that the inverse conversion unit 161 applies, the inverse conversion corresponding to the conversion that the conversion unit 110 applies is preferably selected. For example, when the conversion unit 110 configures one block by collecting a plurality of the input signal samples, and applies the frequency conversion for this block, the inverse conversion unit 161 applies the corresponding inverse conversion for the samples of which number is identical. Further, when an overlap of each block is permitted at the moment that the conversion unit 110 configures one block by collecting a plurality of the input signal samples, the inverse conversion unit 161, responding to this, applies an identical overlap for the inverse-converted signal. In addition, when the conversion unit 110 is configured of the band-division filter bank, the inverse conversion unit 161 is configured of a band-synthesis filter bank. The technology relating to the band-synthesis filter bank and its design method is disclosed in the Non-patent document 4.

Figure 2:
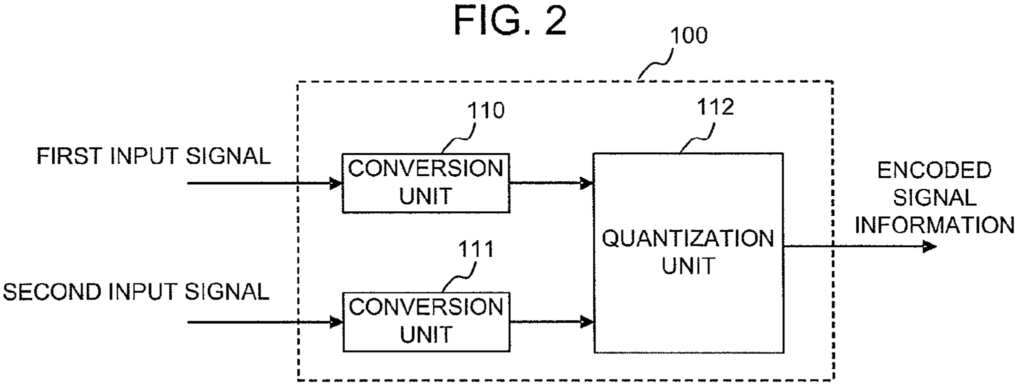
FIG. 2 shows a first configuration example of an encoding unit 100.
Figure 5:
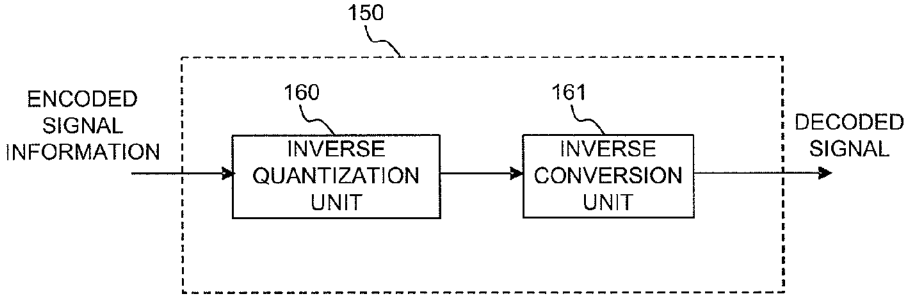
FIG. 5 shows a configuration example of decoding unit 150.

While the encoding unit 100 of FIG. 2 and the decoding unit 150 of FIG. 5 were explained on the assumption that conversion/encoding having the conversion unit included therein was applied, a pulse code modulation (PCM), an adaptive differential pulse code modulation (ADPCM), and analysis-by-synthesis coding, which is typified by CELP etc., in addition hereto may be applied. The technology relating to the PCM/ADPCM is disclosed in the Non-patent document 2. Further, the technology relating to the CELP is disclosed in Non-patent document 5 (IEEE INTERNATIONAL CONFERENCE ON ACOUSTICS, SPEECH, AND SIGNAL PROCESSING, 25.1.1, March 1985, pp. 937-940).

Further, the encoding unit 100 may output the input signal as it stands to the multiplexing unit 102 without performing the encoding process therefor, and the decoding unit 150 may output the decoded signal as it stands to the output signal generation control unit 151 without performing the decoding process therefor. This configuration makes it possible to eliminate the distortion of the signal accompanied by the encoding/decoding process. In addition, a configuration may be made so that the encoding unit 100 and the decoding unit 150 perform a distortion-less compression/expansion process. This configuration enables the output signal generation unit 151 to receive the decoded signal without distorting the input signal.

Figure 6:
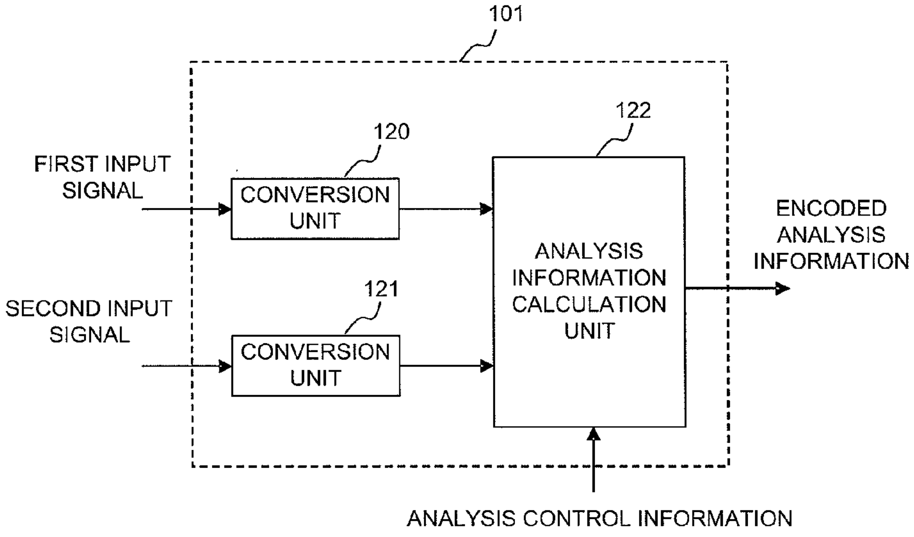
FIG. 6 shows a configuration example of a signal analysis unit 101.

A configuration example of the signal analysis unit 101 will be explained in details by making a reference to FIG. 6. The signal analysis unit 101 receives a plurality of the input signals, i.e. the first input signal and the second input signal, and outputs the encoded analysis information. The signal analysis unit 101 is configured of conversion units 120 and 121, and an analysis information calculation unit 122. The first input signal is inputted into the conversion unit 120. The second input signal is inputted into the conversion unit 121. The conversion unit 120 decomposes the received first input signal into the frequency components, and generates the first converted signal. The conversion unit 120 outputs the first converted signal to the analysis information calculation unit 122. The conversion unit 121 decomposes the received second input signal into the frequency components, and generates the second converted signal. The conversion unit 121 outputs the second converted signal to the analysis information calculation unit 122. The analysis information calculation unit 122 decomposes the first converted signal and the second converted signal into the component elements based upon the analysis control information, and calculates component element information associated with the component elements constituting each converted signal. The analysis control information includes information indicative of a relation between each component element and the input signal. The information indicative of a relation between the component element and the input signal may include dependency information indicating which input signal is employed for generating the component element, to begin with. In addition, the analysis control information includes information associated with classification of each component element. For example, the analysis control information may include classification of the objective sound and the background sound, classification of sound and music, by-instrument classification being included in the music, and the like as information associated with classification. And, the analysis information calculation unit 122 encodes the component element information and the analysis control information, calculates the encoded analysis information, and outputs the encoded analysis information. Further, the analysis information calculation unit 122 may decompose the first and second converted signals into component element groups each of which is configured of a plurality of the component elements, and calculate the component element information. The technique of the conversion in the conversion units 110 and 111 may be employed for the technique of the conversion in the conversion units 120 and 121.

Figure 7:
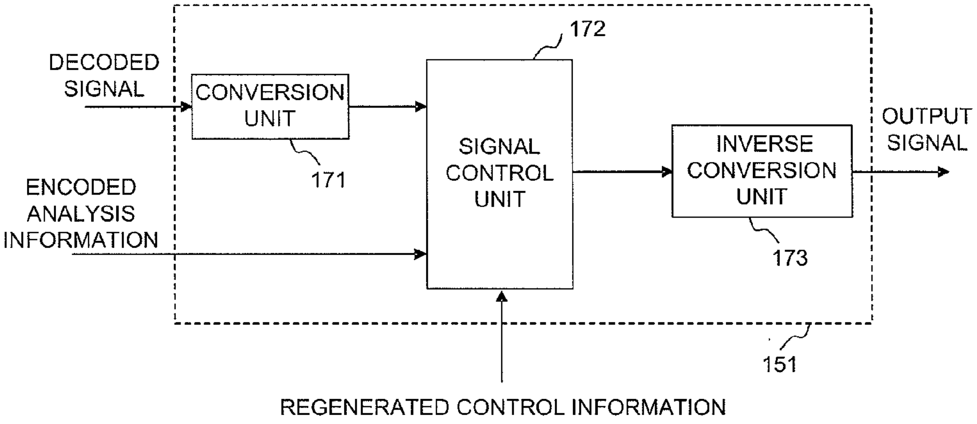
FIG. 7 shows a configuration example of a an output signal generation unit 151.

A configuration example of the output signal generation unit 151 will be explained in details by making a reference to FIG. 7. The output signal generation unit 151 receives the decoded signal and the encoded analysis information, and outputs the output signal. The output signal generation unit 151 is configured of a conversion unit 171, a signal control unit 172, and an inverse conversion unit 173. The conversion unit 171 decomposes the received decoded signal into the frequency components, and generates the decoded converted signal. The conversion unit 171 outputs the decoded converted signal to the signal control unit 172. The signal control unit 172 controls the decoded converted signal for each component element corresponding to the sound source constituting the decoded converted signal based upon the encoded analysis information and the regenerated control information, changes a relation between a plurality of the component elements, and generates the output converted signal. And, the signal control unit 172 outputs the output converted signal to the inverse conversion unit 173. Further, the signal control unit 172 may decompose the output converted signal into component element groups each of which is configured of a plurality of the component elements, and change a relation between a plurality of the component elements. The inverse conversion unit 173 inverse-converts the output converted signal, and generates the output signal. And, the inverse conversion unit 173 outputs the output signal. The technique of the inverse conversion in the inverse conversion unit 161 can be employed for the technique of the inverse conversion in the inverse conversion unit 173.

Hereinafter, for more detailed explanation, the case that only the second input signal is configured of a plurality of the component elements, i.e. the objective sound and the background sound will be explained with two input signals exemplified. Additionally, either the first input signal or the second input signal may be subjected to an analysis of the component element information. Further, both of the first input signal and the second input signal may be subjected to an analysis of the component element information. The analysis of the component element information for the first and second input signals is controlled by the analysis control information.

The signal analysis unit 101 receives the first input signal, the second input signal that is configured of the objective sound and the background sound, and the analysis control information, and calculates a suppression coefficient indicative of a relation between the objective sound and the background sound for the second input signal. In addition, the signal analysis unit 101 generates inter-signal information indicative of a relation between the first input signal and the second input signal. The signal analysis unit 101 generates the component element information from the suppression coefficient and the inter-signal information, encodes the component element information and the analysis control information, and outputs them as the encoded analysis information to the multiplexing unit 102. The suppression coefficient is information that is caused to act upon the input signal in order to control the component element. When the input signal is configured of the objective sound and the background sound, the suppression coefficient is information that is caused to act upon the input signal in order to suppress the background sound. Further, the output signal generation unit 151 receives the encoded analysis information and the decoded signal, derives the component element information from the encoded analysis information, generates the output signal by controlling the first input signal, and the objective sound and the background sound that constitute the second input signal, and outputs it.

Figure 8:
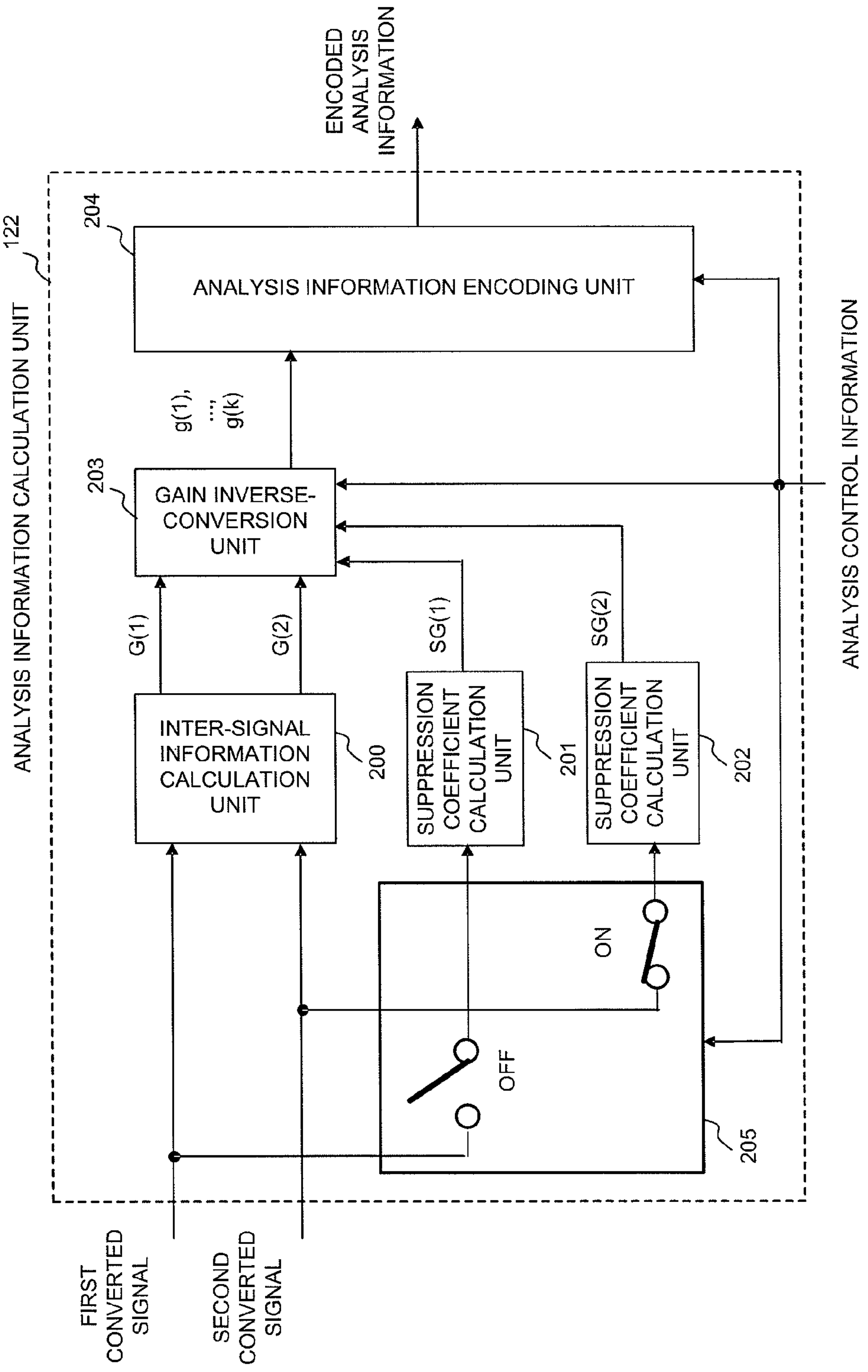
FIG. 8 shows a first configuration example of an analysis information calculation unit 122.

Continuously, a configuration example of the analysis information calculation unit 122 will be explained in details by making a reference to FIG. 8. The analysis information calculation unit 122 receives the first converted signal, the second converted signal, the analysis control information, and outputs the encoded analysis information. The analysis information calculation unit 122 is configured of an inter-signal information calculation unit 200, suppression coefficient calculation units 201 and 202, a gain inverse-conversion unit 203, an analysis information encoding unit 204, and a switch 205. The first converted signal and the second converted signal are inputted into the inter-signal information calculation unit 200 and the switch 205. The analysis control information is inputted into the switch 205, the gain inverse-conversion unit 203, and the analysis information encoding unit 204.

The inter-signal information calculation unit 200 receives the first converted signal and the second converted signal, and generates an energy ratio of the first converted signal and the second converted signal, a phase difference between them, coherence thereof, and the like as the inter-signal information. An average value within an analysis block, an interval maximum value, and an interval minimum value, and so on may be employed for energy ratio, the phase difference, and the coherence. The inter-signal information calculation unit 200 outputs the inter-signal information to the gain inverse-conversion unit 203.

The switch 205 outputs the first converted signal and the second converted signal to the suppression coefficient calculation units 201 and 202, respectively, based upon the analysis control information. In FIG. 8, the case of taking a control so that the suppression coefficient is calculated only for the second converted signal based upon the analysis control information is described as an example.

The suppression coefficient calculation units 201 and 202 estimate the background sound from the inputted first converted signal and second converted signal, respectively, and calculate the suppression coefficient for suppressing the background sound based upon a background sound estimation result. The background sound estimation result could be an amplitude absolute value and an energy value of the background sound, and an amplitude ratio and an energy ratio of the background sound and the input signal. Further, the background sound estimation result could be an average value, an interval maximum value, and an interval minimum value of the amplitude absolute value of the background sound, the energy value of the background sound, the amplitude ratio of the background sound and the input signal, and the energy ratio of the background sound and the input signal. Each of the suppression coefficient calculation units 201 and 202 outputs the calculated suppression coefficient to the gain inverse-conversion unit 203. Additionally, each of the suppression coefficient calculation units 201 and 202 may not output the suppression coefficient to the gain inverse-conversion unit 203 when the converted signal is not inputted from the switch 205 in some cases, and may output the suppression coefficient as one (1) in some cases. As a technology relating to the method of calculating the suppression coefficient, the method founded upon minimum mean square error short-time spectral amplitude (MMSE STSA), which is disclosed in Non-patent document 6 (IEEE TRANSACTIONS ON ACOUSTICS, SPEECH, AND SIGNAL PROCESSING, VOL. 32, NO. 6, pp. 1109-1121, Dec. 1984), the method founded upon minimum mean square error log spectral amplitude (MMSE LSA), which is disclosed in Non-patent document 7 (IEEE TRANSACTIONS ON ACOUSTICS, SPEECH, AND SIGNAL PROCESSING, VOL. 33, NO. 2, pp. 443-445, April 1985), the method founded upon maximum likelihood spectral amplitude estimation, which is disclosed in Non-patent document 8 (EURASIP JOURNAL ON ADVANCES IN SIGNAL PROCESSING, VOLUME 2005, Issue 7, July 2005, pp. 1110-1126), or the like may be employed.

The gain inverse-conversion unit 203 receives the inter-signal information, the suppression coefficient, and the analysis control information, and calculates the component element information. The gain inverse-conversion unit 203 outputs the component element information to the analysis information encoding unit 204. With regard to the component element information, for example, upon defining the suppression coefficient as SG(1) and SG(2), and the energy ratio constituting the inter-signal information as G(1) and G(2), the gain constituting the component element information is calculated like [Numerical equation 1].

$$g(1)=G(1)\times SG(1)$$

$$g(2)=G(1)\times(1-SG(1))$$

$$g(3)=G(2)\times SG(2)$$

$$g(4)=G(2)\times(1-SG(2)) \quad \text{[Numerical equation 1]}$$

Where g( ) is indicative of the gain constituting the component element information. g(1) and g(2) may be calculated with SG(1) defined as SG(1)=1 because the suppression coefficient is not calculated for the first converted signal by the analysis control information in this example. In this case, g(1)=G(1) and g(2)=0 are yielded. Additionally, when the phase difference, the coherence and the like exist as the inter-signal information besides the energy ratio, the phase difference and the coherence may be combined besides the gain g( ) as the component element information.

The analysis information encoding unit 204 encodes the received component element information and analysis control information, and outputs an encoding result as the encoded analysis information. As the encoding method, a method similar to the method having the content already explained with regard to the quantization unit 112 may be employed. The encoding makes it possible to remove redundancy of the component element information and the analysis control information. Further, when the information quantity does not need to be curtailed, the analysis information encoding unit 204 may output the component element information and the analysis control information as the encoded analysis information without performing these encoding processes.

Figure 9:
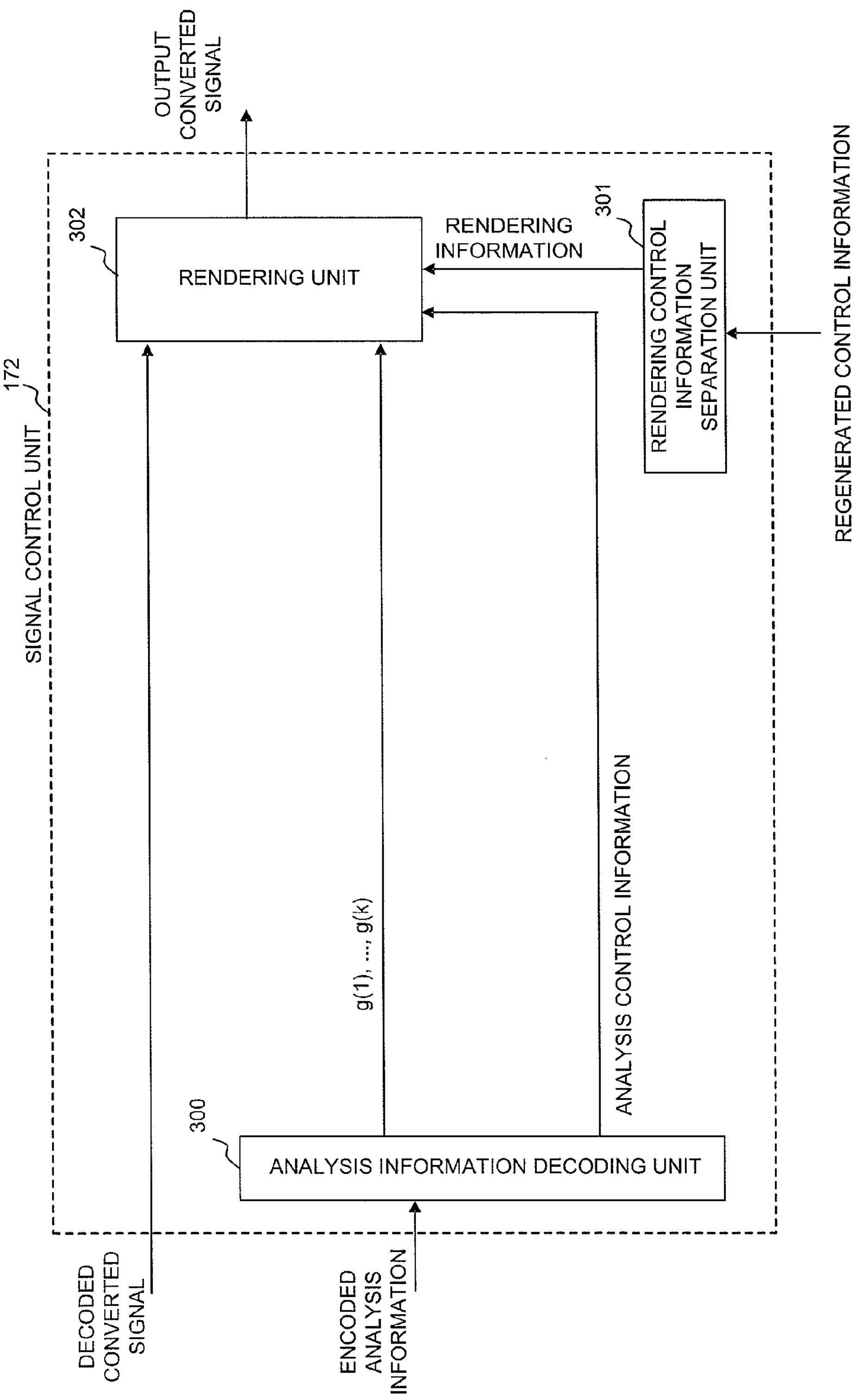
FIG. 9 shows a first configuration example of a signal control processing unit 172.

A first configuration example of the signal control unit 172 will be explained in details by making a reference to FIG. 9. The signal control unit 172 receives the decoded converted signal, the encoded analysis information, and the regenerated control information, and outputs the output converted signal. The signal control unit 172 is configured of an analysis information decoding unit 300, a rendering control information separation unit 301, and a rendering unit 302. The decoded converted signal is inputted into the rendering unit 302, the encoded analysis information is inputted into the analysis information decoding unit 300, and the regenerated control information is inputted into the rendering control information separation unit 301.

The analysis information decoding unit 300 decodes the component element information and the analysis control information from the received encoded analysis information, and outputs the component element information and the analysis control information to the rendering unit 302. When the component element information and the analysis control information have not been encoded, the analysis information decoding unit 300 directly outputs the component element information and the analysis control information without performing the decoding process.

The rendering control information separation unit 301 separates the rendering information from the received regenerated control information. The rendering control information separation unit 301 outputs the rendering information to the rendering unit 302. When only the rendering control information is included in the regenerated control information, the regenerated control information, i.e. the rendering information is inputted into the rendering unit 302. Additionally, the rendering information, which is information indicative of a relation between the component element constituting the decoded converted signal, and the output converted signal for each frequency component, can be expressed by employing an energy difference, a time difference, and a correlation between the signals, and so on. As one example of the rendering information, the information disclosed in Non-patent document 9 (ISO/IEC 23003-1:2007 Part 1 MPEG Surround) is known.

The rendering unit 302 controls the decoded converted signal for each component element corresponding to the sound source constituting the decoded converted signal by employing the component element information, the analysis control information, and the rendering information. And, the rendering unit 302 changes a relation between a plurality of the component elements, and generates the output converted signal. At first, the rendering unit 302 calculates an output generation parameter for changing a relation between a plurality of the component elements from the component element information, the analysis control information, and the rendering information. Next, the rendering unit 302 generates the output converted signal from the decoded converted signal by employing the output generation parameter.

A specific example of calculating the output generation parameter will be explained. Upon defining the output generation parameter corresponding to each frequency component of a frequency band f as W(f), the rendering information as U(f), and the gain within the component element information as g(k,p,f), k=1, 2, . . . , K, p=1, 2, . . . , P, the output generation parameter W(f) is expressed with the following equation.

[Numerical equation 2]

$$W(f) = U(f)\cdot H(f)$$

$$H(f) = \begin{bmatrix} g(1, 1, f) & \dots & g(1, P, f) \\ \vdots & \ddots & \vdots \\ g(K, 1, f) & \dots & g(K, P, f) \end{bmatrix}$$

Wherein K is the number of the component elements and is governed by the analysis control information. Further, P is the number of channels of the decoded converted signal. In addition, the order in the column direction of a matrix H(f) and the order in the row direction of a matrix U(f) of [Numerical equation 2] are controlled by a dependency between the component element being included in the analysis control information, and the input signal. This makes it possible to control a desired component element.

As a method of calculating the output converted signal from the decoded converted signal by employing the output generation parameter W(f), the method disclosed in the Non-patent document 9 is known. When a MPEG Surround decoder disclosed in the Non-patent document 9 is employed, the output generation parameter W(f) is employed as a data stream being supplied to the MPEG Surround decoder. Additionally, the output generation parameter W(f) being used within the MPEG Surround decoder may be output without being converted into the data stream. In the method disclosed in the Non-patent document 9, upon defining the frequency component of the decoded converted signal in a certain frequency band f as $X_p(f)$, p=1, 2, . . . , P (P is the number of the channels of the decoded signal), and the frequency component of the output signal as $V_g(f)$, q=1, 2, . . . , Q (Q is the number of the channels of the output signal), and expressing X(f) by the following [Numerical equation 3] and V(f) by the following [Numerical equation 4], an operation of the rendering unit becomes V(f)=W(f)×X(f).

[Numerical equation 3]

$$X(f) = \begin{bmatrix} X_1(f) \\ X_2(f) \\ \vdots \\ X_P(f) \end{bmatrix}$$

[Numerical equation 4]

$$V(f) = \begin{bmatrix} V_1(f) \\ V_2(f) \\ \vdots \\ V_Q(f) \end{bmatrix}$$

Figure 10:
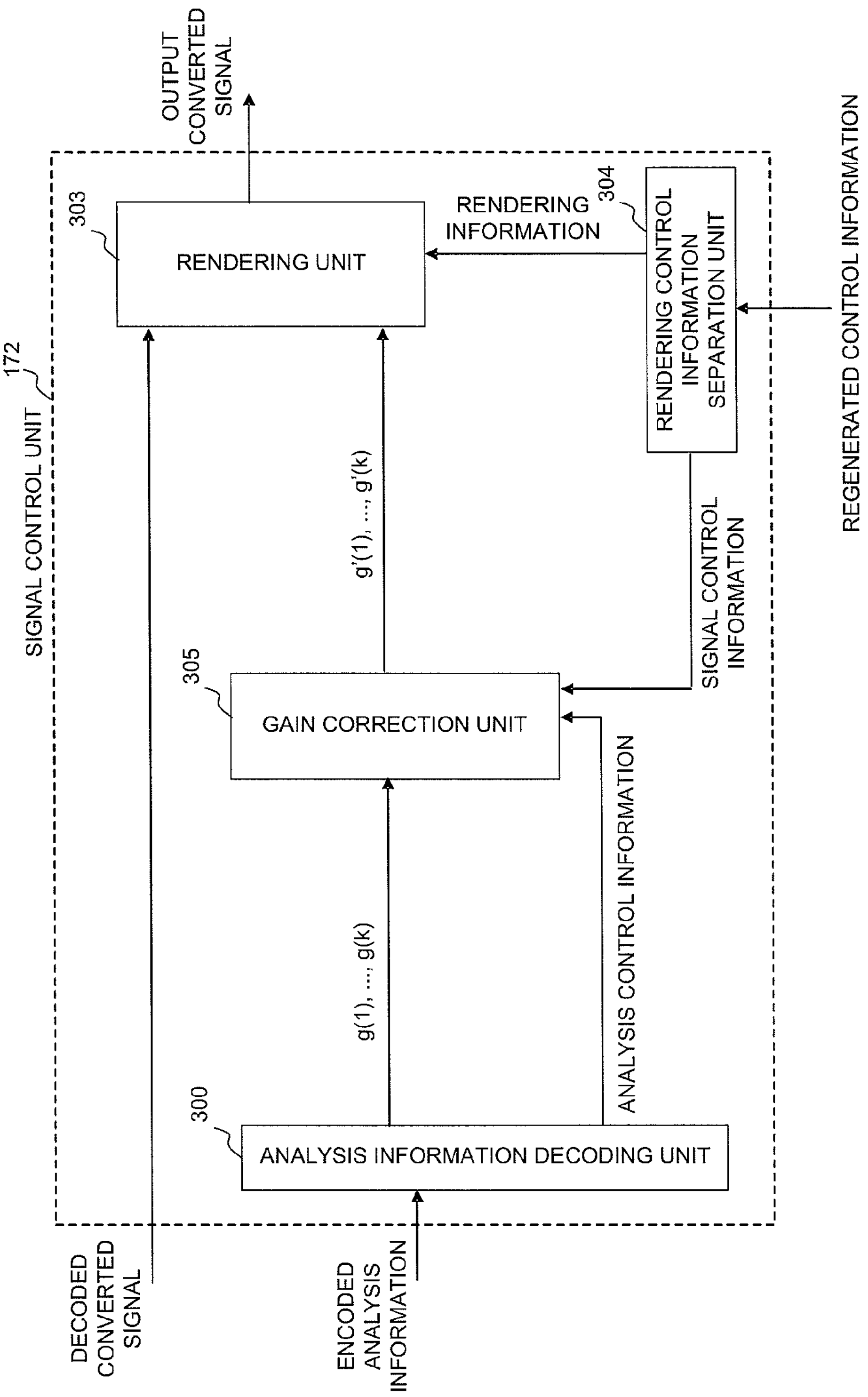
FIG. 10 shows a second configuration example of the signal control processing unit 172.

Next, a second configuration example of the signal control unit 172 will be explained in details by making a reference to FIG. 10. The signal control unit 172 receives the decoded converted signal, the encoded analysis information, and the regenerated control information, and outputs the output converted signal. The signal control unit 172 is configured of an analysis information decoding unit 300, a rendering unit 303, a rendering control information separation unit 304, and a gain correction unit 305. Upon making a comparison with FIG. 9 indicative of the first configuration example of the signal control unit 172, FIG. 10 differs from FIG. 9 in a point that the gain correction unit 305 is added, and in operations of the rendering control information separation unit 304 and the rendering unit 303. The decoded converted signal is inputted into the rendering unit 303, the encoded analysis information is inputted into the analysis information decoding unit 300, and the regenerated control information is inputted into the rendering control information separation unit 304.

The analysis information decoding unit 300 decodes the component element information and the analysis control information from the received encoded analysis information, and outputs the component element information and the analysis control information to the gain correction unit 305. When the component element information and the analysis control information have not been encoded, the analysis information decoding unit 300 directly outputs the component element information and the analysis control information without performing the decoding process.

The rendering control information separation unit 304 separates the rendering information and the signal control information from the received regenerated control information. The rendering control information separation unit 304 outputs the rendering information to the rendering unit 303, and the signal control information to the gain correction unit 305.

The gain correction unit 305 corrects the gain constituting the component element information by employing the received signal control information and analysis control information, and outputs the component element information including the corrected gain to the rendering unit 303. As a specific example of the gain correction, upon defining the signal control information for controlling the objective sound as A(f) like [Numerical equation 5], and the corrected gain as H'(f), an operation of the gain correction becomes H'(f)=A(f)×H(f).

$$A(f) = \begin{bmatrix} a(1, f) & \dots & 0 \\ \vdots & \ddots & \vdots \\ 0 & \dots & a(K, f) \end{bmatrix} \quad \text{[Numerical equation 5]}$$

Wherein a(k,f) is a variable for controlling the k-th component element. A matrix A(f) becomes a diagonal matrix of K×K with the number of the component elements defined as K. Further, the order of diagonal elements of the matrix A(f) is governed by a dependency between the component element being included in the analysis control information and the input signal. Controlling the order of the matrix A(f) indicative of the signal control information responding to a dependency makes it possible to control a desired component element.

The rendering unit 303 controls the decoded converted signal for each component element corresponding to the sound source constituting the decoded converted signal by employing the component element information and the rendering information, changes a relation between a plurality of the component elements, and generates the output converted signal. At first, the rendering unit 303 calculates the output generation parameter for changing a relation between a plurality of the component elements from the corrected gain constituting the component element information, and the rendering information. Next, the rendering unit 303 calculates the output converted signal from the decoded converted signal by employing the output generation parameter. The output generation parameter is calculated as W(f)=U(f)×H'(f). Further, the output converted signal is calculated as V(f)=W(f)×X(f).

Figure 11:
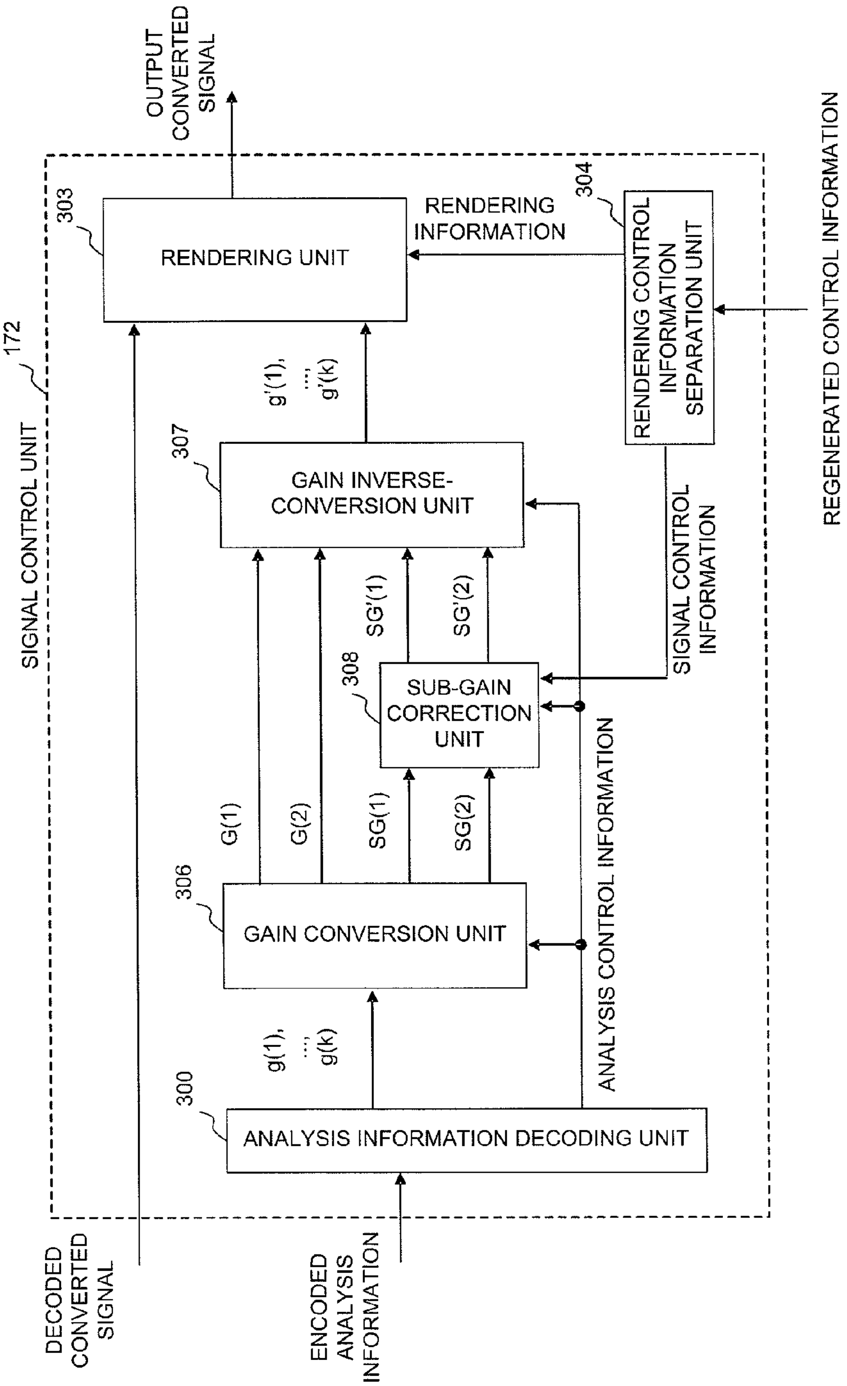
FIG. 11 shows a third configuration example of the signal control processing unit 172.

Next, a third configuration example of the signal control unit 172 will be explained in details by making a reference to FIG. 11. The signal control unit 172 receives the decoded converted signal, the encoded analysis information, and the regenerated control information, and outputs the output converted signal. The signal control unit 172 is configured of an analysis information decoding unit 300, a rendering unit 303, a rendering control information separation unit 304, a gain conversion unit 306, a gain inverse-conversion unit 307, and a sub-gain correction unit 308. Upon making a comparison with FIG. 10 indicative of the second configuration example of the signal control unit 172, FIG. 11 differs from FIG. 10 in a point that the gain correction unit 305 is replaced with the gain conversion unit 306, the gain inverse-conversion unit 307, and the sub-gain correction unit 308. The decoded converted signal is inputted into the rendering unit 303, the encoded analysis information is inputted into the analysis information decoding unit 300, and the regenerated control information is inputted into the rendering control information separation unit 304. Each of the configuration examples of the analysis information decoding unit 300, the rendering unit 303, and the rendering control information separation unit 304 is similar to the second configuration example, so its explanation is omitted. Additionally, the component element information, being an output of the analysis information decoding unit 300, is outputted to the gain conversion unit 306, and the analysis control information is outputted to the gain conversion unit 306, the gain inverse-conversion unit 307, and the sub-gain correction unit 308. The signal control information, being an output of the rendering control information separation unit 304, is outputted to the sub-gain correction unit 308.

The gain conversion unit 306 generates the inter-signal information and the suppression coefficient from the component element information by employing the analysis control information. The gain conversion unit 306 outputs the inter-signal information to the gain inverse-conversion unit 307, and the suppression coefficient to the sub-gain correction unit 308. The conversion from the component element information into the inter-signal information and the suppression coefficient, which is equivalent to the inverse conversion of [Numerical equation 1], is expressed like [Numerical equation 6] when the suppression coefficient is defined as SG(m), and the energy ratio constituting the inter-signal information as G(m).

$$G(m) = \sum_{k \in m} g(k), \qquad SG(m) = g(k_m)/G(m) \quad \text{[Numerical equation 6]}$$

Wherein go is indicative of the gain constituting the component element information. K is an index of the component element, and m is an index of the input signal. $k_m$ is an index of the component element of the objective sound constituting the m-th input signal. Each of k, m, and $k_m$ is derived from the analysis control information indicative of a dependency between the component element and the input signal. Additionally, k∊M is indicative of indexes of all of the component elements constituting the m-th input signal. In this embodiment, the energy ratio constituting the inter-signal information, and suppression coefficient behave as follows because the number of the input signals is defined as two, and the suppression coefficient is not calculated for the first input signal as shown in FIG. 8.

$$G(1)=g(1)+g(2)$$

$$G(2)=g(3)+g(4)$$

$$SG(1)=g(1)/G(1)=1$$

$$SG(2)=g(3)/G(2) \quad \text{[Numerical equation 7]}$$

Additionally, in this example, the component element index k of the objective sound constituting the second input signal, being m=2, is k=3.

The sub-gain correction unit 308 corrects the suppression coefficient by employing the received signal control information and analysis control information, and outputs the corrected suppression coefficient to the gain inverse-conversion unit 307. As a specific example of calculating the corrected suppression coefficient, upon defining the signal control information for controlling magnitude of the objective sound as B(m), and the corrected suppression coefficient as SG'(m), the corrected suppression coefficient may be defined as SG'(m)=B(m)×SG(m). Herein, m is an index of the input signal. The correction founded upon the signal control information is not targeted because the suppression coefficient is not calculated for the first input signal in this example. When the suppression coefficient is calculated also for the first input signal, the suppression coefficient of the first input signal can be corrected likewise. Information that each input signal has been decomposed into a plurality of the component elements, or the like is derived from the analysis control information.

The gain inverse-conversion unit 307 receives the inter-signal information, the corrected suppression coefficient, and the analysis control information, calculates the corrected gain, and calculates the component element information including the corrected gain. The method of calculating the corrected gain is founded upon [Numerical equation 1] similarly to the case of the gain inverse-conversion unit 203 explained by employing FIG. 8. In addition, a correction may be made so that a sum of the corrected gains for respective input signals is equal to a sum of the before-correction gains. In this correction, utilizing that a sum of the corrected suppression coefficient SG' (m) of the objective sound and coefficient 1−SG' (m) of the background sound becomes one (1) makes it possible to modify the corrected gain. The gain inverse-conversion unit 307 outputs the component element information to the rendering unit 303.

Figure 12:
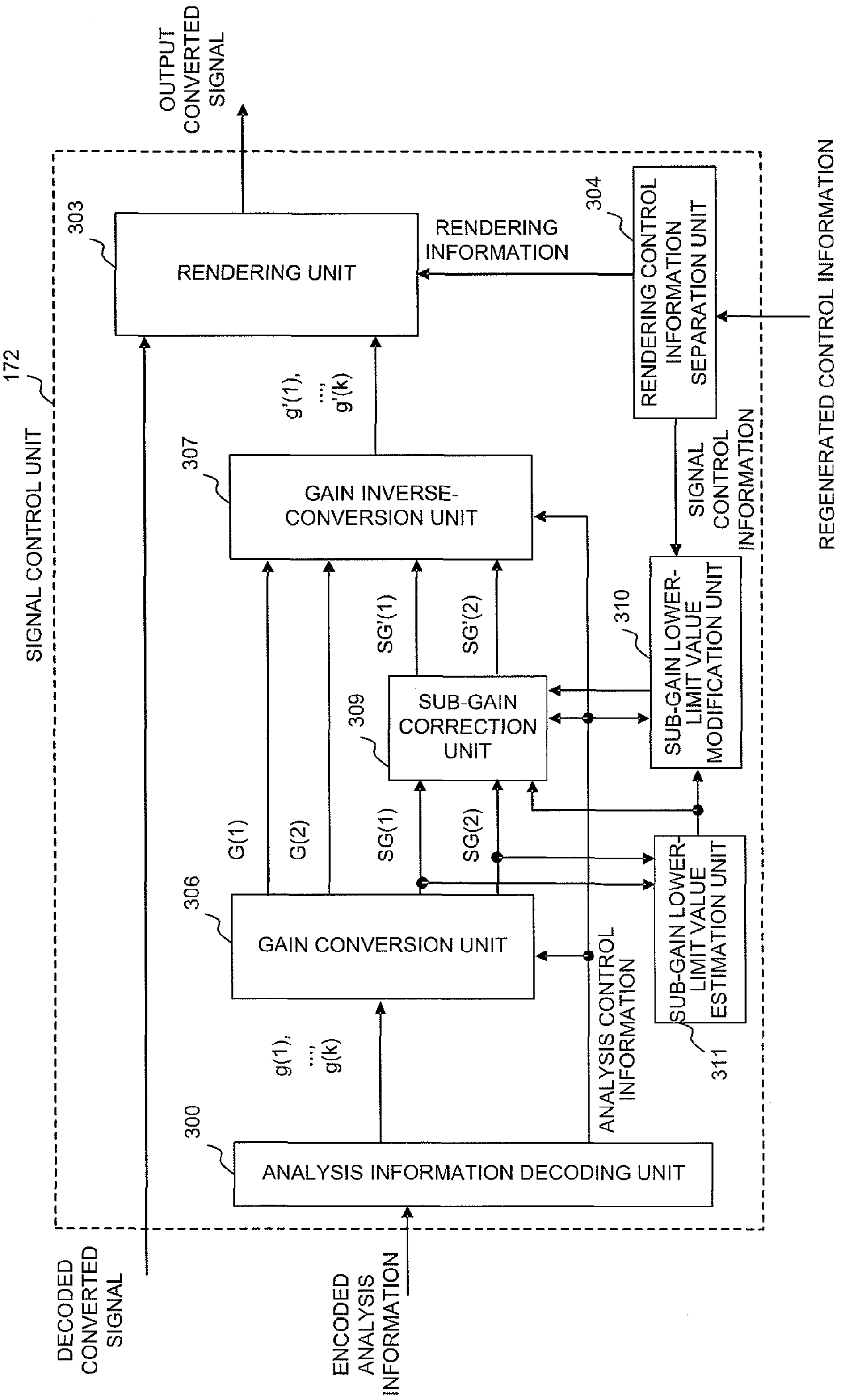
FIG. 12 shows a fourth configuration example of the signal control processing unit 172.

Next, a fourth configuration example of the signal control unit 172 will be explained in details by making a reference to FIG. 12. The signal control unit 172 receives the decoded converted signal, the encoded analysis information, and the regenerated control information, and outputs the output converted signal. The signal control unit 172 is configured of an analysis information decoding unit 300, a rendering unit 303, a rendering control information separation unit 304, a gain conversion unit 306, a gain inverse-conversion unit 307, a sub-gain correction unit 309, a sub-gain lower-limit value modification unit 310, and a sub-gain lower-limit value estimation unit 311. Upon making a comparison with FIG. 11 indicative of the third configuration example of the signal control unit 172, FIG. 12 differs from FIG. 11 in a point that the sub-gain correction unit 308 is replaced with the sub-gain correction unit 309, the sub-gain lower-limit value modification unit 310, and the sub-gain lower-limit value estimation unit 311. The decoded converted signal is inputted into the rendering unit 303, the encoded analysis information is inputted into the analysis information decoding unit 300, and the regenerated control information is inputted into the rendering control information separation unit 304. Each of the configuration examples of the analysis information decoding unit 300, the rendering unit 303, the rendering control information separation unit 304, the gain conversion unit 306, and the gain inverse-conversion unit 307 is similar to the third configuration example, so its explanation is omitted. Additionally, the analysis control information, being an output of the analysis information decoding unit 300, is outputted to the gain conversion unit 306, the gain inverse-conversion unit 307, the sub-gain correction unit 309, and the sub-gain lower-limit value modification unit 310. The signal control information, being an output of the rendering control information separation unit 304, is outputted to the sub-gain lower-limit value modification unit 310. The suppression coefficient, being an output of the gain conversion unit 306, is outputted to the sub-gain correction unit 309 and the sub-gain lower-limit value estimation unit 311.

The sub-gain lower-limit value estimation unit 311 estimates the correction value for correcting the suppression coefficient from the received suppression coefficient. The correction value could be a coefficient correction lower-limit value. Hereinafter, the case that the correction value is a coefficient correction lower-limit value will be explained. The sub-gain lower-limit value estimation unit 311 outputs the coefficient correction lower-limit value to the sub-gain correction unit 309 and the sub-gain lower-limit value modification unit 310. The coefficient correction lower-limit value is indicative of a lower-limit value of the suppression coefficient. As a rule, a signal distortion that occurs after suppressing the background sound is increased when the suppression coefficient becomes too small. Thereupon, employing the coefficient correction lower-limit value makes it possible to avoid an excessive increase in the signal distortion. A specific value may be pre-stored in a memory as the coefficient correction lower-limit value in some cases, and the coefficient correction lower-limit value may be calculated responding to the suppression coefficient in some cases. Further, as the coefficient correction lower-limit value, an appropriate value may be selected from among a plurality of values stored in a memory. The coefficient correction lower-limit value should be set so that it is a small value when the background sound estimation result is small. The small background sound estimation result signifies that the objective sound is dominant in the input signal. The reason is that the distortion hardly occurs at the moment of manipulating the component element when the background sound estimation result is small. Hereinafter, the method of estimating the coefficient correction lower-limit value from the suppression coefficient will be explained in details.

As a first method of estimating the coefficient correction lower-limit value, the method of defining the value obtained by smoothing the suppression coefficient in a frequency direction as a coefficient correction lower-limit value may be employed. For example, the suppression coefficient of a frequency f in a certain time n is defined as SG(n,f), f=0, . . . , F−1. Additionally, while the suppression coefficient is calculated for each input signal, it is assumed that the index for distinguishing the input signals from each other is not affixed for simplicity. At this time, a coefficient correction lower-limit value L(f), f=0, . . . , F−1 is calculated like [Numerical equation 8].

$$T1(n,0)=SG(n,0),$$

$$T1(n,f)=\max(SG(n,f),a(f)\times T1(n,f-1)),f=1,\ldots,F-1,$$

$$T2(n,F-1)=T1(n,F-1),$$

$$T2(n,f)=\max(T1(n,f),b(f)\times T2(n,f+1)),f=F-2,\ldots,0$$

$$L(n,f)=c(f)\times T2(n,f),f=0,\ldots,F-1$$

[Numerical equation 8]

Where F is the number of the suppression coefficients in the frequency direction, and max(X,Y) is indicative of X or Y, which is larger. Each of T1(n,f) and T2(n,f) is an intermediate parameter, and each of a(f), b(f), and c(f), which is a parameter for the smoothing, assumes a value of 0 to 1. Additionally, each of a(f), b(f), and c(f) could be a parameter having an identical value in a frequency direction. For example, a(f), b(f), and c(f) are set to a(f)=0.8, b(f)=0.7, and c(f)=0.2, respectively.

As a second method of estimating the coefficient correction lower-limit value, a moving average in the frequency direction of the suppression coefficients SG(n,f) can be employed. In this case, the coefficient correction lower-limit value behaves like the following equation.

$$L(n,f)=c(f)\cdot\frac{1}{M+1}\sum_{m=-M/2}^{m=M/2}w(m)\cdot SG(n,f+m)$$

[Numerical equation 9]

Where w(m), which is a weighting of the moving average, can be set so that a sum of w(m) is 1. C(f), which is a parameter for the smoothing, assumes a value of 0 to 1.

Additionally, c(f) could be a parameter having an identical value in the frequency direction. For example, c(f) is set to c(f)=0.2.

Further, as a third method of estimating the coefficient correction lower-limit value, the method of grouping suppression coefficients SG(n,f) in a time direction and a frequency direction, or in one direction of them and defining a minimum value or an average value of the suppression coefficients within each group as a coefficient correction lower-limit value of the above group may be employed. The grouping in the frequency direction can be fitted to an auditory feature of a human being in such a manner that a small number of the suppression coefficients are grouped in a low-frequency band and a large number of the suppression coefficients are grouped in a high-frequency band. This grouping may be preset in some cases and may be calculated responding to the suppression coefficient in some cases.

In addition, the coefficient correction lower-limit value calculated with the above-mentioned first to third method examples may be smoothed in the time direction.

The sub-gain lower-limit value modification unit 310 modifies the coefficient correction lower-limit value by employing the signal control information, and outputs the modified coefficient correction lower-limit value to the sub-gain correction unit 309. Hereinafter, the method of modifying the coefficient correction lower-limit value will be explained. When the suppression coefficient is small, the background sound is strongly suppressed, and one part of the objective sound is also suppressed simultaneously therewith, and the distortion results in being included. That is, as a rule, the residual background sound and magnitude of the distortion of the output signal are in a relation of trade-off, and the small residual background sound and the small distortion of the output signal cannot be satisfied simultaneously. For this, employing the excessively small suppression coefficient leads to an increase in the distortion, which is included in the objective sound that is outputted. Thereupon, there is a necessity for guaranteeing the minimum value of the suppression coefficient with the coefficient correction lower-limit value, and settling the maximum value of the distortion occurring in the output signal into a constant range. Thereupon, it is necessary to accept one of two options, tacit permission of the residual background sound to a certain extent in order to avoid an increase in the distortion of the output signal due to the excessive suppression, and tacit permission of the distortion of the output signal due to the excessive suppression in order to attain the sufficiently small residual background sound. The coefficient correction lower-limit value is employed in order to control this trade-off. Thus, modifying the coefficient correction lower-limit value with the signal control information makes it possible to control the trade-off of the residual background sound and magnitude of the distortion of the output signal. With such a configuration, the suppression coefficient can be controlled with the signal control information, and the background sound and the distortion can be easily controlled.

Figure 36:
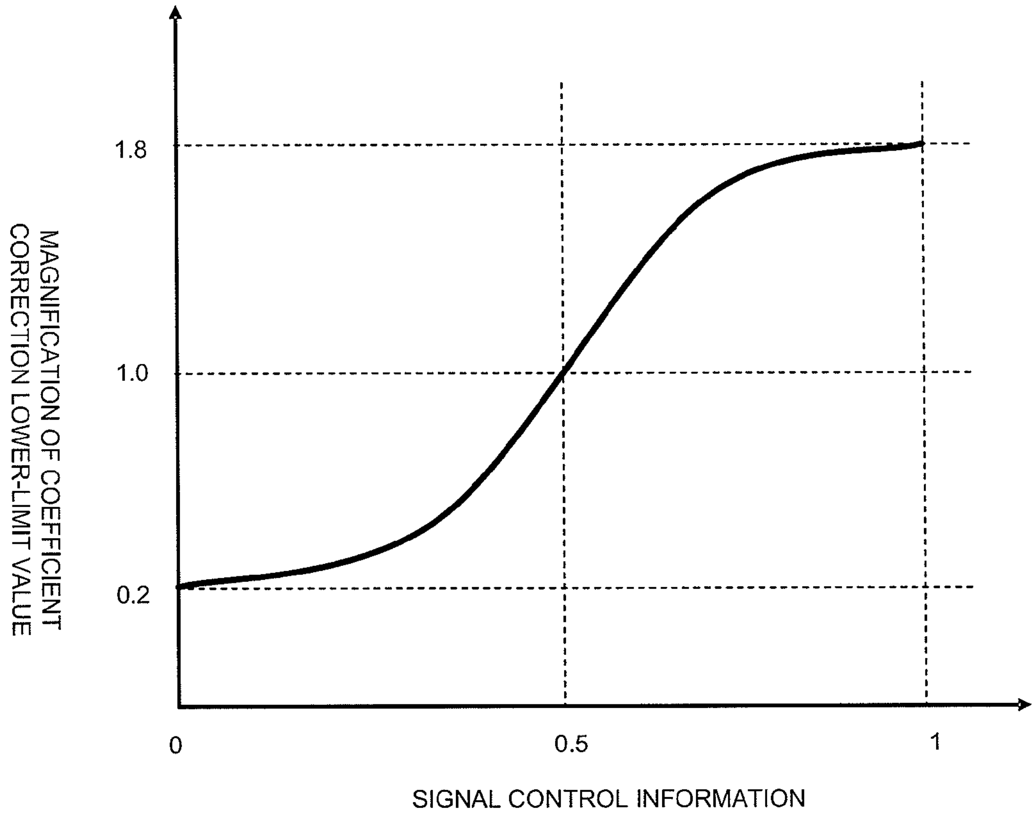
FIG. 36 is view illustrating a relation of a magnification of a coefficient correction lower-limit value to signal control information.

In this configuration example, for example, the magnitude of the residual background sound that is permissible as signal control information may be inputted. In this case, by generating the magnification of the coefficient correction lower-limit value from the magnitude of the permissible residual background sound, and multiplying the coefficient correction lower-limit value by the magnification of the coefficient correction lower-limit value, the coefficient correction lower-limit value may be modified. One example of a relation between the magnification of the coefficient correction lower-limit value and the signal control information in this case is shown in FIG. 36. The relation shown in FIG. 36 has a feature of ever-rising such that the magnification of the coefficient correction lower-limit value becomes larger as the signal control information becomes larger. The coefficient correction lower-limit value is amplified and utilized when the magnification of the coefficient correction lower-limit value is large. For this, it becomes equivalent to employment of the larger coefficient correction lower-limit value. That is, the larger residual noise is permitted, and the distortion of the output signal is made small. To the contrary, when the magnification of the coefficient correction lower-limit value is large, the effect of the coefficient correction lower-limit value is made feeble. This means that stronger suppression is executed. In FIG. 36, the fact that signal control information is 1 signifies the situation in which the residual background sound is permitted, and thus, the distortion of the output signal becomes minimized. On the other hand, the fact that the signal control information is zero signifies the situation in which the distortion of the output signal is permitted, and thus, the residual background sound becomes minimized.

Figure 37:
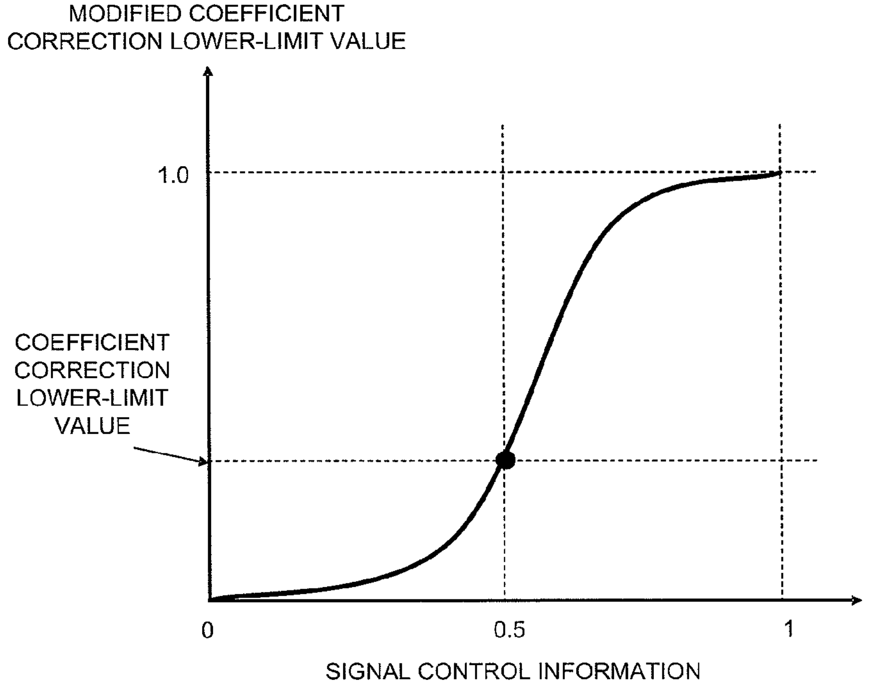
FIG. 37 is view illustrating a relation of a modified coefficient correction lower-limit value to the signal control information.

As an example of another method related to the modification of the coefficient correction lower-limit value, the coefficient correction lower-limit value may be directly modified for the inputted signal control information without using the magnification of the coefficient correction lower-limit value. For example, when the magnitude of the residual background sound that is permissible as signal control information is inputted, one example of a relation between the modified coefficient correction lower-limit value and the signal control information is shown in FIG. 37. The relation shown in FIG. 37 has a feature of ever-rising such that the modified coefficient correction lower-limit value becomes larger as the signal control information becomes larger. In addition, the relation shown in FIG. 37 has a feature such that the modified coefficient correction lower-limit value becomes equal to the coefficient correction lower-limit value when the signal control information has an intermediate value (in an example of FIG. 37, a signal control value is 0.5). With this, a correspondence that the modified coefficient correction lower-limit value as well increases/decreases from a point of the coefficient correction lower-limit value when the value of the signal control information is increased/decreased from its intermediate value is obtained, thereby enabling a simple control to be realized by the signal control information. Similarly to FIG. 36, in FIG. 37, the fact that signal control information is 1 signifies the situation in which the residual background sound is permitted, and thus, the distortion of the output signal becomes minimized. On the other hand, the fact that the signal control information is zero signifies the situation in which the distortion of the output signal is permitted, and thus, the residual background sound becomes minimized.

The sub-gain correction unit 309 corrects the suppression coefficient by employing the coefficient correction lower-limit value and the modified coefficient correction lower-limit value, and outputs the corrected suppression coefficient to the gain inverse-conversion unit 307. The method of generating the corrected suppression coefficient will be explained in details. Upon comparing the coefficient correction lower-limit value with the suppression coefficient, the sub-gain correction unit 309 outputs the modified coefficient correction lower-limit value as the corrected suppression coefficient when the coefficient correction lower-limit value is identical in the value. On the other hand, the sub-gain correction unit 309 outputs the suppression coefficient or the modified coefficient correction lower-limit value, which is larger, as the corrected suppression coefficient when the coefficient correction lower-limit value is not identical in the value. As another method, the method disclosed in the patent document 1, in which the coefficient correction lower-limit value is not compared with the suppression coefficient, may be employed. The method disclosed in the patent document 1 is a method of comparing the suppression coefficient with the modified coefficient correction lower-limit value. The sub-gain correction unit 309 outputs the suppression coefficient as the corrected suppression coefficient when the suppression coefficient is larger than the modified coefficient correction lower-limit value. Further, the sub-gain correction unit 309 outputs the modified coefficient correction lower-limit value as the corrected suppression coefficient when the suppression coefficient is smaller than the modified coefficient correction lower-limit value.

As explained above, the first embodiment of the present invention enables the receiving unit to control the input signal, which is configured of a plurality of the component elements, for each component element based upon the encoded analysis information being outputted from the transmission unit. In addition, the receiving unit can curtail the arithmetic quantity relating to the signal analysis because the transmission unit analyses the signal. Further, utilizing information indicative of a relation between the input signal and each component element, which is included in the analysis control information, makes it possible to control each of a plurality of the component elements constituting the input signal independently of the component elements of other input signals also when a plural number of the input signals of the transmission unit exist. In addition, utilizing information associated with the classification of each component element, which is included in the analysis control information, enables a control corresponding to the classification of each component element. For example, when the component elements are the objective sound and the background sound, a control responding to the objective sound can be taken for the objective sound, and a control responding to the background sound can be taken for the background sound. A more desired output signal can be obtained owing to a control corresponding to the classification of the component element. Further, employing the information indicative of a relation between the input signal and each component element, and the information associated with the classification of each component element makes it possible to take an accurate control for each component element. For example, when the first and second input signals including the objective sound and the background sound exist, the process such as a process of suppressing the background sound being included in the first input signal for the objective sound being included in the second input signal, and the inaccurate control for the component elements of which a correspondence is not correct can be excluded.

Second Embodiment

A second embodiment of the present invention will be explained. Upon comparing the second embodiment with the first embodiment, the former differs from the latter in operations of the analysis information calculation unit 122 and the signal control unit 172. Explanation of the portion which overlaps the first embodiment is omitted.

Figure 13:
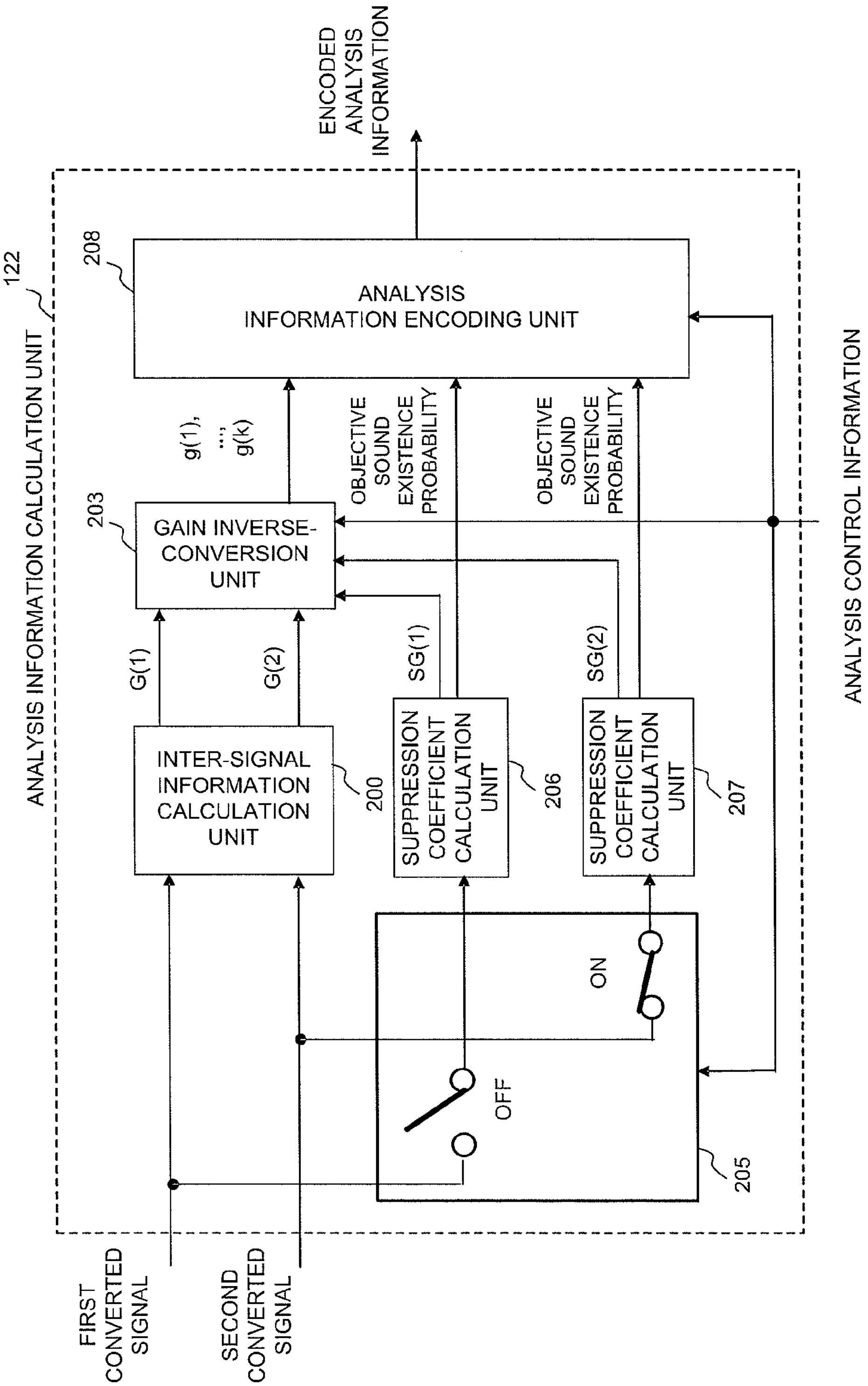
FIG. 13 shows a second configuration example of the analysis information calculation unit 122.

A second configuration example of the analysis information calculation unit 122 will be explained in details by making a reference to FIG. 13. The analysis information calculation unit 122 receives the first converted signal, the second converted signal, and the analysis control information, and outputs the encoded analysis information. The analysis information calculation unit 122 is configured of an inter-signal information calculation unit 200, suppression coefficient calculation units 206 and 207, a gain inverse-conversion unit 203, an analysis information encoding unit 208, and a switch 205. The first converted signal and the second converted signal are inputted into the inter-signal information calculation unit 200 and the switch 205. The analysis control information is inputted into the switch 205, the gain inverse-conversion unit 203, and the analysis information encoding unit 208. Upon making a comparison with the first configuration example of the analysis information calculation unit 122 explained by employing FIG. 8, the suppression coefficient calculation units 201 and 202 are replaced with the suppression coefficient calculation units 206 and 207, and the analysis information encoding unit 204 is replaced with the analysis information encoding unit 208. Each of the inter-signal information calculation unit 200, the gain inverse-conversion unit 203, and the switch 205 is similar to that of FIG. 8, so its explanation is omitted.

The suppression coefficient calculation units 206 and 207 estimate the background sound from the inputted first and second converted signal, respectively, and calculates the suppression coefficient for suppressing the background sound based upon a background sound estimation result, and a objective sound existence probability. The objective sound existence probability is indicative of a degree to which the objective sound is included in the input signal. For example, the objective sound existence probability can be expressed with a ratio of the amplitude or the power of the objective sound and the background sound. As the objective sound existence probability, a ratio of the amplitude or the power of the objective sound and the background sound may be employed. Further, as the objective sound existence probability, a short-time average, a maximum value, a minimum value, and the like of a ratio of the amplitude or the power of the objective sound and the background sound may be employed. Each of the suppression coefficient calculation units 206 and 207 outputs the suppression coefficient to the gain inverse-conversion unit 203, and outputs the objective sound existence probability to the analysis information encoding unit 208. As a method of calculating the suppression coefficient, the technology etc. disclosed in the foregoing Non-patent document 6, Non-patent document 7, and Non-patent document 8 may be employed. As a method of calculating the objective sound existence probability, the technology disclosed in the Patent document 1 may be employed. Additionally, fixed values may be stored in a memory to read out and utilize them one by one instead of calculating the objective sound existence probabilities one by one. Further, when the converted signal is not inputted from the switch 205, the suppression coefficient and the objective sound existence probability may not be outputted, and the suppression coefficient and the objective sound existence probability may be outputted with each defined as one (1).

The analysis information encoding unit 208 encodes the received component element information, analysis control information, and objective sound existence probability, and outputs an encoding result as the encoded analysis information. As the encoding method, a method similar to the method having the content already explained with regard to the quantization unit 112 may be employed. The encoding makes it possible to remove redundancy of the component element information, the analysis control information, and the objective sound existence probability. Further, when the information quantity does not need to be curtailed, the analysis information encoding unit 208 may output the component element information, the analysis control information and the objective sound existence probability as the encoded analysis information without performing these encoding processes.

Figure 14:
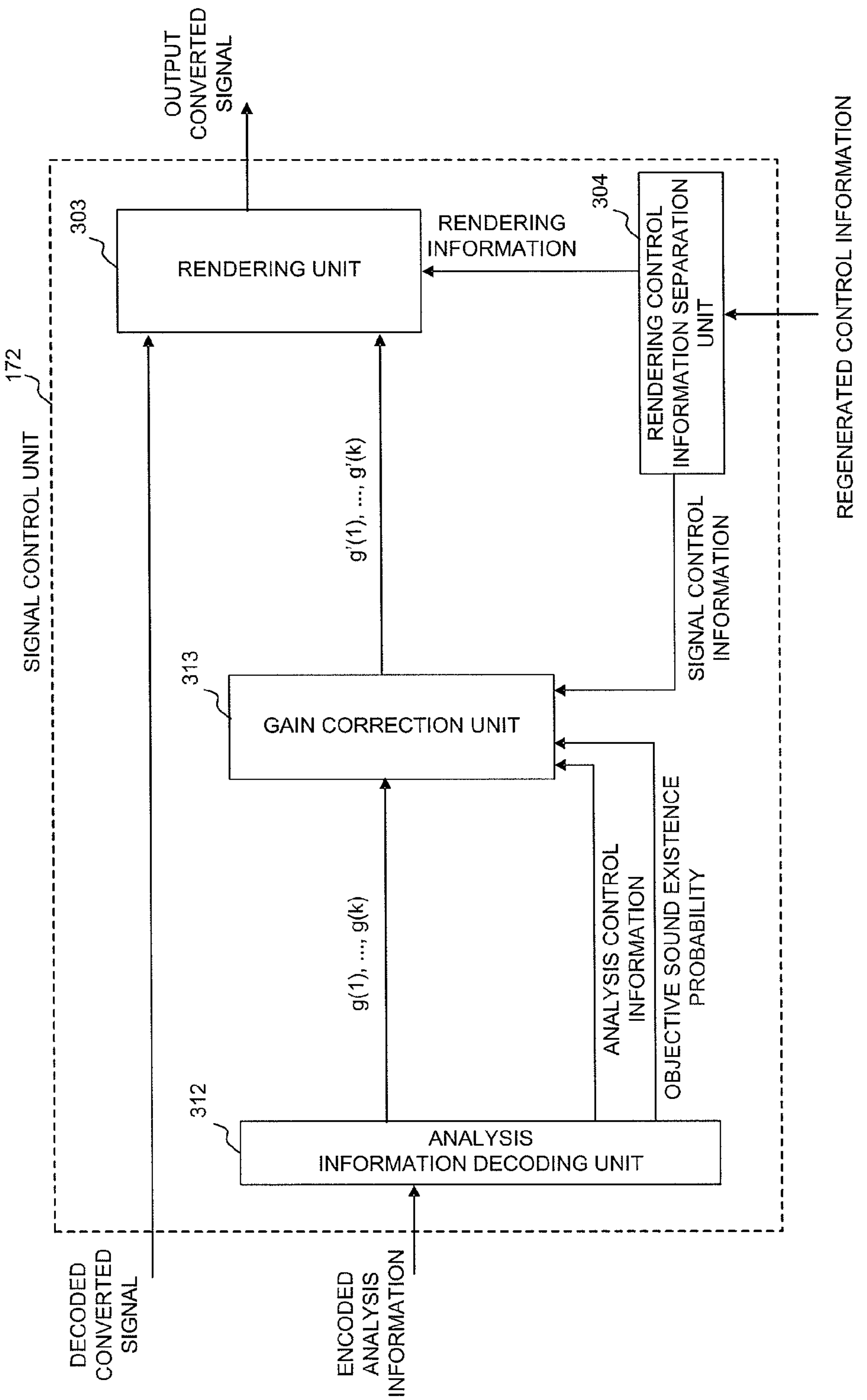
FIG. 14 shows a fifth configuration example of the signal control processing unit 172.

A fifth configuration example of the signal control unit 172 will be explained in details by making a reference to FIG. 14. The signal control unit 172 receives the decoded converted signal, the encoded analysis information, and the regenerated control information, and outputs the output converted signal. The signal control unit 172 is configured of an analysis information decoding unit 312, a gain correction unit 313, a rendering control information separation unit 304, and a rendering unit 303. The decoded converted signal is inputted into the rendering unit 303, the encoded analysis information is inputted into the analysis information decoding unit 312, and the regenerated control information is inputted into the rendering control information separation unit 304. Upon making a comparison with the second configuration example of the signal control unit 172 explained by employing FIG. 10, the fifth configuration example differs in point that the analysis information decoding unit 300 is replaced with the analysis information decoding unit 312, and the gain correction unit 305 is replaced with the gain correction unit 313. Each of the rendering control information separation unit 304 and the rendering unit 303 is similar to that of FIG. 10, so its explanation is omitted.

The analysis information decoding unit 312 decodes the component element information, the analysis control information, and the objective sound existence probability from the received encoded analysis information, and outputs the component element information, the analysis control information, and the objective sound existence probability to the gain correction unit 313. When the component element information, the analysis control information, and the objective sound existence probability have not been encoded, the analysis information decoding unit 312 directly outputs the component element information, the analysis control information, and the objective sound existence probability without performing the decoding process.

The gain correction unit 313 corrects the gain constituting the component element information by employing the received signal control information, analysis control information, and objective sound existence probability, and outputs the component element information including the corrected gain to the rendering unit 303. As a specific example of the gain correction, signal control information A(f) for controlling the objective sound, which is expressed by [Numerical equation 5], may be modified by employing the objective sound existence probability to calculate the corrected gain from the modified signal control information and the gain. This makes it possible to control the gain constituting the component element responding to the objective sound existence probability.

Figure 15:
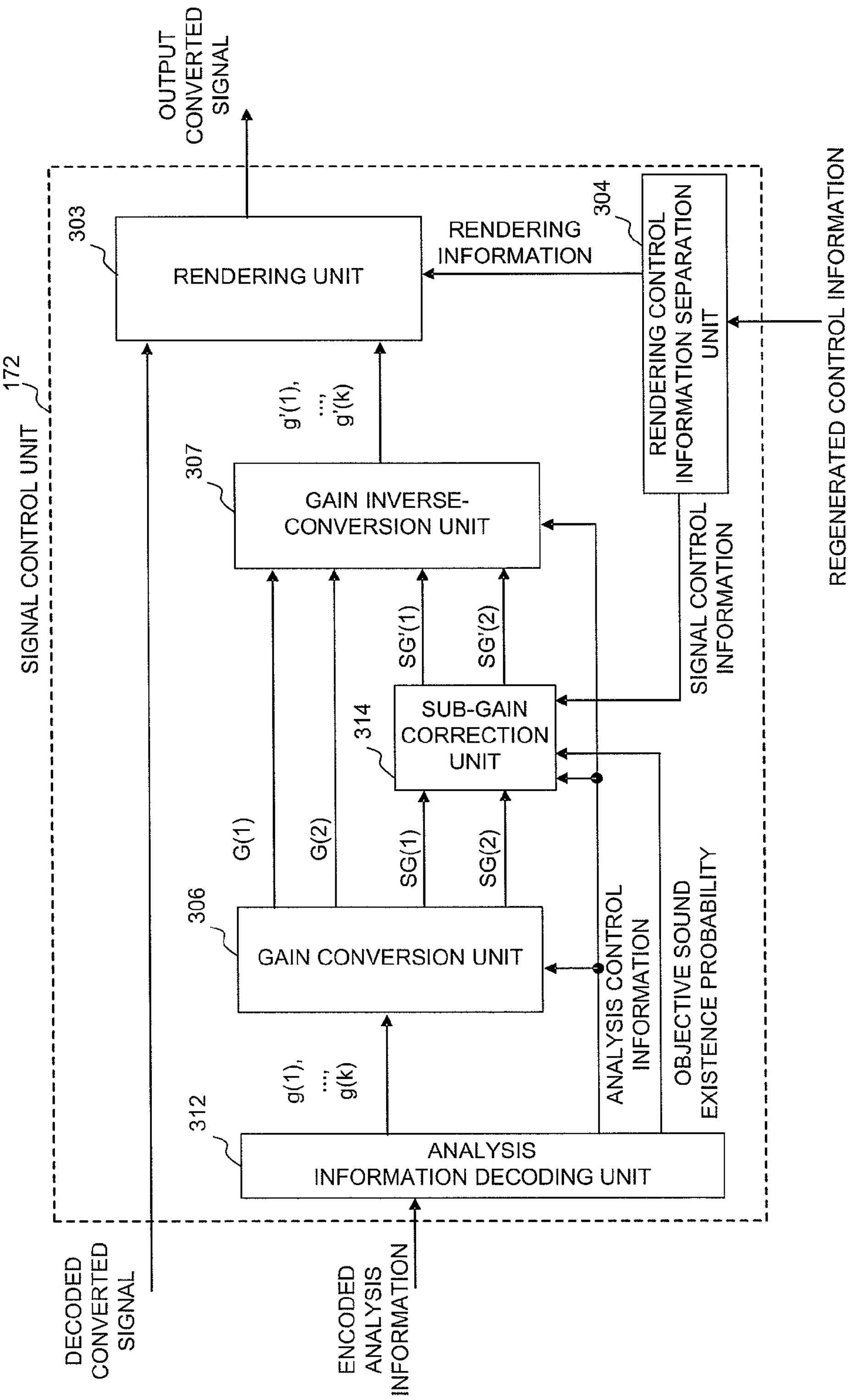
FIG. 15 shows a sixth configuration example of the signal control processing unit 172.

Next, a sixth configuration example of the signal control unit 172 will be explained in details by making a reference to FIG. 15. The signal control unit 172 receives the decoded converted signal, the encoded analysis information, and the regenerated control information, and outputs the output converted signal. The signal control unit 172 is configured of an analysis information decoding unit 312, a rendering unit 303, a rendering control information separation unit 304, a gain conversion unit 306, a gain inverse-conversion unit 307, and a sub-gain correction unit 314. Upon making a comparison with the third configuration example of the signal control unit 172 explained by employing FIG. 11, the sixth configuration example differs in point that the analysis information decoding unit 300 is replaced with the analysis information decoding unit 312, and the sub-gain correction unit 308 is replaced with the sub-gain correction unit 314. Each of the rendering unit 303, the rendering control information separation unit 304, the gain conversion unit 306, and the gain inverse-conversion unit 307 is similar to that of FIG. 11, so its explanation is omitted. Further, the configuration example of the analysis information decoding unit 312 is similar to the fifth configuration example of FIG. 14, so its explanation is omitted. Additionally, the objective sound existence probability, being an output of the analysis information decoding unit 312, is outputted to the sub-gain correction unit 314, the analysis control information is outputted to the gain conversion unit 306, the gain inverse-conversion unit 307, and the sub-gain correction unit 314, and the component element information is outputted to the gain conversion unit 306.

The sub-gain correction unit 314 corrects the suppression coefficient by employing the received signal control information, analysis control information, and objective sound existence probability, and outputs the corrected suppression coefficient to the gain inverse-conversion unit 307. As a specific example of calculating the corrected suppression coefficient, the signal control information for controlling magnitude of the objective sound may be modified by employing the objective sound existence probability to calculate the corrected suppression coefficient SG' (m) as $SG'(m)=B'(m)\times SG(m)$ from the modified signal control information B'(m) and the suppression coefficient SG(m). Where, m is an index of the input signal. The correction founded upon the signal control information is not targeted because the suppression coefficient is not calculated for the first input signal in this example. When the suppression coefficient is calculated also for the first input signal, the suppression coefficient of the first input signal can be corrected likewise. Information such that each input signal has been decomposed into a plurality of the component elements, or the like is derived from the analysis control information.

Figure 16:
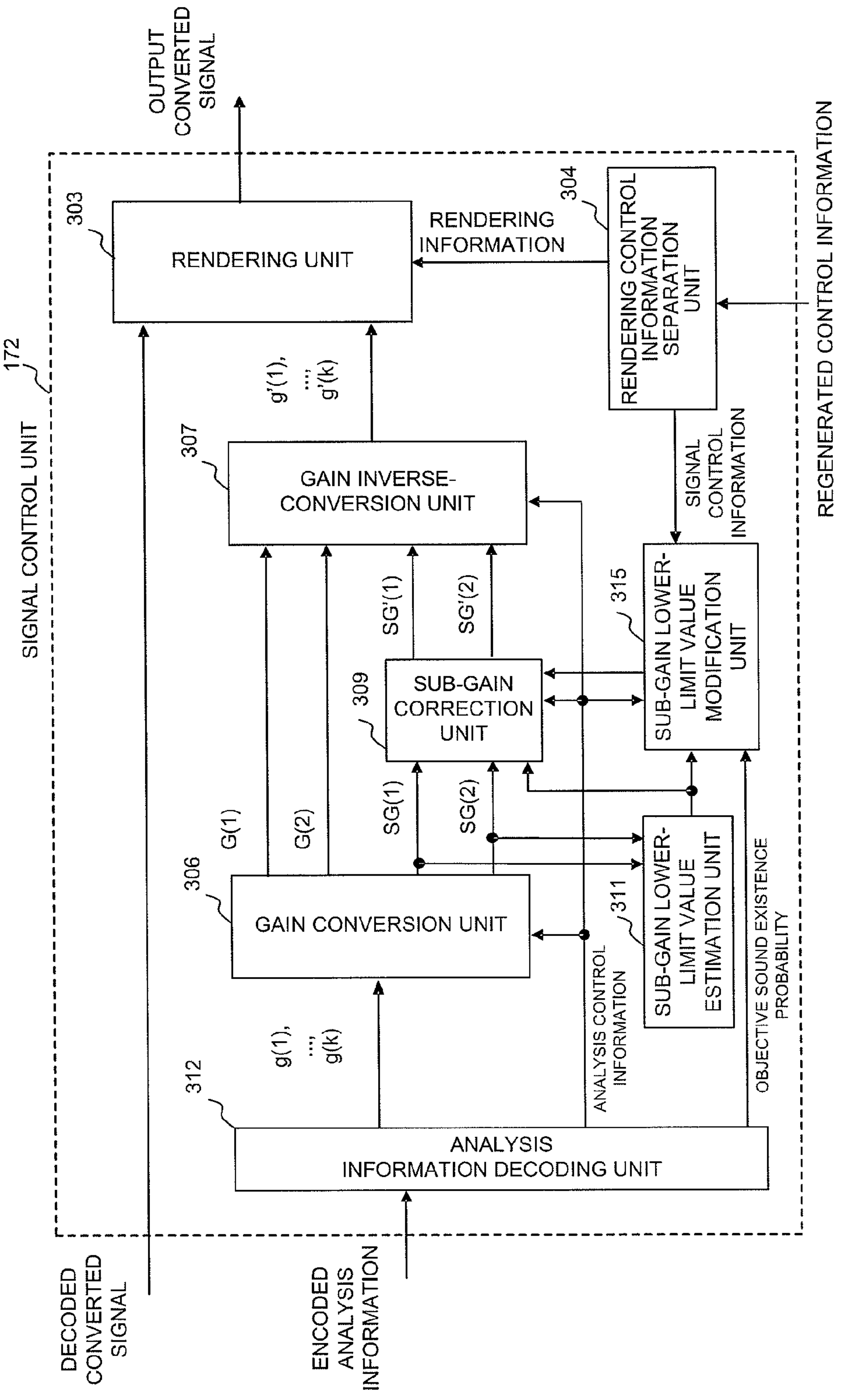
FIG. 16 shows a seventh configuration example of the signal control processing unit 172.

Next, a seventh configuration example of the signal control unit 172 will be explained in details by making a reference to FIG. 16. The signal control unit 172 receives the decoded converted signal, the encoded analysis information, and the regenerated control information, and outputs the output converted signal. The signal control unit 172 is configured of an analysis information decoding unit 312, a rendering unit 303, a rendering control information separation unit 304, a gain conversion unit 306, a gain inverse-conversion unit 307, a sub-gain correction unit 309, and a sub-gain lower-limit value modification unit 315, and a sub-gain lower-limit value estimation unit 311. Upon making a comparison with the fourth configuration example of the signal control unit 172 explained by employing FIG. 12, the seventh configuration example differs in point that the analysis information decoding unit 300 is replaced with the analysis information decoding unit 312, and the sub-gain lower-limit value modification unit 310 is replaced with the sub-gain lower-limit value modification unit 315. Each of the rendering unit 303, the rendering control information separation unit 304, the gain conversion unit 306, the gain inverse-conversion unit 307, the sub-gain correction unit 309, and the sub-gain lower-limit value estimation value 311 is similar to that of FIG. 12, so its explanation is omitted. Further, the configuration example of the analysis information decoding unit 312 is similar to the fifth configuration example of FIG. 14, so its explanation is omitted. Additionally, the objective sound existence probability, being an output of the analysis information decoding unit 312, is outputted to the sub-gain lower-limit value modification unit 315, the analysis control information is outputted to the gain conversion unit 306, the gain inverse-conversion unit 307, the sub-gain correction unit 309, and the sub-gain lower-limit value modification unit 315, and the component element information is outputted to the gain conversion unit 306.

The sub-gain lower-limit value modification unit 315 modifies the coefficient correction lower-limit value by employing the signal control information and the objective sound existence probability, and outputs the modified coefficient correction lower-limit value to the sub-gain correction unit 309. While the sub-gain lower-limit value modification unit 310 of the fourth configuration example modified the coefficient correction lower-limit value with the signal control information, this configuration differs in a point that the coefficient correction lower-limit value is modified with the signal control information and the objective sound existence probability.

As mentioned at the moment of explaining the sub-gain lower-limit value modification unit 310 of the fourth configuration example, modifying the coefficient correction lower-limit value with the signal control information makes it possible to control the trade-off of the residual background sound and magnitude of the distortion of the output signal. In addition, employing the objective sound existence probability enables a control suitable for the signal feature to be taken because the feature of this trade-off differs depending upon a feature of the signal, namely, depending upon whether the main component of the signal is sound or background sound. More specifically, performing the suppression taking precedence of the low distortion in a sound section, and performing the suppression taking precedence of the low residual background sound in a non-sound section based upon the objective sound existence probability enables the small residual background sound in a background sound section and the small distortion of the output signal in the sound section to become compatible with each other.

Figure 38:
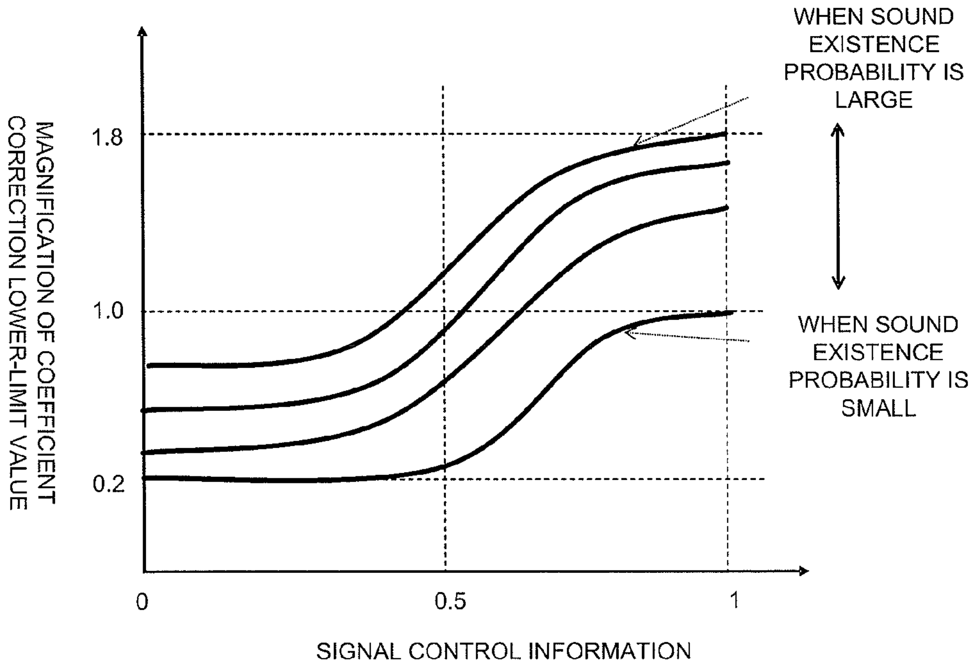
FIG. 38 is view illustrating a relation of a magnification of the coefficient correction lower-limit value to the signal control information and an objective sound existence probability.

In this example, for example, the magnitude of the residual background sound that is permissible as signal control information may be inputted. In this case, a magnification of the coefficient correction lower-limit value is generated from the permissible magnitude of the residual background sound, and the method of generating a magnification of the coefficient correction lower-limit value is switched responding to the objective sound existence probability. And, the coefficient correction lower-limit value may be modified by multiplying the coefficient correction lower-limit value by the generated magnification of the coefficient correction lower-limit value. One example of a relation between a magnification of the coefficient correction lower-limit value to the signal control information in this case is shown in FIG. 38. Upon comparing FIG. 38 with FIG. 36, FIG. 38 differs in a point that a plurality of the features exist responding to the objective sound existence probability. Setting a fixed value to the objective sound existence probability makes FIG. 38 identical to with FIG. 36. That is, the feature of FIG. 38 is one that is obtained by changing the feature of FIG. 36 responding to the objective sound existence probability. In FIG. 38 as well, similarly to FIG. 36, the case that the signal control information is 1 signifies the situation in which the residual background sound is permitted, and thus, the distortion of the output signal becomes minimized. On the other hand, the case that the signal control information is zero signifies the situation in which the distortion of the output signal is permitted, and thus, the residual background sound becomes minimized.

Figure 39:
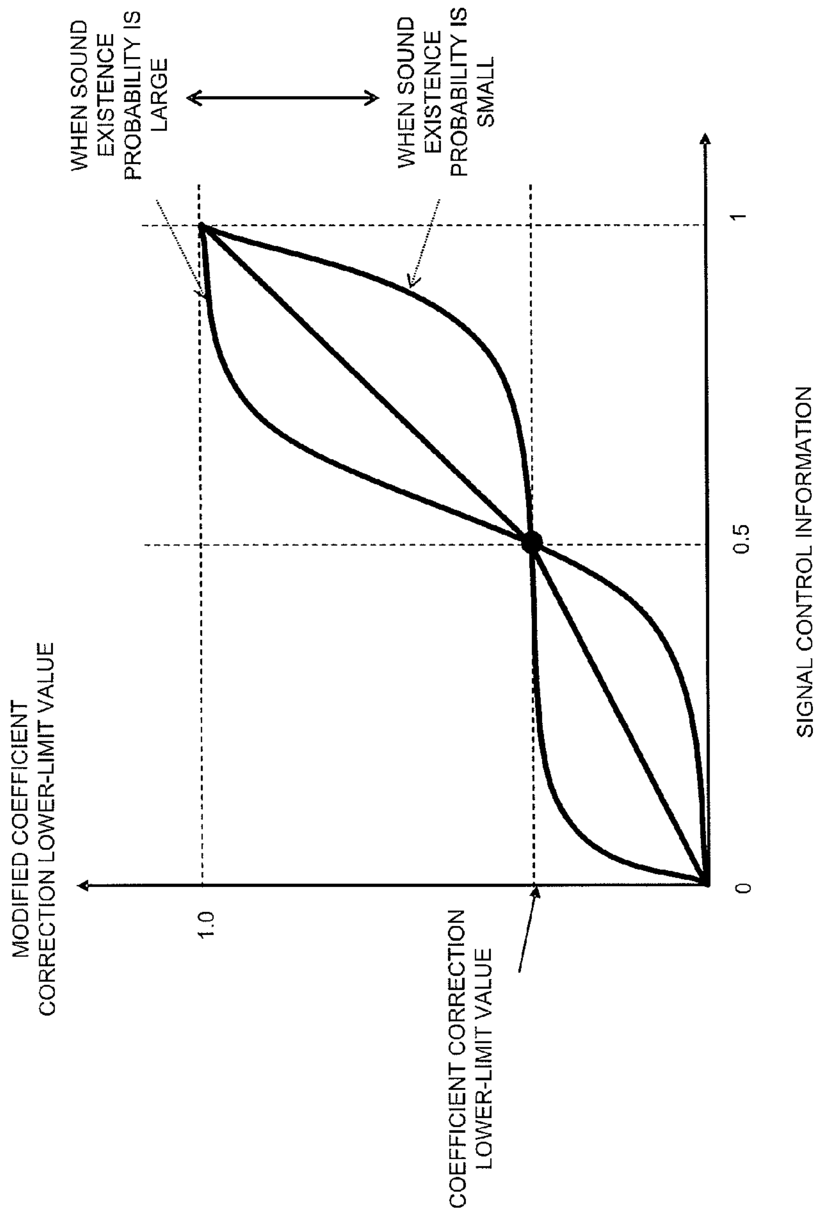
FIG. 39 is view illustrating a relation of the modified coefficient correction lower-limit value to the signal control information and the objective sound existence probability.
Figure 40:
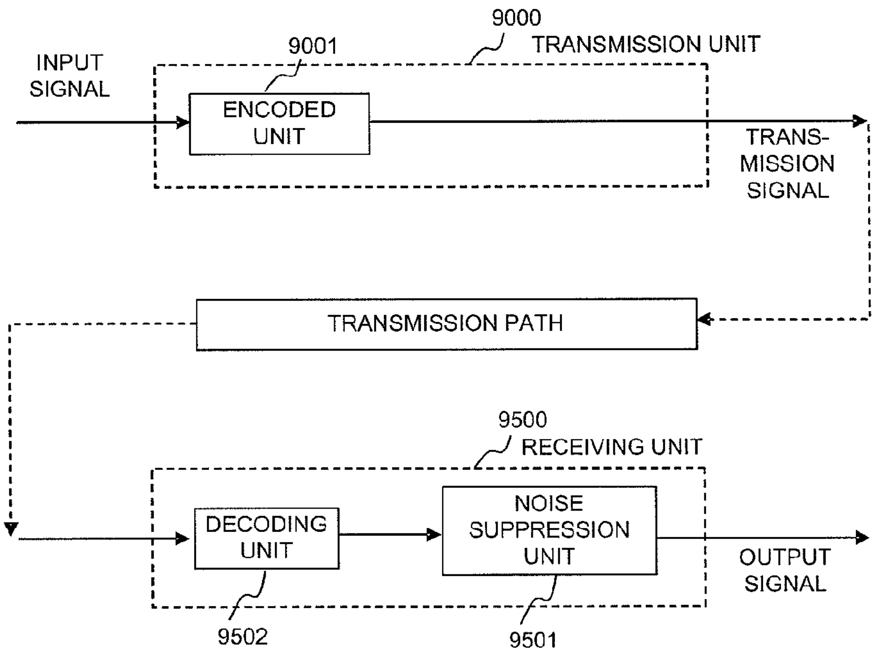
FIG. 40 Prior Art
FIG. 40 is a block diagram illustrating the related examples of the present invention.

As another method related to the modification of the coefficient correction lower-limit value, the coefficient correction lower-limit value may be directly modified for the inputted signal control information without using the magnitude of the coefficient correction lower-limit value. For example, when the magnitude of the residual background sound that is permissible as signal control information is inputted, one example of a relation between the modified coefficient correction lower-limit value to the signal control information is shown in FIG. 39. Upon comparing FIG. 39 with FIG. 37, FIG. 39 differs in a point that a plurality of the features exist responding to the objective sound existence probability. Setting a fixed value to the objective sound existence probability makes FIG. 39 identical to with FIG. 37. That is, the feature of FIG. 39 is one that is obtained by changing the feature of FIG. 37 responding to the objective sound existence probability. In FIG. 39 as well, similarly to FIG. 37, the case that the signal control information is 1 signifies the situation in which the residual background sound is permitted, and thus, the distortion of the output signal becomes minimized. On the other hand, the case that the signal control information is zero signifies the situation in which the distortion of the output signal is permitted, and thus, the residual background sound becomes minimized.

As explained above, the second embodiment of the present invention enables the receiving unit to control the input signal, which is configured of a plurality of the component elements, for each component element based upon the encoded analysis information being outputted from the transmission unit. Further, utilizing information indicative of a relation between the input signal and each component element, which is included in the analysis control information, makes it possible to control each of a plurality of the component elements constituting the input signal independently of the component elements of other input signals also when a plural number of the input signals of the transmission unit exist. In addition, utilizing information associated with the classification of each component element, which is included in the analysis control information, enables a control corresponding to the classification of each component element. For example, when the component elements are the objective sound and the background sound, a control responding to the objective sound can be taken for the objective sound, and a control responding to the background sound can be taken for the background sound. A more desired output signal can be obtained owing to a control corresponding to the classification of each component element. Further, the control suitable for the signal feature, which is obtained by employing the objective sound existence probability, can make the relation between the signal distortion and the residual background sound a desired balanced relation. Employing the objective sound existence probability enables the output signal having a higher quality to be obtained.

Third Embodiment

A third embodiment of the present invention will be explained. Upon comparing the third embodiment with the first embodiment, the former differs from the latter in operations of the analysis information calculation unit 122 and the signal control unit 172. Explanation of the portion which overlaps the first embodiment is omitted.

Figure 17:
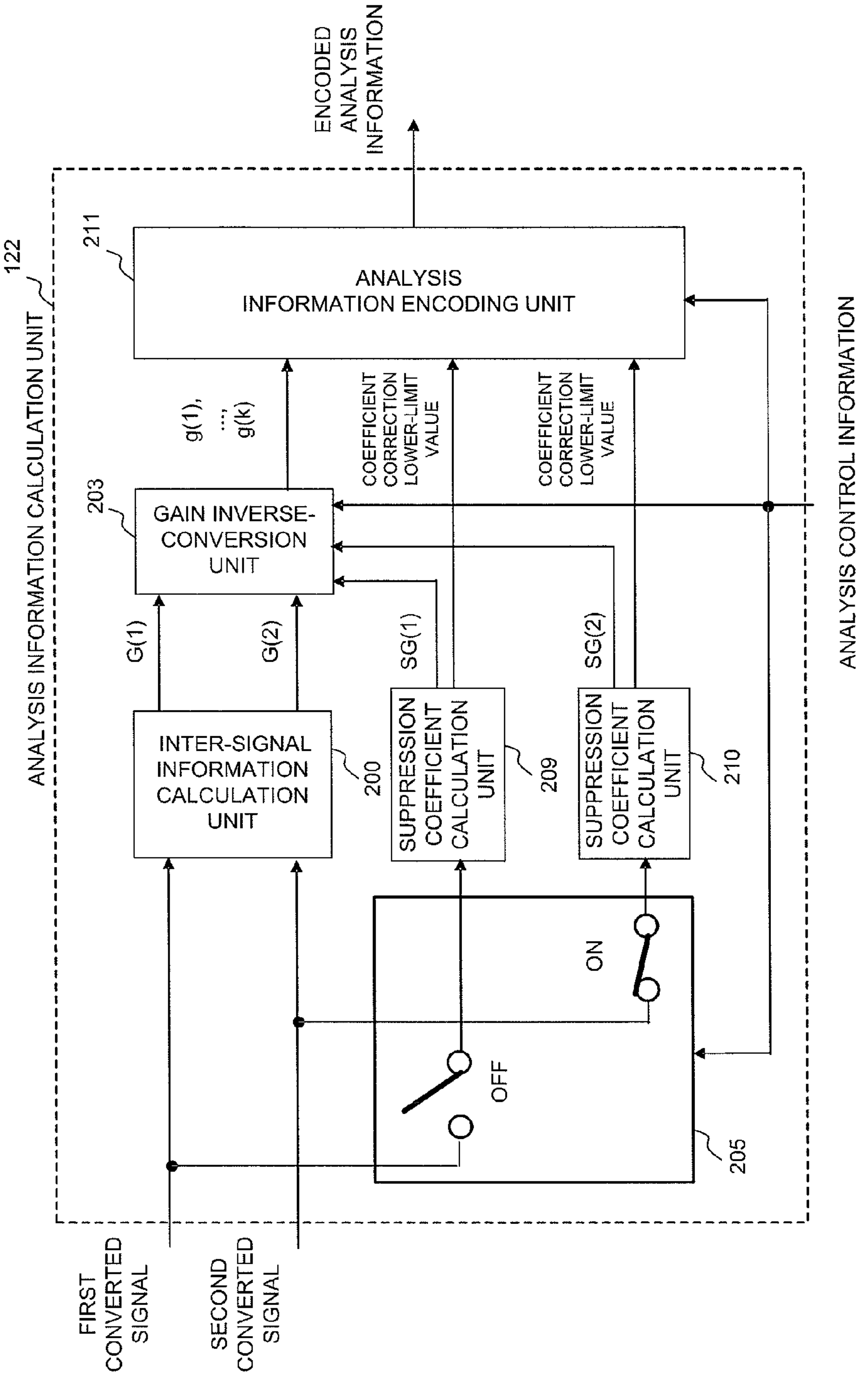
FIG. 17 shows a third configuration example of the analysis information calculation unit 121.

A third configuration example of the analysis information calculation unit 122 will be explained in details by making a reference to FIG. 17. The analysis information calculation unit 122 receives the first converted signal, the second converted signal, and the analysis control information, and outputs the encoded analysis information. The analysis information calculation unit 122 is configured of an inter-signal information calculation unit 200, suppression coefficient calculation units 209 and 210, a gain inverse-conversion unit 203, an analysis information encoding unit 211, and a switch 205. The first converted signal and the second converted signal are inputted into the inter-signal information calculation unit 200 and the switch 205. The analysis control information is inputted into the switch 205, the gain inverse-conversion unit 203, and the analysis information encoding unit 211. Upon making a comparison with the first configuration example of the analysis information calculation unit 122 explained by employing FIG. 8, the suppression coefficient calculation units 201 and 202 are replaced with the suppression coefficient calculation units 209 and 210, and the analysis information encoding unit 204 is replaced with the analysis information encoding unit 211. Each of the inter-signal information calculation unit 200, the gain inverse-conversion unit 203, and the switch 205 is similar to that of FIG. 8, so its explanation is omitted.

The suppression coefficient calculation units 209 and 210 estimate the background sound from the inputted first converted signal and second converted signal, respectively, and calculate the suppression coefficient for suppressing the background sound based upon the background sound estimation result and the correction value for correcting the suppression coefficient. The correction value could be a coefficient correction lower-limit value. Hereinafter, the correction value will be explained as a coefficient correction lower-limit value. Each of the suppression coefficient calculation units 209 and 210 outputs the suppression coefficient to the gain inverse-conversion unit 203, and the coefficient correction lower-limit value to the analysis information encoding unit 211. As a method of calculating the suppression coefficient, the technology etc. disclosed in the foregoing Non-patent document 6, Non-patent document 7, and Non-patent document 8 may be employed. As a method of calculating the coefficient correction lower-limit value, the method disclosed in the Patent document 1 may be employed. Additionally, fixed values may be stored in a memory to read out and utilize them one by one instead of calculating the coefficient correction lower-limit values one by one. Further, when the converted signal is not inputted from the switch 205, the suppression coefficient and the coefficient correction lower-limit value may not be outputted, and the suppression coefficient may be outputted with the suppression coefficient defined as one (1).

The analysis information encoding unit 211 encodes the received component element information, analysis control information, and coefficient correction lower-limit value, and outputs an encoding result as encoded analysis information. As the encoding method, a method similar to the method having the content already explained with regard to the quantization unit 112 may be employed. The encoding makes it possible to remove redundancy of the component element information, the analysis control information, and the coefficient correction lower-limit value. Further, when the information quantity does not need to be curtailed, the analysis information encoding unit 211 may output the component element information, the analysis control information and the coefficient correction lower-limit value as the encoded analysis information without performing these encoding processes.

Figure 18:
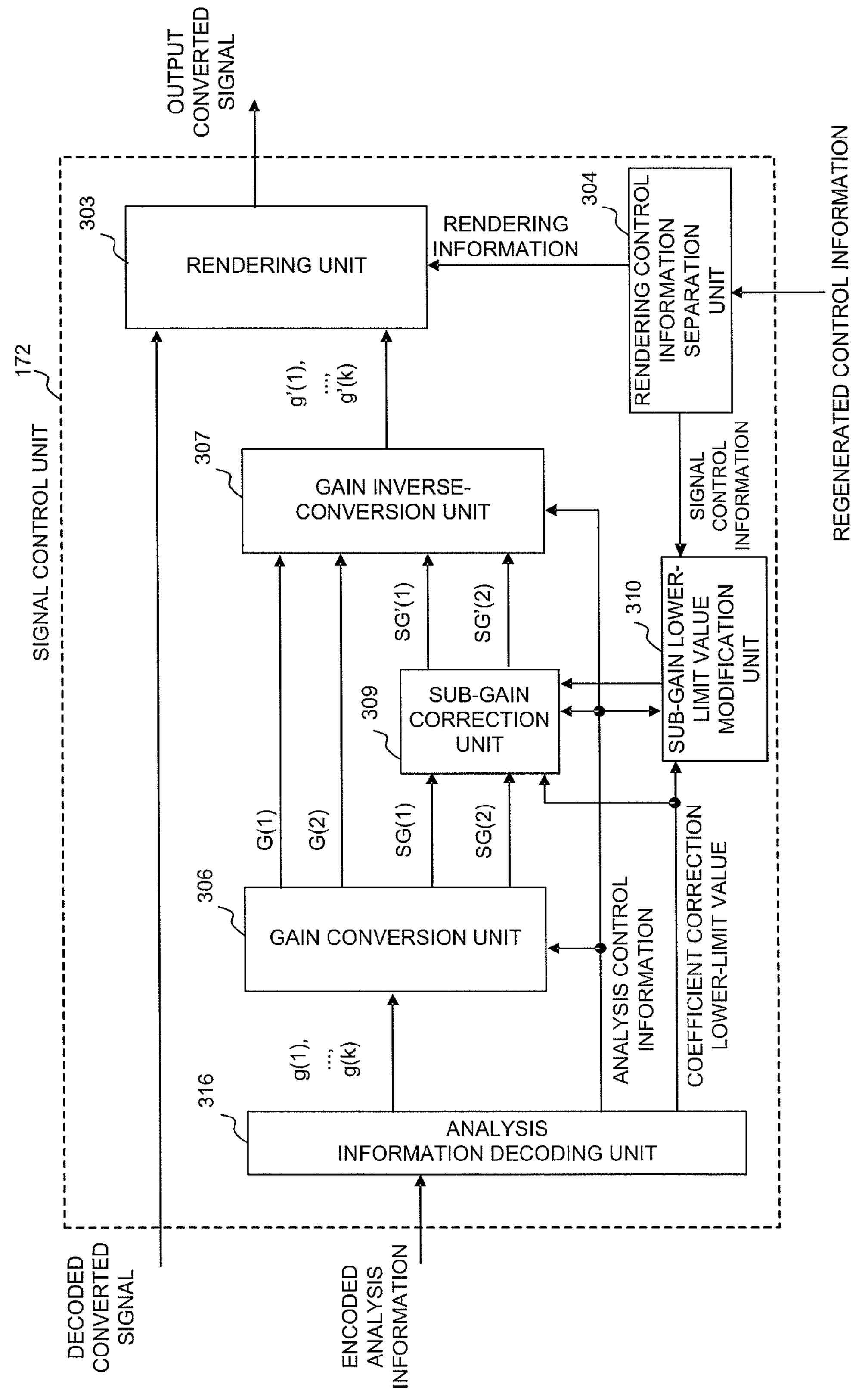
FIG. 18 shows an eighth configuration example of the signal control processing unit 172.

An eighth configuration example of the signal control unit 172 will be explained in details by making a reference to FIG. 18. The signal control unit 172 receives the decoded converted signal, the encoded analysis information, and the regenerated control information, and outputs the output converted signal. The signal control unit 172 is configured of an analysis information decoding unit 316, a rendering unit 303, a rendering control information separation unit 304, a gain conversion unit 306, a gain inverse-conversion unit 307, a sub-gain correction unit 309, and a sub-gain lower-limit value modification unit 310. Upon making a comparison with the fourth configuration example of the signal control unit 172 explained by employing FIG. 12, the eighth configuration example differs in point that the analysis information decoding unit 300 is replaced with the analysis information decoding unit 316, and no sub-gain lower-limit value estimation unit 311 exists. Each of the rendering unit 303, the rendering control information separation unit 304, the gain conversion unit 306, the gain inverse-conversion unit 307, the sub-gain correction unit 309, and the sub-gain lower-limit value modification unit 310 is similar to that of FIG. 12, so its explanation is omitted.

The analysis information decoding unit 316 decodes the component element information, the analysis control information, and the coefficient correction lower-limit value from the received encoded analysis information, and outputs the component element information to the gain conversion unit 306, the coefficient correction lower-limit value to the sub-gain correction unit 309 and the sub-gain lower-limit value modification unit 310, and the analysis control information to the gain conversion unit 306, the gain inverse-conversion unit 307, the sub-gain correction unit 309, and the sub-gain lower-limit value modification unit 310. When the component element information, the analysis control information, and the coefficient correction lower-limit value have not been encoded, the analysis information decoding unit 316 directly outputs the component element information, the analysis control information, and the coefficient correction lower-limit value without performing the decoding process.

As explained above, the third embodiment of the present invention enables the receiving unit to control the input signal, which is configured of a plurality of the component elements, for each component element based upon the encoded analysis information being outputted from the transmission unit. In addition, the receiving unit can curtail the arithmetic quantity relating to the signal analysis because the transmission unit analyzes the signal. Further, utilizing information indicative of a relation between the input signal and each component element, which is included in the analysis control information, makes it possible to control each of a plurality of the component elements constituting the input signal independently of the component elements of other input signals also when a plural number of the input signals of the transmission unit exist.

Fourth Embodiment

A fourth embodiment of the present invention will be explained. Upon comparing the fourth embodiment with the first embodiment, the former differs from the latter in operations of the analysis information calculation unit 122 and the signal control unit 172. Explanation of the portion which overlaps the first embodiment is omitted.

Figure 19:
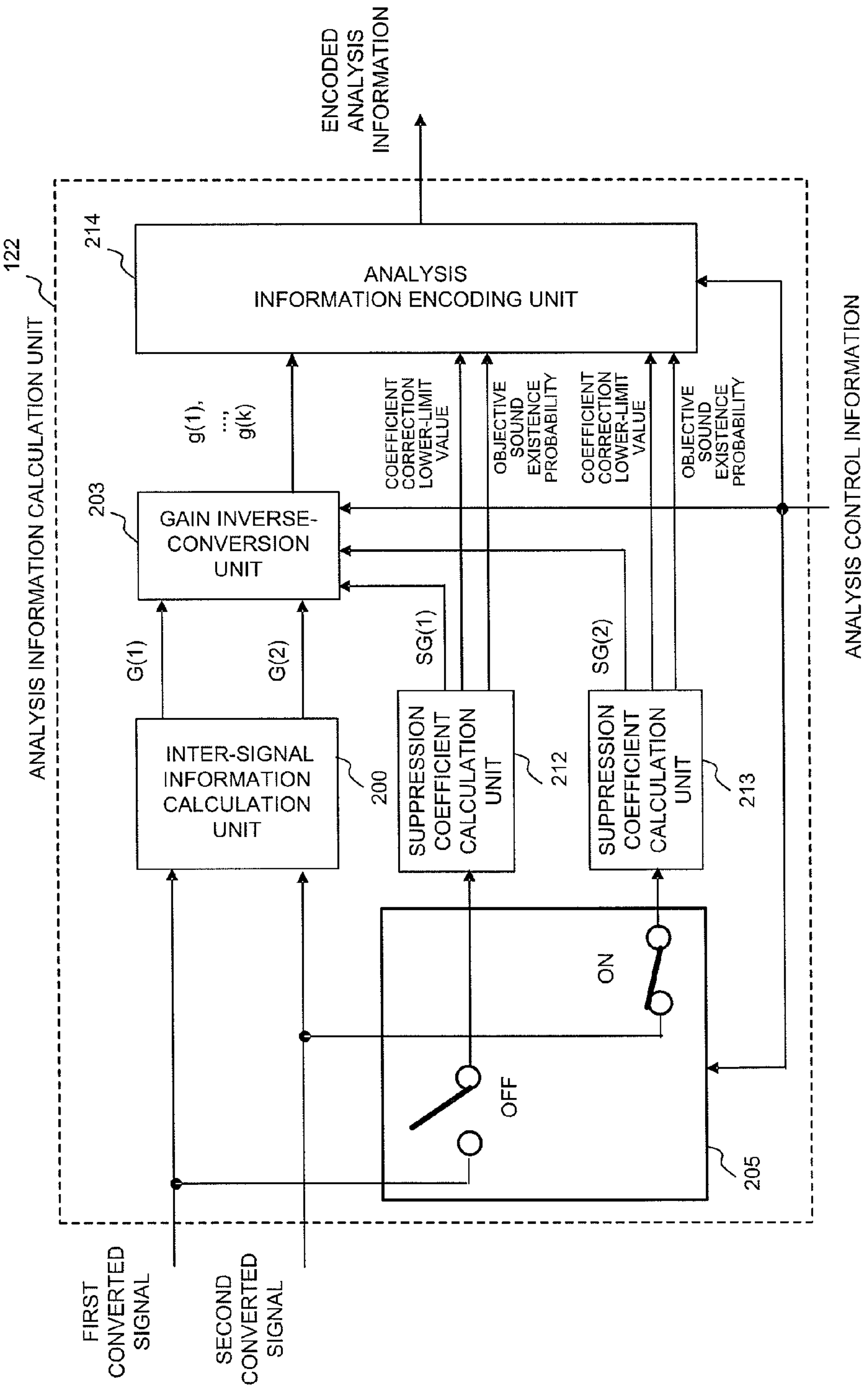
FIG. 19 shows a fourth configuration example of the analysis information calculation unit 121.

A fourth configuration example of the analysis information calculation unit 122 will be explained in details by making a reference to FIG. 19. The analysis information calculation unit 122 receives the first converted signal, the second converted signal, and the analysis control information, and outputs the encoded analysis information. The analysis information calculation unit 122 is configured of an inter-signal information calculation unit 200, suppression coefficient calculation units 212 and 213, a gain inverse-conversion unit 203, an analysis information encoding unit 214, and a switch 205. The first converted signal and the second converted signal are inputted into the inter-signal information calculation unit 200 and the switch 205. The analysis control information is inputted into the switch 205, the gain inverse-conversion unit 203, and the analysis information encoding unit 214. Upon making a comparison with the first configuration example of the analysis information calculation unit 122 explained by employing FIG. 8, the suppression coefficient calculation units 201 and 202 are replaced with the suppression coefficient calculation units 212 and 213, and the analysis information encoding unit 204 is replaced with the analysis information encoding unit 214. Each of the inter-signal information calculation unit 200, the gain inverse-conversion unit 203, and the switch 205 is similar to that of FIG. 8, so its explanation is omitted.

The suppression coefficient calculation units 212 and 213 estimate the background sound from the inputted first converted signal and second converted signal, respectively, and calculate the suppression coefficient for suppressing the background sound based upon the background sound estimation result, the objective sound existence probability, and the correction value for correcting the suppression coefficient. The correction value could be a coefficient correction lower-limit value. Hereinafter, the correction value will be explained as a coefficient correction lower-limit value. Each of the suppression coefficient calculation units 212 and 213 outputs the suppression coefficient to the gain inverse-conversion unit 203, and the objective sound existence probability and the coefficient correction lower-limit value to the analysis information encoding unit 214. As a method of calculating the suppression coefficient, the technology etc. disclosed in the foregoing Non-patent document 6, Non-patent document 7, and Non-patent document 8 may be employed. As a method of calculating the objective sound existence probability and the coefficient correction lower-limit value, the method disclosed in the Patent document 1 may be employed. Additionally, fixed values may be stored in a memory to read out and utilize them one by one instead of calculating the objective sound existence probabilities and the coefficient correction lower-limit values one by one. Further, when the converted signal is not inputted from the switch 205, the suppression coefficient, the objective sound existence probability, and the coefficient correction lower-limit value may not be outputted, and the suppression coefficient and the objective sound existence probability may be outputted with each defined as one (1).

The analysis information encoding unit 214 encodes the received component element information, analysis control information, objective sound existence probability, and coefficient correction lower-limit value, and outputs an encoding result as the encoded analysis information. As the encoding method, a method similar to the method having the content already explained with regard to the quantization unit 112 may be employed. The encoding makes it possible to remove redundancy of the component element information, the analysis control information, the objective sound existence probability, and the coefficient correction lower-limit value. Further, when the information quantity does not need to be curtailed, the analysis information encoding unit 214 may output the component element information, the analysis control information, the objective sound existence probability, and the coefficient correction lower-limit value as the encoded analysis information without performing these encoding processes.

Figure 20:
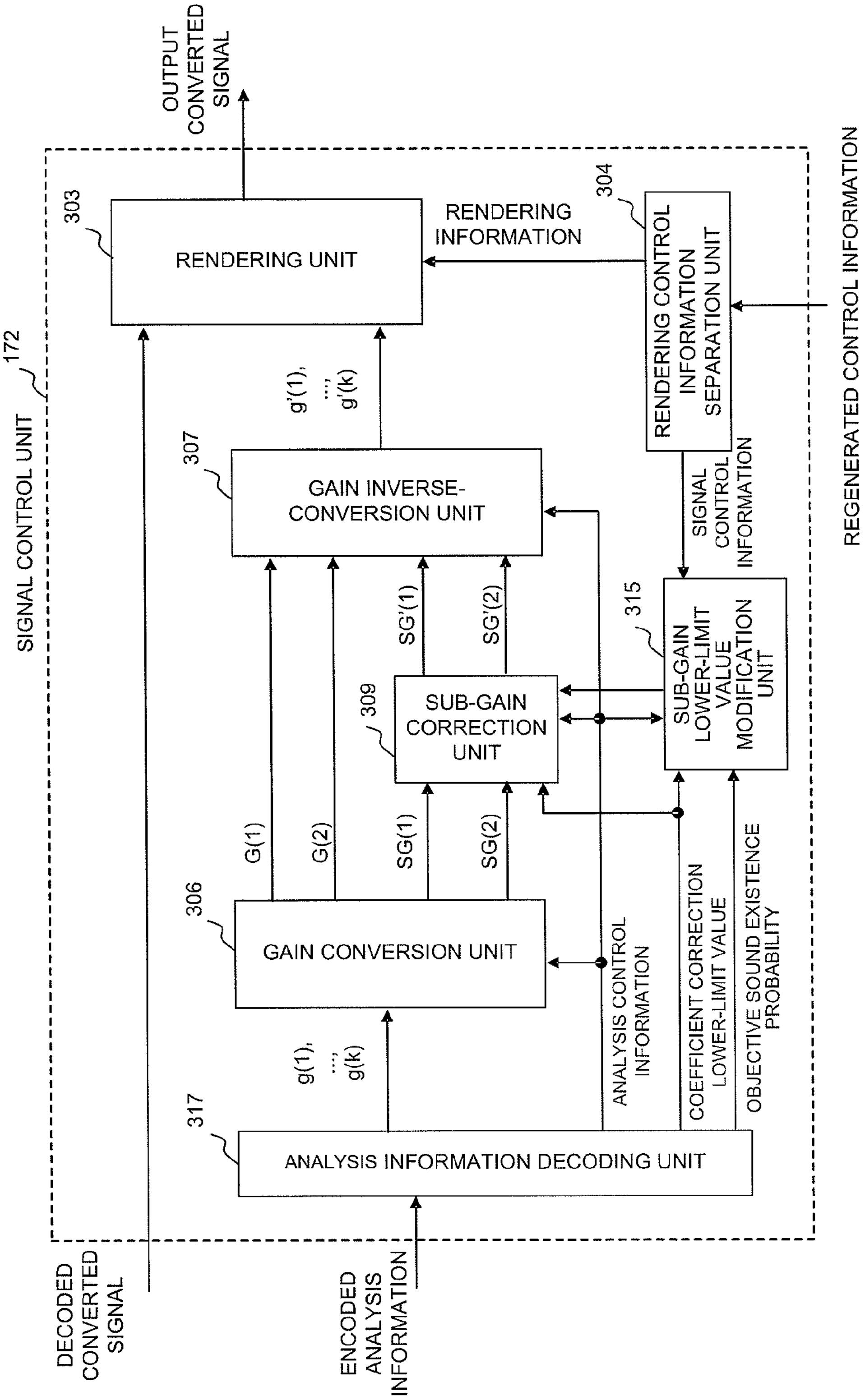
FIG. 20 shows a ninth configuration example of the signal control processing unit 172.

A ninth configuration example of the signal control unit 172 will be explained in details by making a reference to FIG. 20. The signal control unit 172 receives the decoded converted signal, the encoded analysis information, and the regenerated control information, and outputs the output converted signal. The signal control unit 172 is configured of an analysis information decoding unit 317, a rendering unit 303, a rendering control information separation unit 304, a gain conversion unit 306, a gain inverse-conversion unit 307, a sub-gain correction unit 309, and a sub-gain lower-limit value modification unit 315. Upon making a comparison with the seventh configuration example of the signal control unit 172 explained by employing FIG. 16, the ninth configuration example differs in point that the analysis information decoding unit 312 is replaced with the analysis information decoding unit 317, and no sub-gain lower-limit value estimation unit 311 exists. Each of the rendering unit 303, the rendering control information separation unit 304, the gain conversion unit 306, the gain inverse-conversion unit 307, the sub-gain correction unit 309, and the sub-gain lower-limit value modification unit 315 is similar to that of FIG. 16, so its explanation is omitted.

The analysis information decoding unit 317 decodes the component element information, the analysis control information, the objective sound existence probability, and the coefficient correction lower-limit value from the received encoded analysis information, and outputs the component element information to the gain conversion unit 306, the objective sound existence probability to the sub-gain lower-limit value modification unit 315, the coefficient correction lower-limit value to the sub-gain correction unit 309 and the sub-gain lower-limit value modification unit 315, and the analysis control information to the gain conversion unit 306, the gain inverse-conversion unit 307, the sub-gain correction unit 309, and the sub-gain lower-limit value modification unit 315. When the component element information, the analysis control information, the objective sound existence probability, and the coefficient correction lower-limit value have not been encoded, the analysis information decoding unit 317 directly outputs the component element information, the analysis control information, the objective sound existence probability, and the coefficient correction lower-limit value without performing the decoding process.

As explained above, the fourth embodiment of the present invention enables the receiving unit to control the input signal, which is configured of a plurality of the component elements, for each component element based upon the encoded analysis information being outputted from the transmission unit. In addition, the receiving unit can curtail the arithmetic quantity relating to the signal analysis because the transmission unit analyzes the signal. Further, utilizing information indicative of a relation between the input signal and each component element, which is included in the analysis control information, makes it possible to control each of a plurality of the component elements constituting the input signal independently of the component elements of other input signals also when a plural number of the input signals of the transmission unit exist. In addition, utilizing information associated with the classification of each component element, which is included in the analysis control information, enables a control corresponding to the classification of each component element. For example, when the component elements are the objective sound and the background sound, a control responding to the objective sound can be taken for the objective sound, and a control responding to the background sound can be taken for the background sound. A more desired output signal can be obtained owing to a control corresponding to the classification of each component element. Further, the control suitable for the signal feature, which is obtained by employing the objective sound existence probability, can make the relation between the signal distortion and the residual background sound a desired balanced relation. Employing the objective sound existence probability enables the output signal having a higher quality to be obtained.

Fifth Embodiment

A fifth embodiment of the present invention will be explained. Upon comparing the fifth embodiment with the first embodiment, the former differs from the latter in operations of the analysis information calculation unit 122 and the signal control unit 172. Explanation of the portion which overlaps the first embodiment is omitted. This embodiment is characterized in differing in a configuration of the encoded analysis information as compared with the first embodiment.

Figure 21:
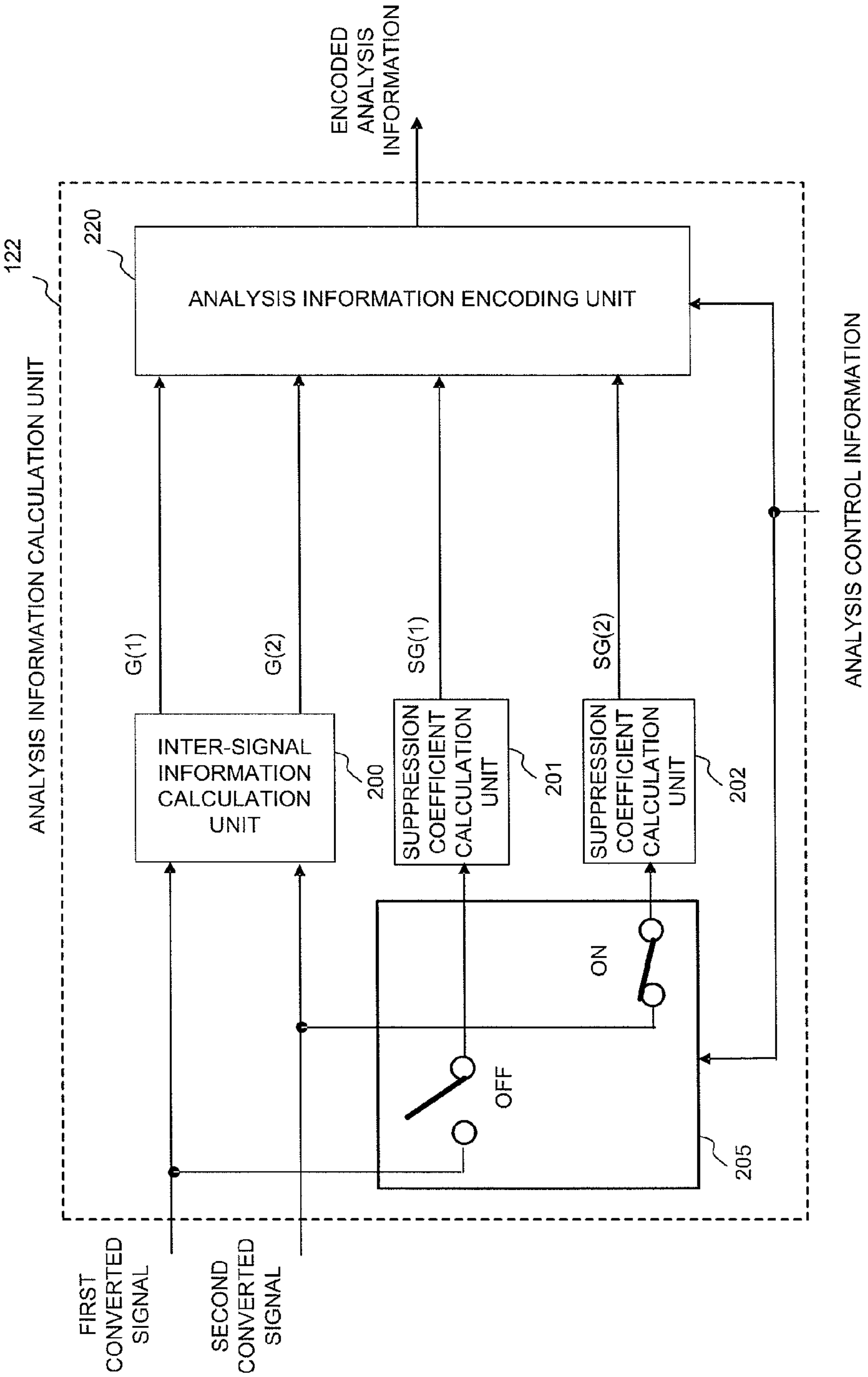
FIG. 21 shows a fifth configuration example of the analysis information calculation unit 121.

A fifth configuration example of the analysis information calculation unit 122 will be explained in details by making a reference to FIG. 21. The analysis information calculation unit 122 receives the first converted signal, the second converted signal, and the analysis control information, and outputs the encoded analysis information. The analysis information calculation unit 122 is configured of an inter-signal information calculation unit 200, suppression coefficient calculation units 201 and 202, an analysis information encoding unit 220, and a switch 205. The first converted signal and the second converted signal are inputted into the inter-signal information calculation unit 200 and the switch 205. The analysis control information is inputted into the switch 205 and the analysis information encoding unit 220. Upon making a comparison with the first configuration example of the analysis information calculation unit 122 explained by employing FIG. 8, the analysis information encoding unit 204 is replaced with the analysis information encoding unit 220, and no gain inverse-conversion unit 203 exists. Each of the inter-signal information calculation unit 200, the suppression coefficient calculation units 201 and 202, and the switch 205 is similar to that of FIG. 8, so its explanation is omitted. Additionally, the inter-signal information, being an output of the inter-signal information calculation unit 200, and the suppression coefficient, being output of the suppression coefficient calculation units 201 and 202, are outputted to the analysis information encoding unit 220.

The analysis information encoding unit 220 encodes the received inter-signal information, analysis control information, and suppression coefficient, and outputs an encoding result as the encoded analysis information. As the encoding method, a method similar to the method having the content already explained with regard to the quantization unit 112 may be employed. The encoding makes it possible to remove redundancy of the inter-signal information, the analysis control information, and the suppression coefficient. Further, when the information quantity does not need to be curtailed, the analysis information encoding unit 220 may output the inter-signal information, the analysis control information, and the suppression coefficient as the encoded analysis information without performing these encoding processes.

Figure 22:
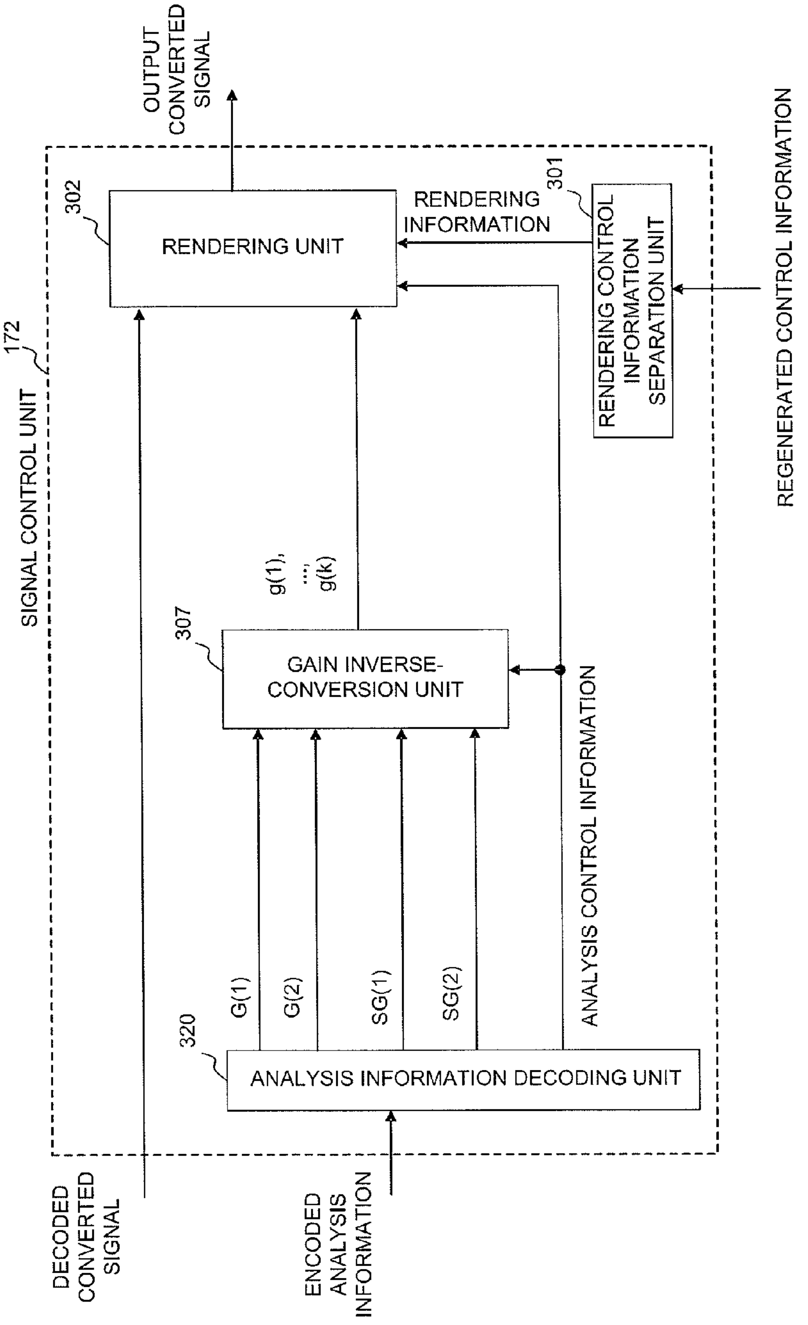
FIG. 22 shows a tenth configuration example of the signal control processing unit 172.

A tenth configuration example of the signal control unit 172 will be explained in details by making a reference to FIG. 22. The signal control unit 172 receives the decoded converted signal, the encoded analysis information, and the regenerated control information, and outputs the output converted signal. The signal control unit 172 is configured of an analysis information decoding unit 320, a rendering unit 302, a rendering control information separation unit 301, and a gain inverse-conversion unit 307. Upon making a comparison with the first configuration example of the signal control unit 172 explained by employing FIG. 9, the tenth configuration example differs in point that the analysis information decoding unit 300 is replaced with the analysis information decoding unit 320, and the gain inverse-conversion unit 307 is added. Each of the rendering unit 302 and the rendering control information separation unit 301 is similar to that of FIG. 9, so its explanation is omitted. Further, the gain inverse-conversion unit 307 is similar to that of FIG. 11, so its explanation is omitted.

The analysis information decoding unit 320 decodes the inter-signal information, the analysis control information, and the suppression correction from the received encoded analysis information, and outputs the inter-signal information and the suppression correction to the gain inverse-conversion unit 307, and the analysis control information to the gain inverse-conversion unit 307 and the rendering unit 302. When the inter-signal information, the analysis control information, and the suppression correction have not been encoded, the analysis information decoding unit 320 directly outputs the inter-signal information, the analysis control information, and the suppression correction without performing the decoding process.

Figure 23:
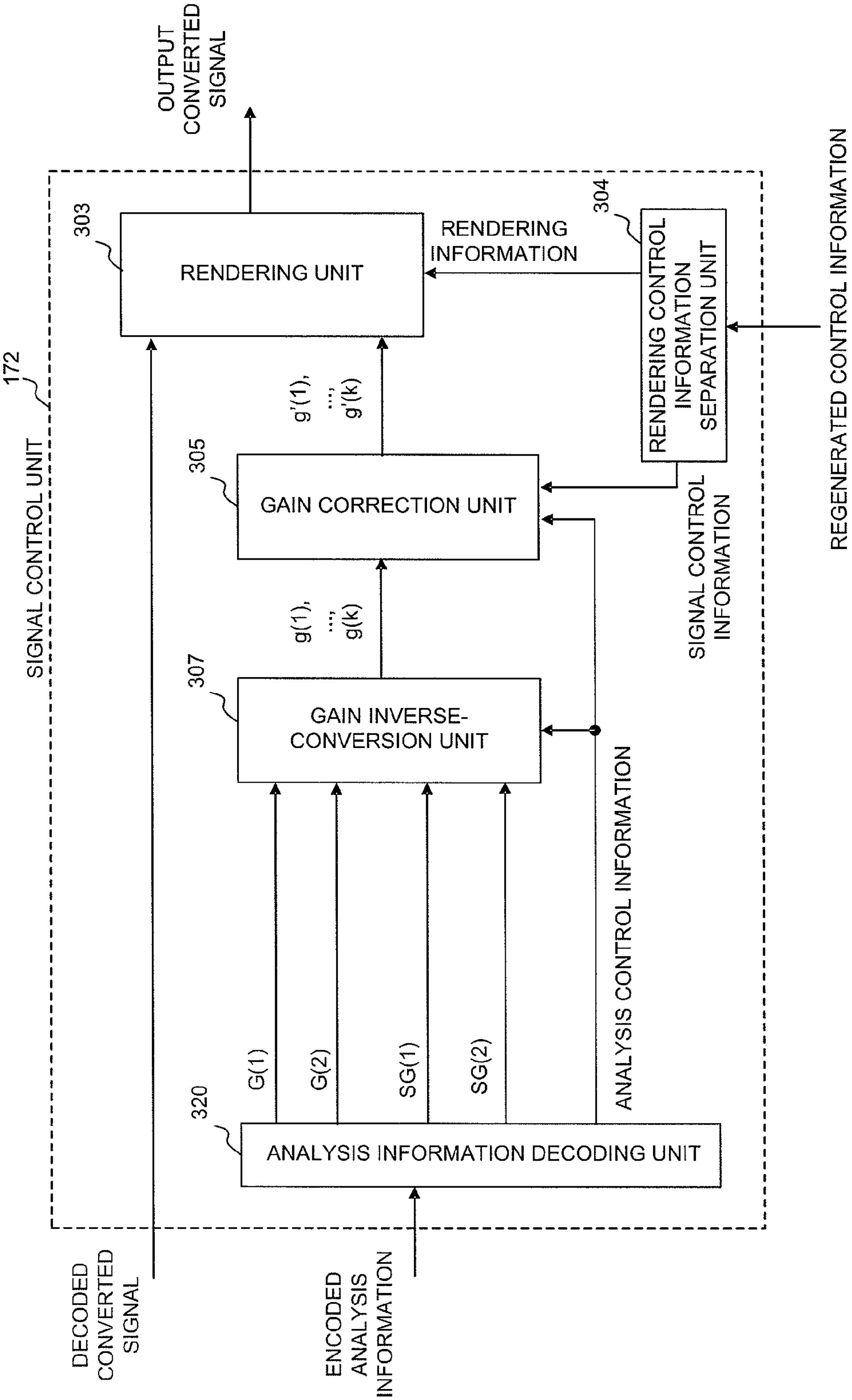
FIG. 23 shows an eleventh configuration example of the signal control processing unit 172.

Next, an eleventh configuration example of the signal control unit 172 will be explained in details by making a reference to FIG. 23. The signal control unit 172 receives the decoded converted signal, the encoded analysis information, and the regenerated control information, and outputs the output converted signal. The signal control unit 172 is configured of an analysis information decoding unit 320, a rendering unit 303, a rendering control information separation unit 304, a gain inverse-conversion unit 307, and a gain correction unit 305. Upon making a comparison with the second configuration example of the signal control unit 172 explained by employing FIG. 10, the eleventh configuration example differs in point that the analysis information decoding unit 300 is replaced with the analysis information decoding unit 320, and the gain inverse-conversion unit 307 is added. Each of the rendering unit 303, the rendering control information separation unit 304, and the gain correction unit 305 is similar to that of FIG. 10, so its explanation is omitted. Further, each of the analysis information decoding unit 320 and the gain inverse-conversion unit 307 is similar to that of FIG. 22, so its explanation is omitted. Additionally, the analysis control information, being an output of the analysis information decoding unit 320, is outputted to the gain inverse-conversion unit 307 and the gain correction unit 305.

Figure 24:
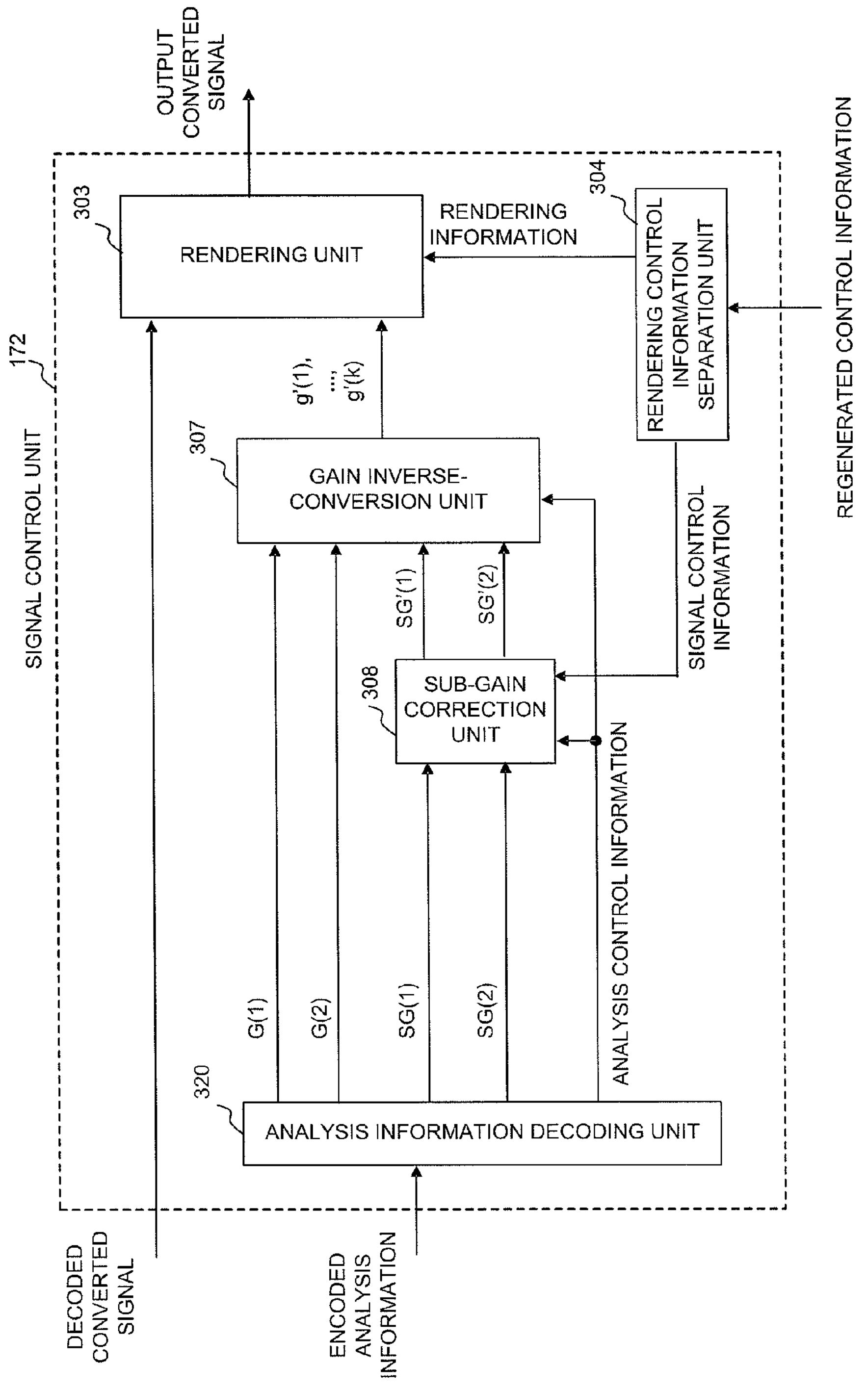
FIG. 24 shows a twelfth configuration example of the signal control processing unit 172.

Next, a twelfth configuration example of the signal control unit 172 will be explained in details by making a reference to FIG. 24. The signal control unit 172 receives the decoded converted signal, the encoded analysis information, and the regenerated control information, and outputs the output converted signal. The signal control unit 172 is configured of an analysis information decoding unit 320, a rendering unit 303, a rendering control information separation unit 304, a gain inverse-conversion unit 307, and a sub-gain correction unit 308. Upon making a comparison with the third configuration example of the signal control unit 172 explained by employing FIG. 11, the twelfth configuration example differs in point that the analysis information decoding unit 300 is replaced with the analysis information decoding unit 320, and no gain conversion unit 306 exists. Each of the rendering unit 303, the rendering control information separation unit 304, the gain inverse-conversion unit 307, and the sub-gain correction unit 308 is similar to that of FIG. 11, so its explanation is omitted. Further, the analysis information decoding unit 320 is similar to that of FIG. 22, so its explanation is omitted. Additionally, the analysis control information, being an output of the analysis information decoding unit 320, is outputted to the gain inverse-conversion unit 307 and the sub-gain correction unit 308.

Figure 25:
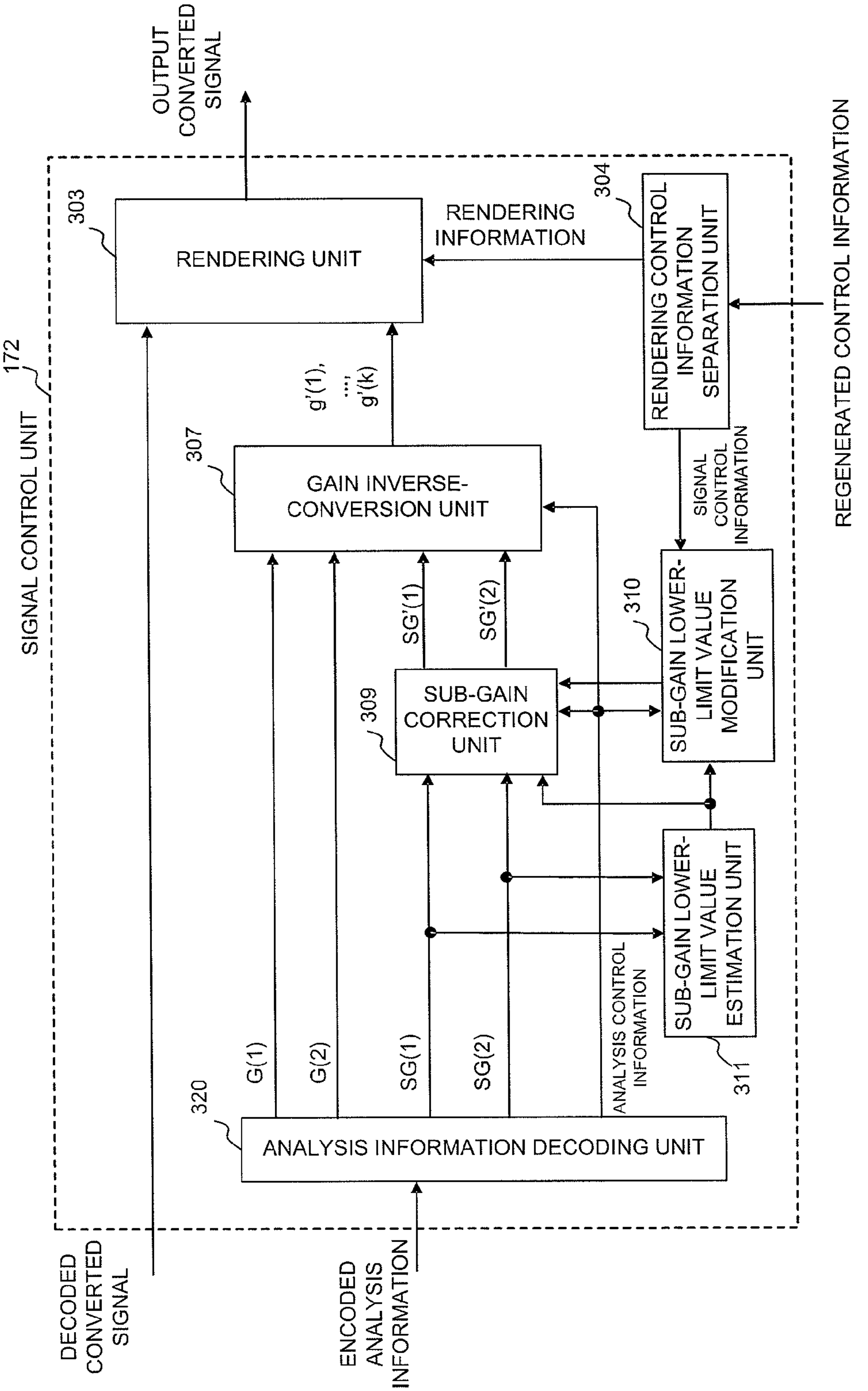
FIG. 25 shows a thirteenth configuration example of the signal control processing unit 172.

Next, a thirteenth configuration example of the signal control unit 172 will be explained in details by making a reference to FIG. 25. The signal control unit 172 receives the decoded converted signal, the encoded analysis information, and the regenerated control information, and outputs the output converted signal. The signal control unit 172 is configured of an analysis information decoding unit 320, a rendering unit 303, a rendering control information separation unit 304, a gain inverse-conversion unit 307, a sub-gain correction unit 309, a sub-gain lower-limit value modification unit 310, and a sub-gain lower-limit value estimation unit 311. Upon making a comparison with the fourth configuration example of the signal control unit 172 explained by employing FIG. 12, the thirteenth configuration example differs in point that the analysis information decoding unit 300 is replaced with the analysis information decoding unit 320, and no gain conversion unit 306 exists. Each of the rendering unit 303, the rendering control information separation unit 304, the gain inverse-conversion unit 307, the sub-gain correction unit 309, the sub-gain lower-limit value modification unit 310, and the sub-gain lower-limit value estimation unit 311 is similar to that of FIG. 12, so its explanation is omitted. Further, the analysis information decoding unit 320 is similar to that of FIG. 22, so its explanation is omitted. Additionally, the analysis control information, being an output of the analysis information decoding unit 320, is outputted to the gain inverse-conversion unit 307, the sub-gain correction unit 309, and the sub-gain lower-limit value modification unit 310, and the suppression coefficient is outputted to the sub-gain lower-limit value estimation unit 311.

As explained above, the fifth embodiment of the present invention enables the receiving unit to control the input signal, which is configured of a plurality of the component elements, for each component element based upon the encoded analysis information being outputted from the transmission unit. In addition, the receiving unit can curtail the arithmetic quantity relating to the signal analysis because the transmission unit analyzes the signal. Further, utilizing information indicative of a relation between the input signal and each component element, which is included in the analysis control information, makes it possible to control each of a plurality of the component elements constituting the input signal independently of the component elements of other input signals also when a plural number of the input signals of the transmission unit exist.

Sixth Embodiment

A sixth embodiment of the present invention will be explained. Upon comparing the sixth embodiment with the second embodiment, the former differs from the latter in operations of the analysis information calculation unit 122 and the signal control unit 172. Explanation of the portion which overlaps the second embodiment is omitted. This embodiment is characterized in differing in a configuration of the encoded analysis information as compared with the second embodiment.

Figure 26:
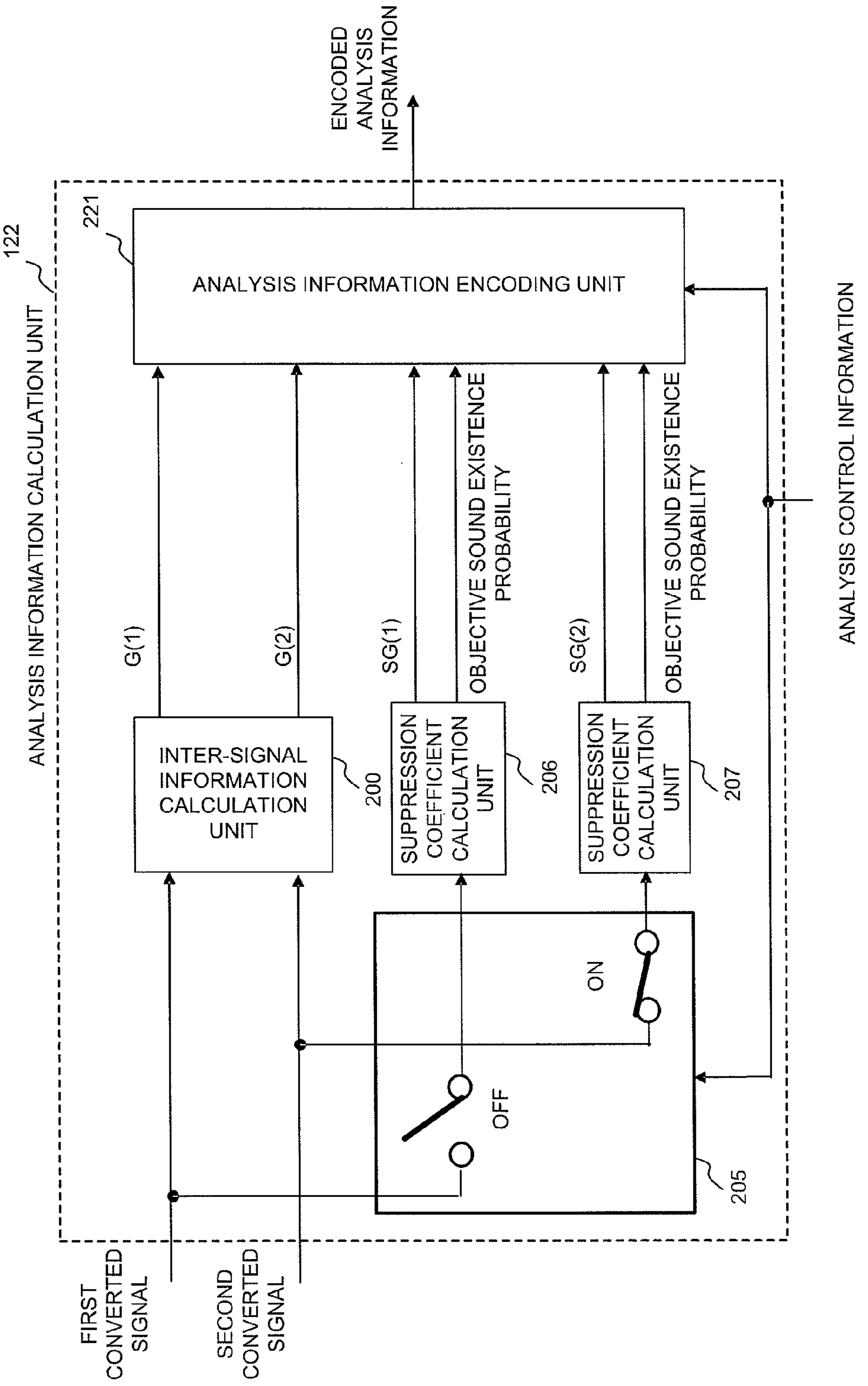
FIG. 26 shows a sixth configuration example of the analysis information calculation unit 121.

A sixth configuration example of the analysis information calculation unit 122 will be explained in details by making a reference to FIG. 26. The analysis information calculation unit 122 receives the first converted signal, the second converted signal, and the analysis control information, and outputs the encoded analysis information. The analysis information calculation unit 122 is configured of an inter-signal information calculation unit 200, suppression coefficient calculation units 206 and 207, an analysis information encoding unit 221, and a switch 205. The first converted signal and the second converted signal are inputted into the inter-signal information calculation unit 200 and the switch 205. The analysis control information is inputted into the switch 205 and the analysis information encoding unit 212. Upon making a comparison with the second configuration example of the analysis information calculation unit 122 explained by employing FIG. 13, the analysis information encoding unit 208 is replaced with the analysis information encoding unit 221, and no gain inverse-conversion unit 203 exists. Each of the inter-signal information calculation unit 200, the suppression coefficient calculation units 206 and 207, and the switch 205 is similar to that of FIG. 13, so its explanation is omitted. Additionally, the inter-signal information, being an output of the inter-signal information calculation unit 200, the suppression coefficient, being an output of the suppression coefficient calculation units 206 and 207, and the objective sound existence probability are outputted to the analysis information encoding unit 221.

The analysis information encoding unit 221 encodes the received inter-signal information, analysis control information, suppression coefficient, and objective sound existence probability, and outputs an encoding result as the encoded analysis information. As the encoding method, a method similar to the method having the content already explained with regard to the quantization unit 112 may be employed. The encoding makes it possible to remove redundancy of the inter-signal information, the analysis control information, the suppression coefficient, and the objective sound existence probability. Further, when the information quantity does not need to be curtailed, the analysis information encoding unit 221 may output the inter-signal information, the analysis control information, the suppression coefficient, and the objective sound existence probability as the encoded analysis information without performing these encoding processes.

Figure 27:
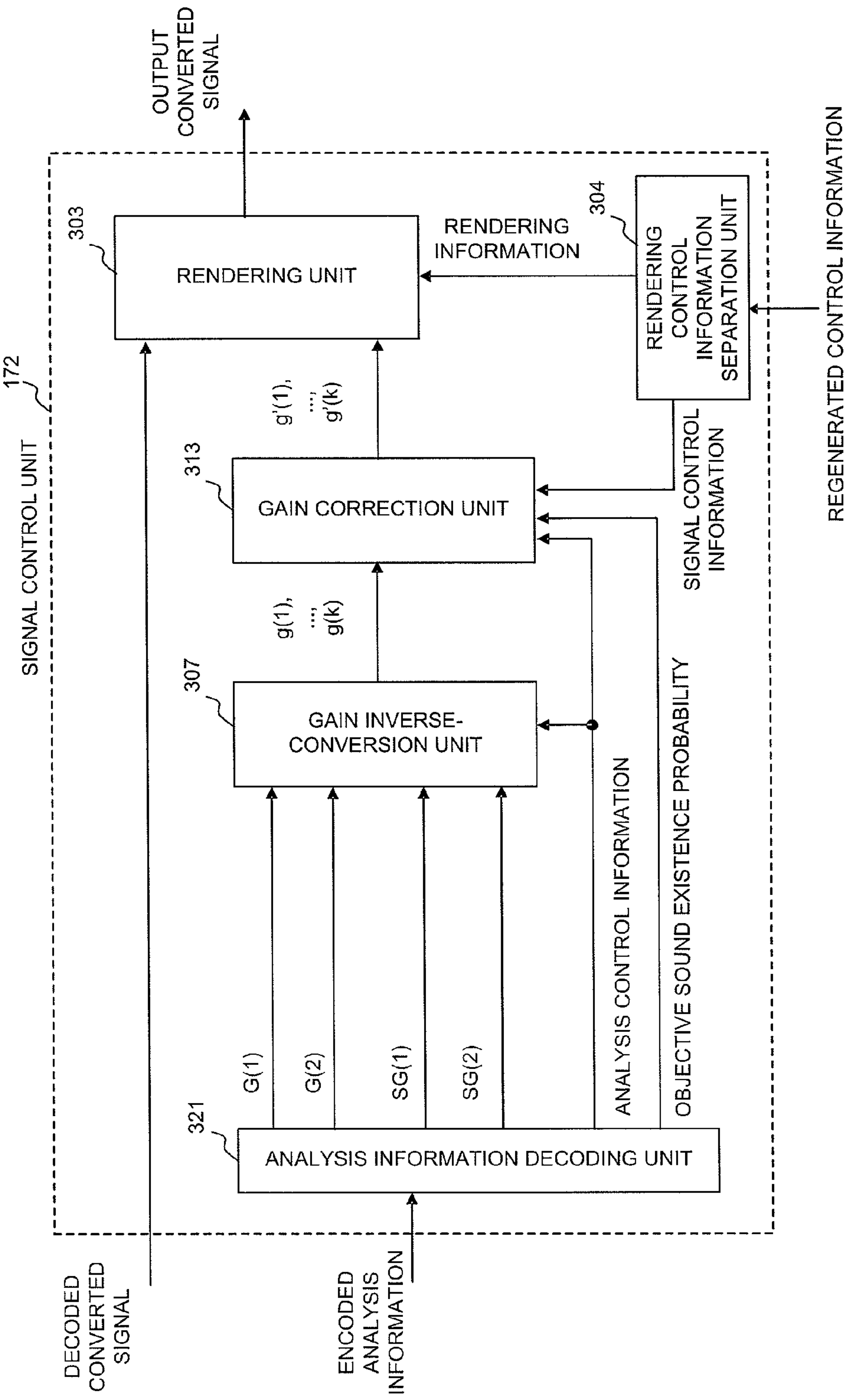
FIG. 27 shows a fourteenth configuration example of the signal control processing unit 172.

Next, a fourteenth configuration example of the signal control unit 172 will be explained in details by making a reference to FIG. 27. The signal control unit 172 receives the decoded converted signal, the encoded analysis information, and the regenerated control information, and outputs the output converted signal. The signal control unit 172 is configured of an analysis information decoding unit 321, a rendering unit 303, a rendering control information separation unit 304, a gain inverse-conversion unit 307, and a gain correction unit 313. Upon making a comparison with the fifth configuration example of the signal control unit 172 explained by employing FIG. 14, the fourteenth configuration example differs in point that the analysis information decoding unit 312 is replaced with the analysis information decoding unit 321, and the gain inverse-conversion unit 307 is added. Each of the rendering unit 303, the rendering control information separation unit 304, and the gain correction unit 313 is similar to that of FIG. 14, so its explanation is omitted. Further, the gain reverse-conversion unit 307 is similar to that of FIG. 11, so its explanation is omitted.

The analysis information decoding unit 321 decodes the inter-signal information, the analysis control information, the suppression coefficient, and the objective sound existence probability from the received encoded analysis information, and outputs the inter-signal information and the suppression coefficient to the gain inverse-conversion unit 307, the analysis control information to the gain inverse-conversion unit 307 and the gain correction unit 313, and the objective sound existence probability to the gain correction unit 313. When the inter-signal information, the analysis control information, the suppression coefficient, and the objective sound existence probability have not been encoded, the analysis information decoding unit 321 directly outputs the inter-signal information, the analysis control information, the suppression coefficient, and the objective sound existence probability without performing the decoding process.

Figure 28:
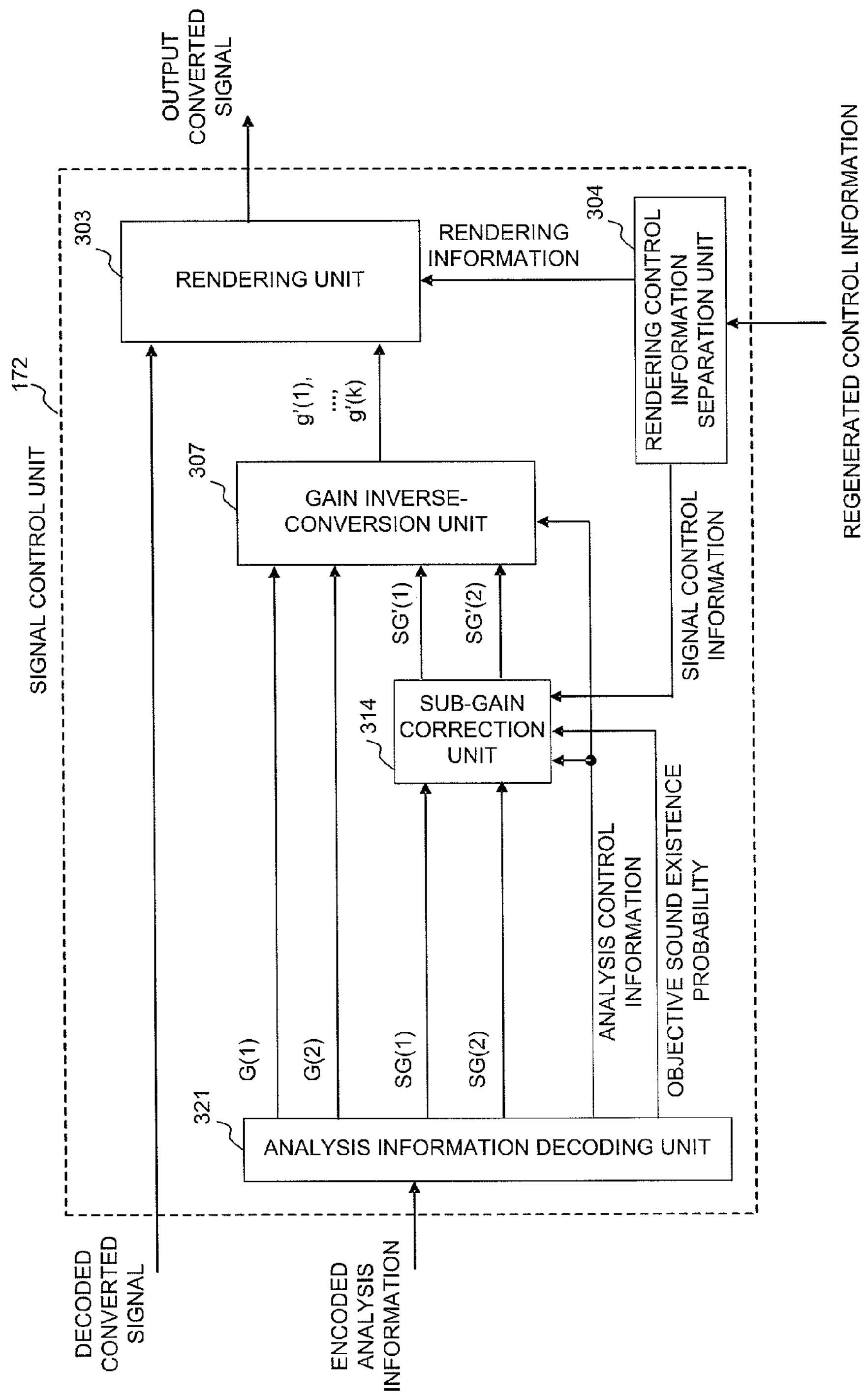
FIG. 28 shows a fifteenth configuration example of the signal control processing unit 172.

Next, a fifteenth configuration example of the signal control unit 172 will be explained in details by making a reference to FIG. 28. The signal control unit 172 receives the decoded converted signal, the encoded analysis information, and the regenerated control information, and outputs the output converted signal. The signal control unit 172 is configured of an analysis information decoding unit 321, a rendering unit 303, a rendering control information separation unit 304, a gain inverse-conversion unit 307, and a sub-gain correction unit 314. Upon making a comparison with the sixth configuration example of the signal control unit 172 explained by employing FIG. 15, the fifteenth configuration example differs in point that the analysis information decoding unit 312 is replaced with the analysis information decoding unit 321, and no gain conversion unit 306 exists. Each of the rendering unit 303, the rendering control information separation unit 304, the gain inverse-conversion unit 307, and the sub-gain correction unit 314 is similar to that of FIG. 15, so its explanation is omitted. Further, the analysis information decoding unit 321 is similar to that of FIG. 27, so its explanation is omitted. Additionally, the analysis control information, being an output of the analysis information decoding unit 321, is outputted to the gain inverse-conversion unit 307 and the sub-gain correction unit 314, the inter-signal information is outputted to the gain inverse-conversion unit 307, and the suppression coefficient and the objective sound existence probability are inputted to the sub-gain correction unit 314.

Figure 29:
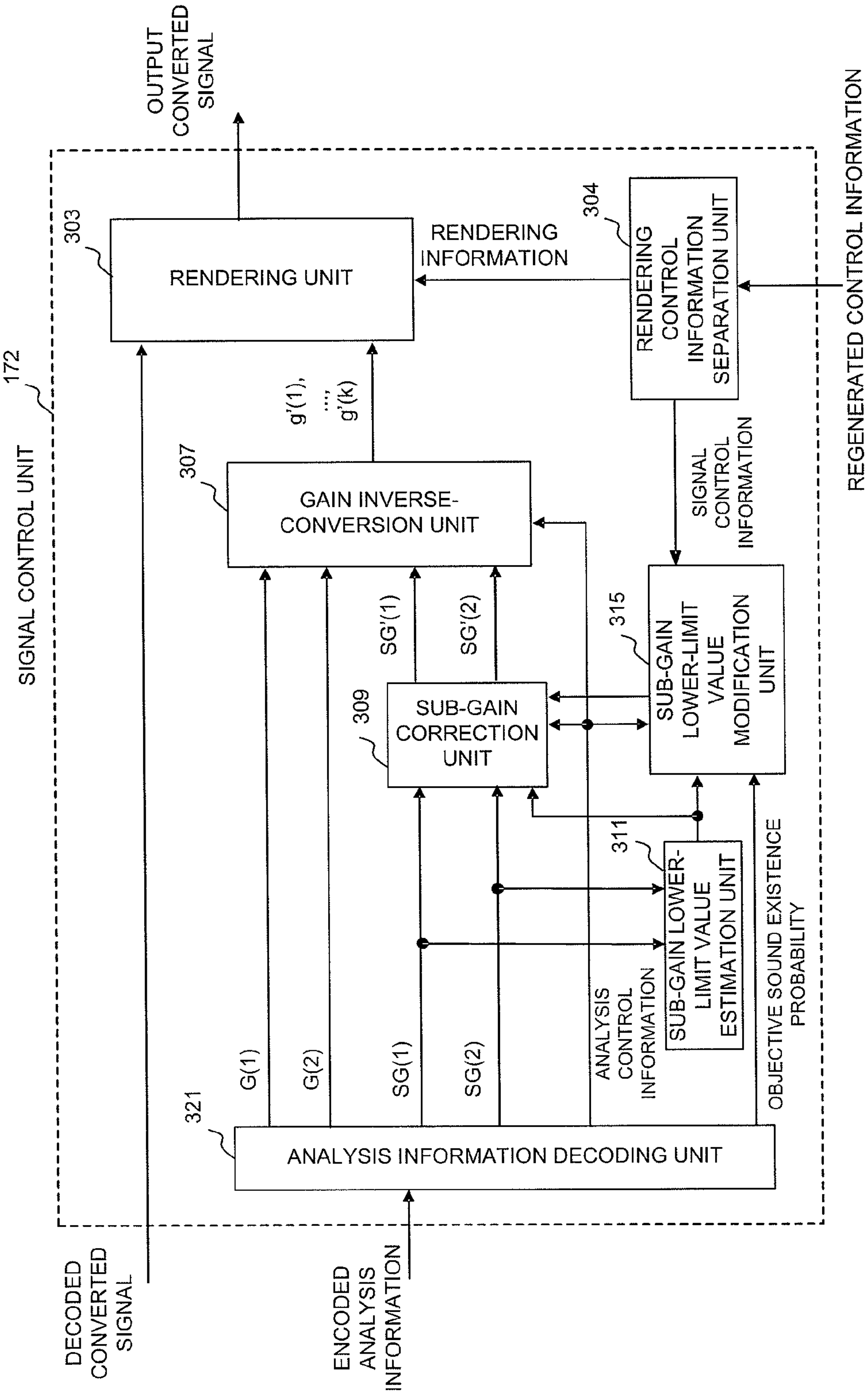
FIG. 29 shows a sixteenth configuration example of the signal control processing unit 172.

Next, a sixteenth configuration example of the signal control unit 172 will be explained in details by making a reference to FIG. 29. The signal control unit 172 receives the decoded converted signal, the encoded analysis information, and the regenerated control information, and outputs the output converted signal. The signal control unit 172 is configured of an analysis information decoding unit 321, a rendering unit 303, a rendering control information separation unit 304, a gain inverse-conversion unit 307, a sub-gain correction unit 309, a sub-gain lower-limit value modification unit 315, and a sub-gain lower-limit value estimation unit 311. Upon making a comparison with the seventh configuration example of the signal control unit 172 explained by employing FIG. 16, the sixteenth configuration example differs in point that the analysis information decoding unit 312 is replaced with the analysis information decoding unit 321, and no gain conversion unit 306 exists. Each of the rendering unit 303, the rendering control information separation unit 304, the gain inverse-conversion unit 307, the sub-gain correction unit 309, the sub-gain lower-limit value modification unit 315, and the sub-gain lower-limit value estimation unit 311 is similar to that of FIG. 16, so its explanation is omitted. Further, the analysis information decoding unit 321 is similar to that of FIG. 27, so its explanation is omitted. Additionally, the analysis control information, being an output of the analysis information decoding unit 321, is outputted to the gain inverse-conversion unit 307, the sub-gain correction unit 309, and the sub-gain lower-limit value modification unit 315, the suppression coefficient is outputted to the sub-gain correction unit 309 and the sub-gain lower-limit value estimation unit 311, and the objective sound existence probability is outputted to the sub-gain lower-limit value modification unit 315.

As explained above, the sixth embodiment of the present invention enables the receiving unit to control the input signal, which is configured of a plurality of the component elements, for each component element based upon the encoded analysis information being outputted from the transmission unit. In addition, the receiving unit can curtail the arithmetic quantity relating to the signal analysis because the transmission unit analyzes the signal. Further, utilizing information indicative of a relation between the input signal and each component element, which is included in the analysis control information, makes it possible to control each of a plurality of the component elements constituting the input signal independently of the component elements of other input signals also when a plural number of the input signals of the transmission unit exist. In addition, utilizing information associated with the classification of each component element, which is included in the analysis control information, enables a control corresponding to the classification of each component element. For example, when the component elements are the objective sound and the background sound, a control responding to the objective sound can be taken for the objective sound, and a control responding to the background sound can be taken for the background sound. A more desired output signal can be obtained owing to a control corresponding to the classification of each component element. Further, the control suitable for the signal feature, which is obtained by employing the objective sound existence probability, can make the relation between the signal distortion and the residual background sound a desired balanced relation. Employing the objective sound existence probability enables the output signal having a higher quality to be obtained.

Seventh Embodiment

A seventh embodiment of the present invention will be explained. Upon comparing the seventh embodiment with the third embodiment, the former differs from the latter in operations of the analysis information calculation unit 122 and the signal control unit 172. Explanation of the portion which overlaps the third embodiment is omitted. This embodiment is characterized in differing in a configuration of the encoded analysis information as compared with the third embodiment.

Figure 30:
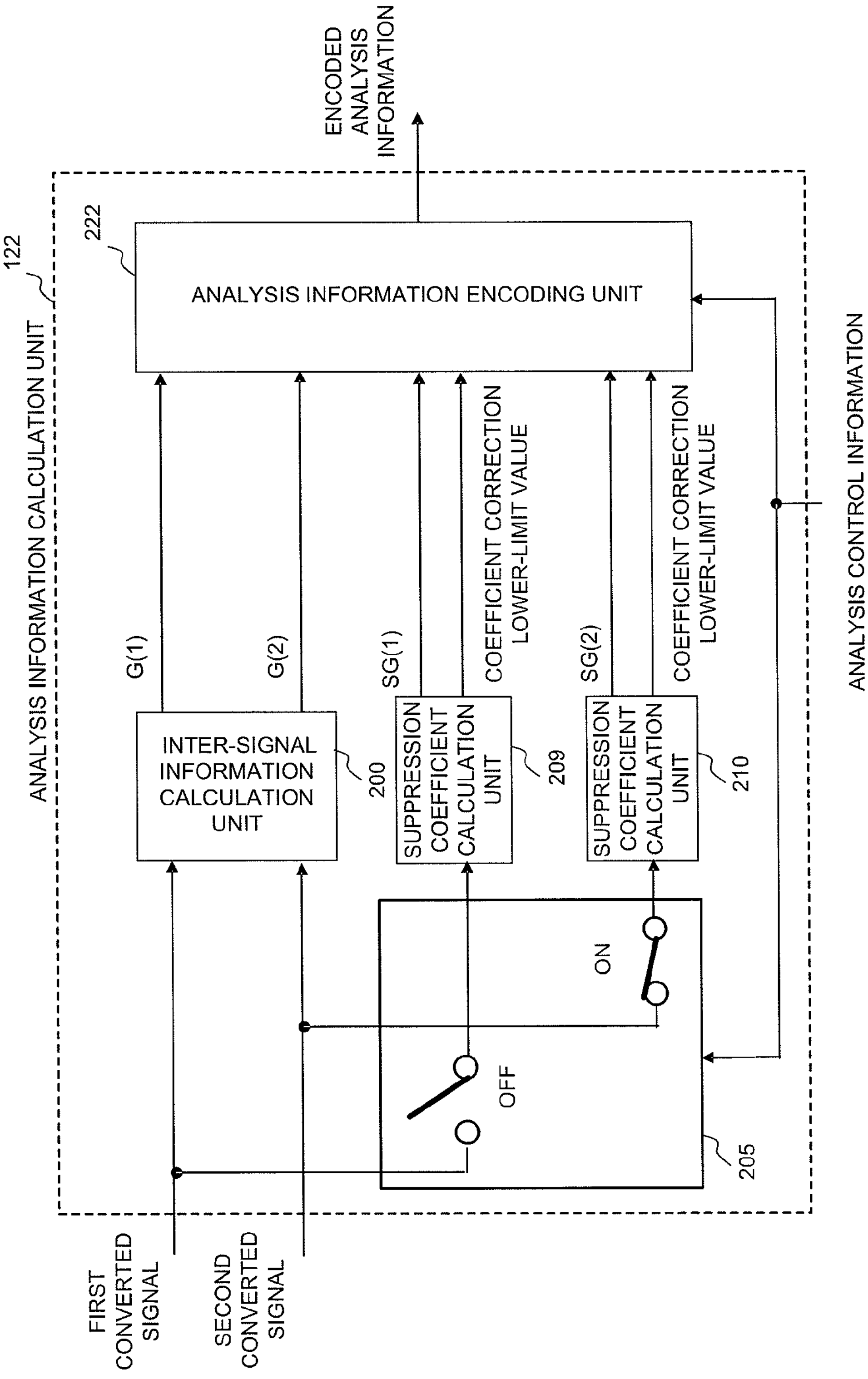
FIG. 30 shows a seventh configuration example of the analysis information calculation unit 121.

A seventh configuration example of the analysis information calculation unit 122 will be explained in details by making a reference to FIG. 30. The analysis information calculation unit 122 receives the first converted signal, the second converted signal, and the analysis control information, and outputs the encoded analysis information. The analysis information calculation unit 122 is configured of an inter-signal information calculation unit 200, suppression coefficient calculation units 209 and 210, an analysis information encoding unit 222, and a switch 205. The first converted signal and the second converted signal are inputted into the inter-signal information calculation unit 200 and the switch 205. The analysis control information is inputted into the switch 205 and the analysis information encoding unit 222. Upon making a comparison with the third configuration example of the analysis information calculation unit 122 explained by employing FIG. 17, the analysis information encoding unit 211 is replaced with the analysis information encoding unit 222, and no gain inverse-conversion unit 203 exists. Each of the inter-signal information calculation unit 200, the suppression coefficient calculation units 209 and 210, and the switch 205 is similar to that of FIG. 17, so its explanation is omitted. Additionally, the inter-signal information, being an output of the inter-signal information calculation unit 200, the suppression coefficient, being an output of the suppression coefficient calculation units 206 and 207, and the coefficient correction lower-limit value are outputted to the analysis information encoding unit 222.

The analysis information encoding unit 222 encodes the received inter-signal information, analysis control information, suppression coefficient, and coefficient correction lower-limit value, and outputs an encoding result as the encoded analysis information. As the encoding method, a method similar to the method having the content already explained with regard to the quantization unit 112 may be employed. The encoding makes it possible to remove redundancy of the inter-signal information, the analysis control information, the suppression coefficient, and the coefficient correction lower-limit value. Further, when the information quantity does not need to be curtailed, the analysis information encoding unit 222 may output the inter-signal information, the analysis control information, the suppression coefficient, and the coefficient correction lower-limit value as the encoded analysis information without performing these encoding processes.

Figure 31:
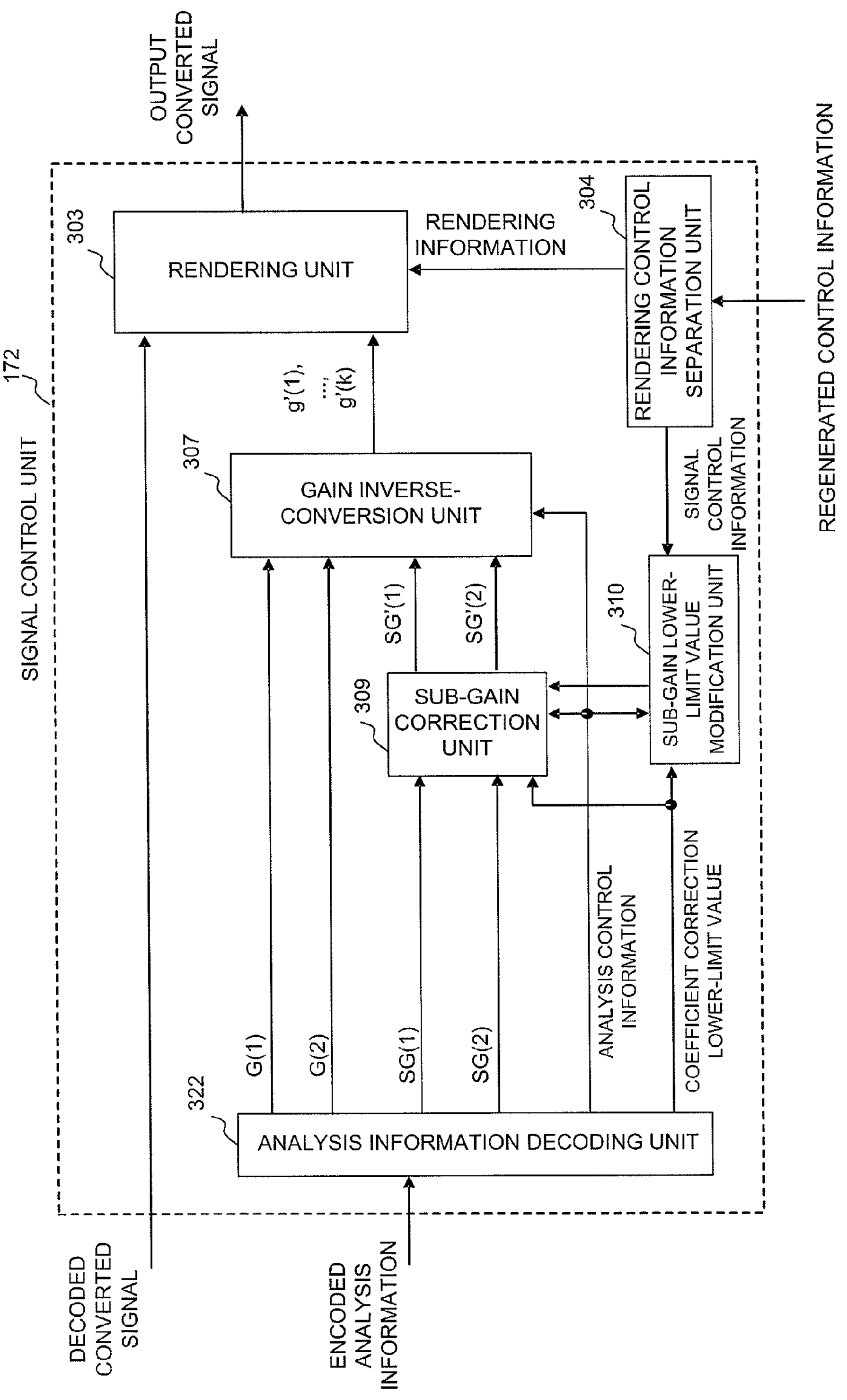
FIG. 31 shows a seventeenth configuration example of the signal control processing unit 172.

A seventeenth configuration example of the signal control unit 172 will be explained in details by making a reference to FIG. 31. The signal control unit 172 receives the decoded converted signal, the encoded analysis information, and the regenerated control information, and outputs the output converted signal. The signal control unit 172 is configured of an analysis information decoding unit 322, a rendering unit 303, a rendering control information separation unit 304, a gain inverse-conversion unit 307, a sub-gain correction unit 309, and a sub-gain lower-limit value modification unit 310. Upon making a comparison with the eighth configuration example of the signal control unit 172 explained by employing FIG. 18, the seventeenth configuration example differs in point that the analysis information decoding unit 316 is replaced with the analysis information decoding unit 322, and no gain conversion unit 306 exists. Each of the rendering unit 303, the rendering control information separation unit 304, the gain inverse-conversion unit 307, the sub-gain correction unit 309, and the sub-gain lower-limit value modification unit 310 is similar to that of FIG. 18, so its explanation is omitted.

The analysis information decoding unit 322 decodes the inter-signal information, the analysis control information, the suppression coefficient, and the coefficient correction lower-limit value from the received encoded analysis information, and outputs the analysis control information to the gain inverse-conversion unit 307, the sub-gain correction unit 309, and the sub-gain lower-limit value modification unit 310, the suppression coefficient to the sub-gain correction unit 309, and the coefficient correction lower-limit value to the sub-gain correction unit 309 and the sub-gain lower-limit value modification unit 310. When the inter-signal information, the analysis control information, the suppression coefficient, and the coefficient correction lower-limit value have not been encoded, the analysis information decoding unit 322 directly outputs the inter-signal information, the analysis control information, the suppression coefficient, and the coefficient correction lower-limit value without performing the decoding process.

As explained above, the seventh embodiment of the present invention enables the receiving unit to control the input signal, which is configured of a plurality of the component elements, for each component element based upon the encoded analysis information being outputted from the transmission unit. In addition, the receiving unit can curtail the arithmetic quantity relating to the signal analysis because the transmission unit analyzes the signal. Further, utilizing information indicative of a relation between the input signal and each component element, which is included in the analysis control information, makes it possible to control each of a plurality of the component elements constituting the input signal independently of the component elements of other input signals also when a plural number of the input signals of the transmission unit exist.

Eighth Embodiment

An eighth embodiment of the present invention will be explained. Upon comparing the eighth embodiment with the fourth embodiment, the former differs from the latter in operations of the analysis information calculation unit 122 and the signal control unit 172. Explanation of the portion which overlaps the fourth embodiment is omitted. This embodiment is characterized in differing in a configuration of the encoded analysis information as compared with the fourth embodiment.

Figure 32:
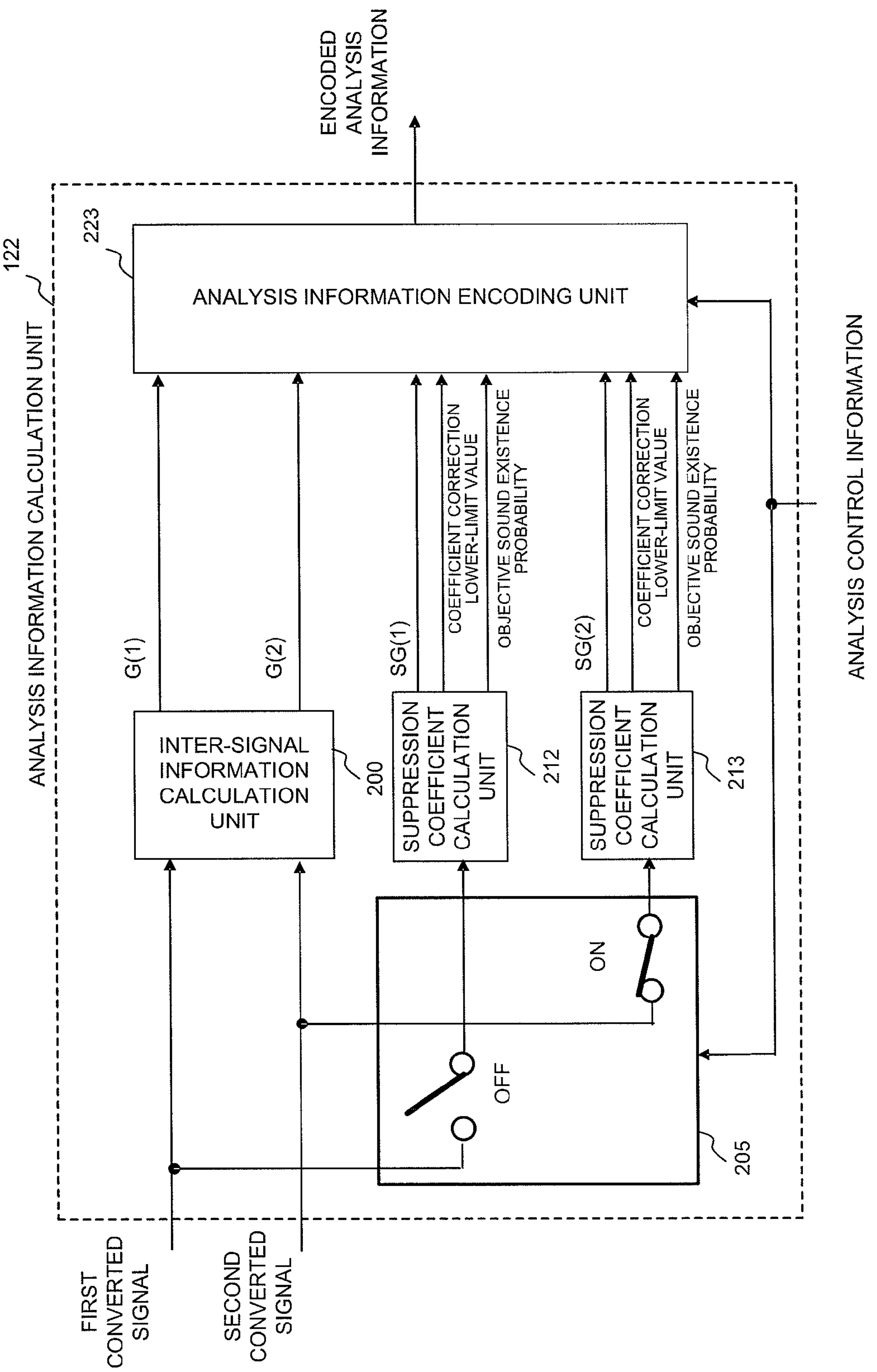
FIG. 32 shows an eighth configuration example of the analysis information calculation unit 121.

An eighth configuration example of the analysis information calculation unit 122 will be explained in details by making a reference to FIG. 32. The analysis information calculation unit 122 receives the first converted signal, the second converted signal, and the analysis control information, and outputs the encoded analysis information. The analysis information calculation unit 122 is configured of an inter-signal information calculation unit 200, suppression coefficient calculation units 212 and 213, an analysis information encoding unit 223, and a switch 205. The first converted signal and the second converted signal are inputted into the inter-signal information calculation unit 200 and the switch 205. The analysis control information is inputted into the switch 205 and the analysis information encoding unit 223. Upon making a comparison with the fourth configuration example of the analysis information calculation unit 122 explained by employing FIG. 19, the analysis information encoding unit 214 is replaced with the analysis information encoding unit 223, and no gain inverse-conversion unit 203 exists. Each of the inter-signal information calculation unit 200, the suppression coefficient calculation units 212 and 213, and the switch 205 is similar to that of FIG. 19, so its explanation is omitted. Additionally, the inter-signal information, being an output of the inter-signal information calculation unit 200, the suppression coefficient, being an output of the suppression coefficient calculation units 212 and 213, the coefficient correction lower-limit value, and the objective sound existence probability are outputted to the analysis information encoding unit 223.

The analysis information encoding unit 223 encodes the received inter-signal information, analysis control information, suppression coefficient, coefficient correction lower-limit value, and objective sound existence probability, and outputs an encoding result as the encoded analysis information. As the encoding method, a method similar to the method having the content already explained with regard to the quantization unit 112 may be employed. The encoding makes it possible to remove redundancy of the inter-signal information, the analysis control information, the suppression coefficient, the coefficient correction lower-limit value, and the objective sound existence probability. Further, when the information quantity does not need to be curtailed, the analysis information encoding unit 223 may output the inter-signal information, the analysis control information, the suppression coefficient, the coefficient correction lower-limit value, and the objective sound existence probability as the encoded analysis information without performing these encoding processes.

Figure 33:
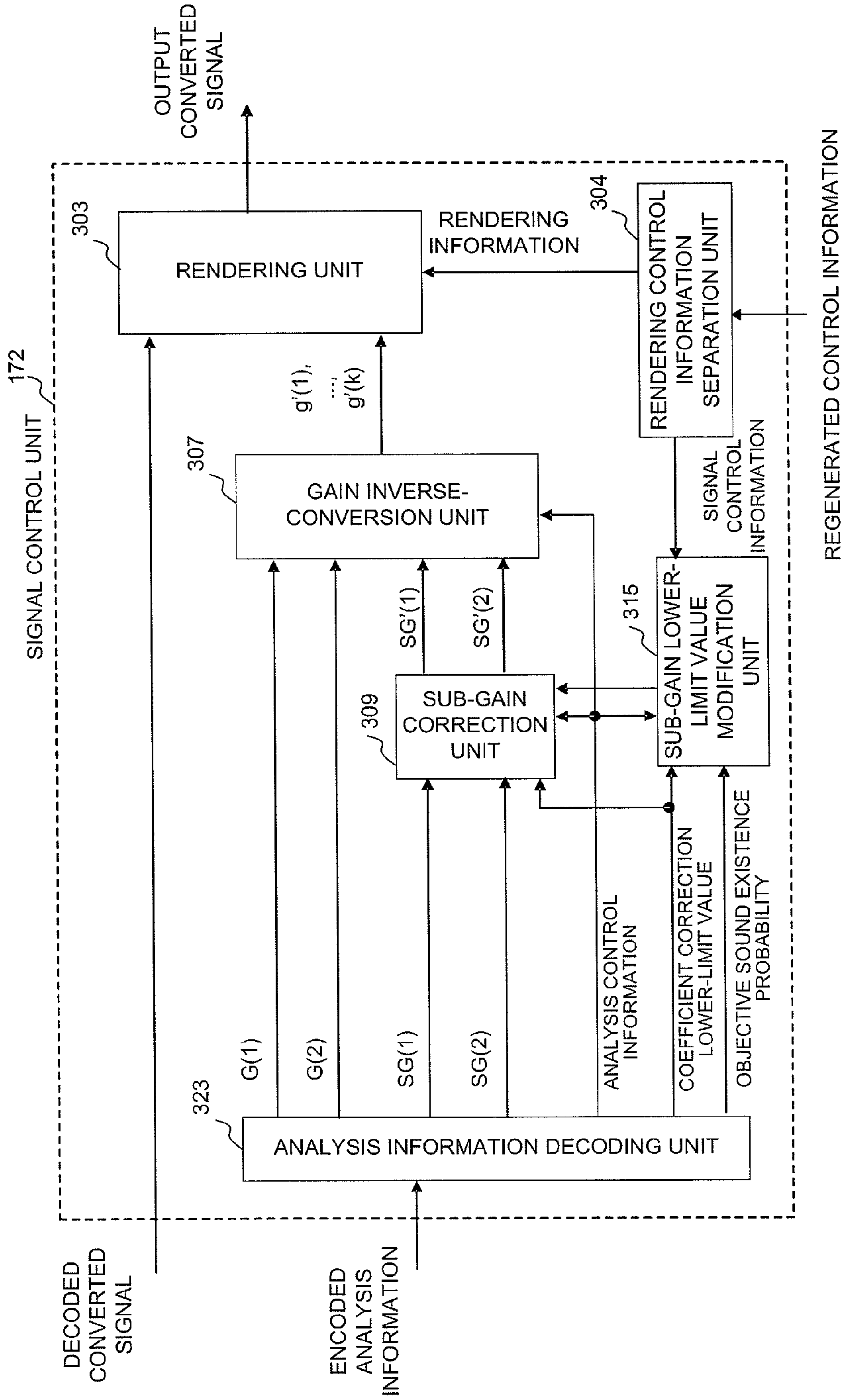
FIG. 33 shows an eighteenth configuration example of the signal control processing unit 172.

An eighteenth configuration example of the signal control unit 172 will be explained in details by making a reference to FIG. 33. The signal control unit 172 receives the decoded converted signal, the encoded analysis information, and the regenerated control information, and outputs the output converted signal. The signal control unit 172 is configured of an analysis information decoding unit 323, a rendering unit 303, a rendering control information separation unit 304, a gain inverse-conversion unit 307, a sub-gain correction unit 309, and a sub-gain lower-limit value modification unit 315. Upon making a comparison with the ninth configuration example of the signal control unit 172 explained by employing FIG. 20, the eighteenth configuration example differs in point that the analysis information decoding unit 317 is replaced with the analysis information decoding unit 323, and no gain conversion unit 306 exists. Each of the rendering unit 303, the rendering control information separation unit 304, the gain inverse-conversion unit 307, the sub-gain correction unit 309, and the sub-gain lower-limit value modification unit 315 is similar to that of FIG. 20, so its explanation is omitted.

The analysis information decoding unit 323 decodes the inter-signal information, the analysis control information, the suppression coefficient, the coefficient correction lower-limit value, and the objective sound existence probability from the received encoded analysis information, and outputs the analysis control information to the gain inverse-conversion unit 307, the sub-gain correction unit 309, and the sub-gain lower-limit value modification unit 315, the suppression coefficient to the sub-gain correction unit 309, the objective sound existence probability to the sub-gain lower-limit value modification unit 315, and the coefficient correction lower-limit value to the sub-gain correction unit 309 and the sub-gain lower-limit value modification unit 315. When the inter-signal information, the analysis control information, the suppression coefficient, the coefficient correction lower-limit value, and the objective sound existence probability have not been encoded, the analysis information decoding unit 323 directly outputs the inter-signal information, the analysis control information, the suppression coefficient, the coefficient correction lower-limit value, and the objective sound existence probability without performing the decoding process.

As explained above, the eighth embodiment of the present invention enables the receiving unit to control the input signal, which is configured of a plurality of the component elements, for each component element based upon the encoded analysis information being outputted from the transmission unit. In addition, the receiving unit can curtail the arithmetic quantity relating to the signal analysis because the transmission unit analyzes the signal. Further, utilizing information indicative of a relation between the input signal and each component element, which is included in the analysis control information, makes it possible to control each of a plurality of the component elements constituting the input signal independently of the component elements of other input signals also when a plural number of the input signals of the transmission unit exist. In addition, utilizing information associated with the classification of each component element, which is included in the analysis control information, enables a control corresponding to the classification of each component element. For example, when the component elements are the objective sound and the background sound, a control responding to the objective sound can be taken for the objective sound, and a control responding to the background sound can be taken for the background sound. A more desired output signal can be obtained owing to a control corresponding to the classification of each component element. Further, the control suitable for the signal feature, which is obtained by employing the objective sound existence probability, can make the relation between the signal distortion and the residual background sound a desired balanced relation. Employing the objective sound existence probability enables the output signal having a higher quality to be obtained.

Ninth Embodiment

Figure 34:
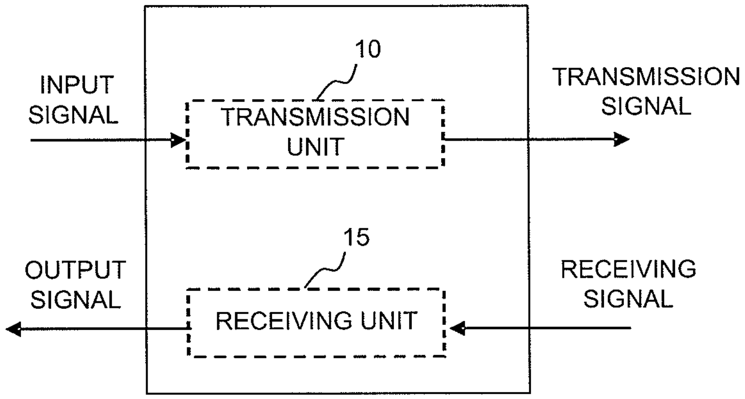
FIG. 34 is a block diagram illustrating a ninth embodiment of the present invention.

A ninth embodiment of the present invention will be explained by making a reference to FIG. 34. Only One-way communication was taken into consideration in the embodiments ranging from the first embodiment up to the eighth embodiment. That is, the communication between the transmission unit integrally built in a terminal and the receiving unit integrally built in another terminal was explained. In the ninth embodiment, which takes bilateral communication into consideration, both of the transmission unit and the receiving unit for which the present invention has been applied are integrally built in one transmission/reception terminal. As a terminal having both of the transmission unit and the receiving unit integrally built therein, for which the present invention has been applied, a combination of any of the transmission units of the first embodiment to the eighth embodiment, and any of the receiving units of the first embodiment to the sixth embodiment may be employed. In the ninth embodiment of the present invention, incorporating both of the transmission unit and the receiving unit into the terminal yields an effect of the present invention at the moment of utilizing it for the bilateral communication apparatuses such as a television conference terminal and a mobile telephone.

The signal analysis control system of the present invention is applicable in the case that the one-way sound communication is made, for example, in the case of a broadcast. It is enough for the transmission terminal of a broadcast station to have, for example, at least the transmission unit 10 shown in FIG. 1. The so-called broadcast station includes not only a licensed broadcast station but also a point in which sound is transmitted and no reception is almost performed, for example, a main site of a multi-point television conference. Any of the transmission units of the first embodiment to the eighth embodiment of the present invention may be employed for this transmission terminal.

Further, the signal analysis control system of the present invention is applicable to a point as well in which only the reception is performed. It is enough for the reception terminal in a point in which only the reception is performed to have, for example, at least the receiving unit 15 shown in FIG. 1. Any of the receiving units of the first embodiment to the sixth embodiment of the present invention may be employed for this reception terminal.

Tenth Embodiment

Figure 35:
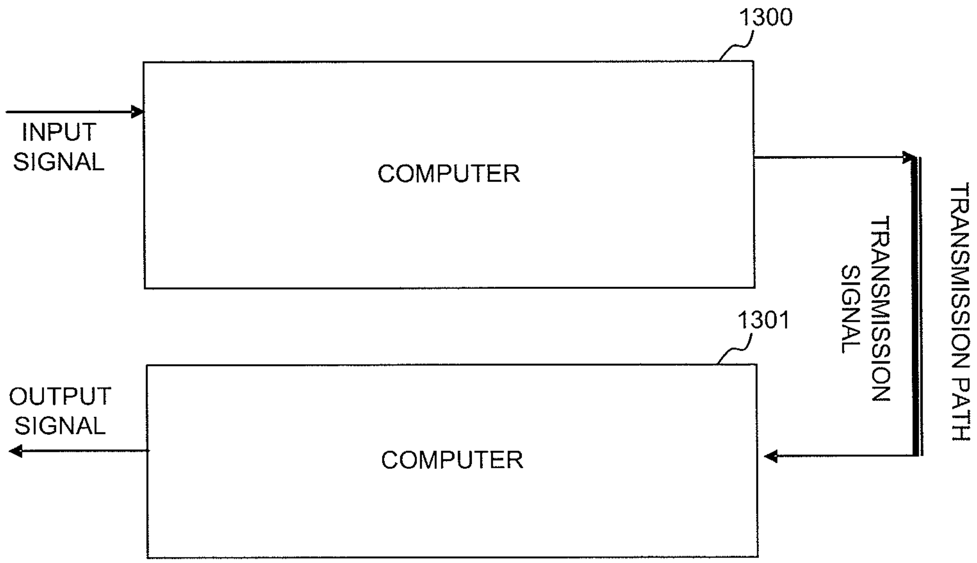
FIG. 35 is a block diagram illustrating a tenth embodiment of the present invention.

The signal process apparatus based upon a tenth embodiment of the present invention will be explained in details by making a reference to FIG. 35. The tenth embodiment of the present invention is configured of computers 1300 and 1301 each of which operates under a program control. The computer could be any of a central processing apparatus, a processor, and a data processing apparatus.

The computer 1300, which performs a process relating to any of the first embodiment to the ninth embodiment, operates based upon a program for receiving the input signal and outputting the transmission signal. On the other hand, the computer 1301, which performs a process relating to any of the first embodiment to the ninth embodiment, operates based upon a program for receiving the transmission signal and outputting the output signal. Additionally, in the case of having both of the transmission unit and receiving unit explained in the ninth embodiment, the transmission process and the reception process may be executed by employing the identical computer.

While in the first embodiment to the tenth embodiment explained above, the operations of the transmission unit, the transmission path, and the receiving unit were exemplified, they may be replaced with the recoding unit, the storage medium, and the reproduction unit, respectively. For example, the transmission unit 10 shown in FIG. 1 may output the transmission signal as a bit stream to the storage medium, and record the bit stream into the storage medium. Further, the receiving unit 15 may take out the bit stream recorded into the storage medium, and generate the output signal by decoding the bit stream and performing a process therefor.

As mentioned above, in the foregoing embodiments, the receiving unit can curtail the arithmetic quantity relating to the signal analysis because the transmission unit analyzes the signal. Further, the foregoing embodiments enable the receiving unit to control the input signal, which is configured of a plurality of the component elements, for each component element based upon the signal analysis information obtained by the transmission unit. In addition, utilizing a relation between each input signal and the component element being included in each input signal makes it possible to control a plurality of the component elements constituting each input signal independently of the component elements of the other input signals when not one input signal but a plural number of the input signals is inputted.

The 1st mode of the present invention is characterized in that a signal control method, comprising: receiving a first signal, a second signal including a plurality of component elements, component element information indicative of a relation between said component elements, and analysis control information including information indicative of a relation between said component element and said second signal; and controlling said first signal or said second signal based upon said component element information and said analysis control information.

The 2nd mode of the present invention, in the above-mentioned modes, is characterized in that a signal control method according to claim 1, wherein said analysis control information includes information indicative of respective classifications of said plurality of component elements.

The 3rd mode of the present invention, in the above-mentioned modes, is characterized in that the signal control method comprising: receiving rendering information for outputting said component elements to a plurality of output channels; and controlling said first signal or said second signal based upon said component element information, said analysis control information, and said rendering information.

The 4th mode of the present invention, in the above-mentioned modes, is characterized in that the signal control method comprising: receiving signal control information indicative of a relation between said plurality of component elements; correcting said component element information based upon said analysis control information and said signal control information; and controlling said first signal or said second signal based upon said corrected component element information and said rendering information.

The 5th mode of the present invention, in the above-mentioned modes, is characterized in that the signal control method comprising: generating inter-signal information indicative of a relation between said first signal and said second signal, and a suppression coefficient for suppressing one part of said plurality of component elements based upon said component element information and said signal control information; correcting said suppression coefficient based upon said signal control information; correcting said component element information based upon said inter-signal information, said corrected suppression coefficient, and said analysis control information; and controlling said first signal or said second signal based upon said corrected component element information and said rendering information.

The 6th mode of the present invention, in the above-mentioned modes, is characterized in that the signal control method comprising: generating a lower-limit value of said suppression coefficient; correcting said suppression coefficient based upon said lower-limit value of the suppression coefficient and said signal control information; correcting said component element information based upon said inter-signal information, said corrected suppression coefficient, and said analysis control information; and controlling said first signal or said second signal based upon said corrected component element information and said rendering information.

The 7th mode of the present invention is characterized in that a signal analysis method comprising: receiving a first signal, a second signal including a plurality of component elements, and analysis control information including information indicative of a relation between said second signal; and generating component element information indicative of a relation between said component elements based upon said first signal, said second signal, and said analysis control information.

The 8th mode of the present invention, in the above-mentioned modes, is characterized in that said analysis control information includes information indicative of respective classifications of said plurality of component elements.

The 9th mode of the present invention, in the above-mentioned modes, is characterized in that the signal analysis method comprising: generating inter-signal information indicative of a relation between said first signal and said second signal, and a suppression coefficient for suppressing one part of said plurality of component elements based upon said first signal and said second signal; and generating said component element information based upon said analysis information, said inter-signal information, and said suppression coefficient.

The 10th mode of the present invention is characterized in that a signal analysis control method, comprising: receiving a first signal, a second signal including a plurality of component elements, and analysis control information including information indicative of a relation between said second signal; generating component element information indicative of a relation between said component elements based upon said first signal, said second signal, and said analysis control information; and controlling said first signal or said second signal based upon said component element information and said analysis control information.

The 11th mode of the present invention, in the above-mentioned modes, is characterized in that said analysis control information includes information indicative of respective classifications of said plurality of component elements.

The 12th mode of the present invention is characterized in that a signal control apparatus, comprising a signal control unit for: receiving a first signal, a second signal including a plurality of component elements, component element information indicative of a relation between said component elements, and analysis control information including information indicative of a relation between said component element and said second signal; and controlling said first signal or said second signal based upon said component element information and said analysis control information.

The 13th mode of the present invention, in the above-mentioned modes, is characterized in that said analysis control information includes information indicative of respective classifications of said plurality of component elements.

The 14th mode of the present invention, in the above-mentioned modes, is characterized in that said signal control unit receives rendering information for outputting said component elements to a plurality of output channels, and controls said first signal or said second signal based upon said component element information, said analysis control information, and said rendering information.

The 15th mode of the present invention, in the above-mentioned modes, is characterized in that the signal control apparatus comprising a component element information correction unit for receiving signal control information indicative of a relation between said plurality of component elements, and correcting said component element information based upon said analysis control information and said signal control information, wherein said signal control unit controls said first signal or said second signal based upon said corrected component element information and said rendering information.

The 16th mode of the present invention, in the above-mentioned modes, is characterized in that the signal control apparatus comprising: a component element generation unit for generating inter-signal information indicative of a relation between said first signal and said second signal, and a suppression coefficient for suppressing one part of said plurality of component elements based upon said component element information and said signal control information; a suppression coefficient correction unit for correcting said suppression coefficient based upon said signal control information; and a component element correction unit for correcting the component element information based upon said inter-signal information, said corrected suppression coefficient, and said analysis control information, wherein said signal control unit controls said first signal or said second signal based upon said corrected component element information and said rendering signal.

The 17th mode of the present invention, in the above-mentioned modes, is characterized in that the signal control apparatus comprising: a suppression coefficient lower-limit value generation unit for generating a lower-limit value of said suppression coefficient; and a suppression coefficient correction unit for correcting said suppression coefficient based upon said lower-limit value of the suppression coefficient and said signal control information: wherein said component element information correction unit generates the component element information based upon said inter-signal information, said corrected suppression coefficient, and said analysis control information; and wherein said signal control unit controls said first signal or said second signal based upon said corrected component element information and said rendering information.

The 18th mode of the present invention is characterized in that a signal analysis apparatus, comprising a component element information generation unit for: receiving a first signal, a second signal including a plurality of component elements, and analysis control information including information indicative of a relation between said second signal; and generating component element information indicative of a relation between said component elements based upon said first signal, said second signal, and said analysis control information.

The 19th mode of the present invention, in the above-mentioned modes, is characterized in that said analysis control information includes information indicative of respective classifications of said plurality of component elements.

The 20th mode of the present invention, in the above-mentioned modes, is characterized in that the signal analysis apparatus comprising: an inter-signal information generation unit for generating inter-signal information indicative of a relation between said first signal and said second signal based upon said first signal and said second signal; and a suppression coefficient generation unit for generating a suppression coefficient for suppressing one part of said plurality of component elements based upon said first signal and said second signal, wherein said component element information generation unit generates said component element information based upon said analysis information, said inter-signal information, and said suppression coefficient.

The 21st mode of the present invention is characterized in that a signal analysis control system, comprising: a component element information generation unit for: receiving a first signal, a second signal including a plurality of component elements, and analysis control information including information indicative of a relation between said second signal; and generating component element information indicative of a relation between said component elements based upon said first signal, said second signal, and said analysis control information; and a signal control unit for controlling said first signal or said second signal based upon said component element information and said analysis control information.

The 22nd mode of the present invention, in the above-mentioned modes, is characterized in that said analysis control information includes information indicative of respective classifications of said plurality of component elements.

The 23rd mode of the present invention is characterized in that a signal control program for causing a computer to execute: a process of receiving a first signal, a second signal including a plurality of component elements, component element information indicative of a relation between said component elements, and analysis control information including information indicative of a relation between said component element and said second signal; and a signal control process of controlling said first signal or said second signal based upon said component element information and said analysis control information.

The 24th mode of the present invention, in the above-mentioned modes, is characterized in that said analysis control information includes information indicative of respective classifications of said plurality of component elements.

The 25th mode of the present invention, in the above-mentioned modes, is characterized in that the signal control program comprising a process of receiving rendering information for outputting said component elements to a plurality of output channels, wherein said signal control process controls said first signal or said second signal based upon said component element information, said analysis control information, and said rendering information.

The 26th mode of the present invention, in the above-mentioned modes, is characterized in that a signal control program comprising: a process of receiving signal control information indicative of a relation between said plurality of component elements; and a component element information correction process of correcting said component element information based upon said analysis control information and said signal control information, wherein said signal control process controls said first signal or said second signal based upon said corrected component element information and said rendering information.

The 27th mode of the present invention, in the above-mentioned modes, is characterized in that a signal control program comprising: a suppression coefficient generation process of generating inter-signal information indicative of a relation between said first signal and said second signal, and a suppression coefficient for suppressing one part of said plurality of component elements based upon said component element information and said signal control information; a suppression coefficient correction process of correcting said suppression coefficient based upon said signal control information; and a component element information correction process of correcting the component element information based upon said inter-signal information, said corrected suppression coefficient, and said analysis control information, wherein said signal control process controls said first signal or said second signal based upon said corrected component element information and said rendering information.

The 28th mode of the present invention, in the above-mentioned modes, is characterized in that the signal control program comprising: a suppression coefficient lower-limit value generation process of generating a lower-limit value of said suppression coefficient; a suppression coefficient correction process of correcting said suppression coefficient based upon said lower-limit value of the suppression coefficient and said signal control information; and a component element information correction process of correcting the component element information based upon said inter-signal information, said corrected suppression coefficient, and said analysis control information, wherein said signal control process controls said first signal or said second signal based upon said corrected component element information and said rendering signal.

The 29th mode of the present invention is characterized in that a signal analysis program for causing a computer to execute: a process of receiving a first signal, a second signal including a plurality of component elements, and analysis control information including information indicative of a relation between said second signal; and a component element information generation process of generating component element information indicative of a relation between said component elements based upon said first signal, said second signal, and said analysis control information.

The 30th mode of the present invention, in the above-mentioned modes, is characterized in that said analysis control information includes information indicative of respective classifications of said plurality of component elements.

The 31st mode of the present invention, in the above-mentioned modes, is characterized in that the signal analysis program comprising: an inter-signal information generation process of generating inter-signal information indicative of a relation between said first signal and said second signal based upon said first signal and said second signal; and a suppression coefficient generation process of generating a suppression coefficient for suppressing one part of said plurality of component elements based upon said first signal and said second signal, wherein said component element information generation process generates said component element information based upon said analysis information, said inter-signal information, and said suppression coefficient.

The 32nd mode of the present invention is characterized in that a signal analysis control program for causing a computer to execute: a process of receiving a first signal, a second signal including a plurality of component elements, and analysis control information including information indicative of a relation between said second signal; a component element information generation process of generating component element information indicative of a relation between said component elements based upon said first signal, said second signal, and said analysis control information; and a signal control process of controlling said first signal or said second signal based upon said component element information and said analysis control information.

The 33rd mode of the present invention, in the above-mentioned modes, is characterized in that said analysis control information includes information indicative of respective classifications of said plurality of component elements.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the spirit and scope of the invention.

This application is based upon and claims the benefit of priority from Japanese patent application No. 2008-80461, filed on Apr. 21, 2008, the disclosure of which is incorporated herein in its entirety by reference.

APPLICABILITY IN INDUSTRY

The present invention may be applied to an apparatus that performs signal analysis or signal control. The present invention may also be applied to a program that causes a computer to execute signal analysis or signal control.

The invention claimed is:

1. A signal control method, comprising:

receiving a first signal, a second signal including objective sound and background sound as a plurality of component elements, component element information indicative of a relation between said component elements, and analysis control information including information indicative of a relation between said component element and said second signal; controlling said first signal or said second signal based upon said component element information and said analysis control information;

generating inter-signal information indicative of a relation between said first signal and said second signal, and a suppression coefficient for suppressing one part of said plurality of component elements based upon said component element information and signal control information;

correcting said suppression coefficient based upon said signal control information;

correcting said component element information based upon said inter-signal information, said corrected suppression coefficient, and said analysis control information; and controlling said first signal or said second signal based upon said corrected component element information.

2. A signal control method according to claim 1, wherein said analysis control information includes information indicative of respective classifications of said plurality of component elements.

3. A signal control method according to claim 1, comprising:

receiving rendering information for outputting said component elements to a plurality of output channels; and controlling said first signal or said second signal based upon said component element information, said analysis control information, and said rendering information.

4. A signal control method according to claim 3, comprising:

receiving said signal control information indicative of a relation between said plurality of component elements;

correcting said component element information based upon said analysis control information and said signal control information; and controlling said first signal or said second signal based upon said corrected component element information and said rendering information.

5. A signal control method according to claim 4, comprising:

generating a lower-limit value of said suppression coefficient;

correcting said suppression coefficient based upon said lower-limit value of the suppression coefficient and said signal control information;

correcting said component element information based upon said inter-signal information, said corrected suppression coefficient, and said analysis control information; and controlling said first signal or said second signal based upon said corrected component element information and said rendering information.

6. A signal analysis method, comprising:

receiving a first signal, a second signal including objective sound and background sound as a plurality of component elements, and analysis control information including information indicative of a relation between said component element and said second signal;

generating component element information indicative of a relation between said component elements based upon said first signal, said second signal, and said analysis control information;

generating inter-signal information indicative of a relation between said first signal and said second signal, and a suppression coefficient for suppressing one part of said plurality of component elements based upon said first signal and said second signal; and generating said component element information based upon said analysis information, said inter-signal information, and said suppression coefficient.

7. A signal analysis method according to claim 6, wherein said analysis control information includes information indicative of respective classifications of said plurality of component elements.

8. A signal analysis control method, comprising:

receiving a first signal, a second signal including objective sound and background sound as a plurality of component elements, and analysis control information including information indicative of a relation between said component element and said second signal;

generating component element information indicative of a relation between said component elements based upon said first signal, said second signal, and said analysis control information;

controlling said first signal or said second signal based upon said component element information and said analysis control information;

generating inter-signal information indicative of a relation between said first signal and said second signal, and a suppression coefficient for suppressing one part of said plurality of component elements based upon said component element information and signal control information;

correcting said suppression coefficient based upon said signal control information;

correcting said component element information based upon said inter-signal information, said corrected suppression coefficient, and said analysis control information; and controlling said first signal or said second signal based upon said corrected component element information.

9. A signal analysis control method according to claim 8, wherein said analysis control information includes information indicative of respective classifications of said plurality of component elements.

10. A signal control apparatus, comprising a signal controller that:

receives a first signal, a second signal including objective sound and background sound as a plurality of component elements, component element information indicative of a relation between said component elements, and analysis control information including information indicative of a relation between said component element and said second signal; and controls said first signal or said second signal based upon said component element information and said analysis control information;

a component element generator that generates inter-signal information indicative of a relation between said first signal and said second signal, and a suppression coefficient for suppressing one part of said plurality of component elements based upon said component element information and signal control information;

a suppression coefficient correction unit that corrects said suppression coefficient based upon said signal control information; and a component element correction unit that corrects the component element information based upon said inter-signal information, said corrected suppression coefficient, and said analysis control information, wherein said signal controller controls said first signal or said second signal based upon said corrected component element information.

11. A signal control apparatus according to claim 10, wherein said analysis control information includes information indicative of respective classifications of said plurality of component elements.

12. A signal control apparatus according to claim 10, wherein said signal controller receives rendering information for outputting said component elements to a plurality of output channels, and controls said first signal or said second signal based upon said component element information, said analysis control information, and said rendering information.

13. A signal control apparatus according to claim 12, comprising a component element information correction unit that receives said signal control information indicative of a relation between said plurality of component elements, and corrects said component element information based upon said analysis control information and said signal control information, wherein said signal controller controls said first signal or said second signal based upon said corrected component element information and said rendering information.

14. A signal control apparatus according to claim 13, comprising:

a suppression coefficient lower-limit value generator that generates a lower-limit value of said suppression coefficient; and a suppression coefficient correction unit that corrects said suppression coefficient based upon said lower-limit value of the suppression coefficient and said signal control information:

wherein said component element information correction unit generates the component element information based upon said inter-signal information, said corrected suppression coefficient, and said analysis control information; and wherein said signal controller controls said first signal or said second signal based upon said corrected component element information and said rendering information.

15. A signal analysis apparatus, comprising a component element information generator that:

receives a first signal, a second signal including objective sound and background sound as a plurality of component elements, and analysis control information including information indicative of a relation between said component elements and said component element and said second signal;

generates component element information indicative of a relation between said component elements based upon said first signal, said second signal, and said analysis control information;

an inter-signal information generator that generates inter-signal information indicative of a relation between said first signal and said second signal based upon said first signal and said second signal; and a suppression coefficient generator that generates a suppression coefficient for suppressing one part of said plurality of component elements based upon said first signal and said second signal, wherein said component element information generator generates said component element information based upon said analysis information, said inter-signal information, and said suppression coefficient.

16. A signal analysis apparatus according to claim 15, wherein said analysis control information includes information indicative of respective classifications of said plurality of component elements.

17. A signal analysis control system, comprising:

a component element information generator that:

receives a first signal, a second signal including objective sound and background sound as a plurality of component elements, and analysis control information including information indicative of a relation between said component elements and said second signal; and generates component element information indicative of a relation between said component elements based upon said first signal, said second signal, and said analysis control information;

an inter-signal information generator that generates inter-signal information indicative of a relation between said first signal and said second signal based upon said first signal and said second signal; and a suppression coefficient generator that generates a suppression coefficient for suppressing one part of said plurality of component elements based upon said first signal and said second signal; and a signal controller that controls said first signal or said second signal based upon said component element information and said analysis control information, wherein said component element information generator generates said component element information based upon said analysis control information, said inter-signal information, and said suppression coefficient.

18. A signal analysis control system according to claim 17, wherein said analysis control information includes information indicative of respective classifications of said plurality of component elements.

19. A non-transitory computer readable storage medium storing a signal control program for causing a computer to execute:

a process of receiving a first signal, a second signal including objective sound and background sound as a plurality of component elements, component element information indicative of a relation between said component elements, and analysis control information including information indicative of a relation between said component element and said second signal;

a suppression coefficient generation process of generating inter-signal information indicative of a relation between said first signal and said second signal, and a suppression coefficient for suppressing one part of said plurality of component elements based upon said component element information and signal control information;

a suppression coefficient correction process of correcting said suppression coefficient based upon said signal control information;

a component element information correction process of correcting the component element information based upon said inter-signal information, said corrected suppression coefficient, and said analysis control information; and a signal control process of controlling said first signal or said second signal based upon said component element information and said analysis control information, wherein said signal control process controls said first signal or said second signal based upon said corrected component element information.

20. A non-transitory computer readable storage medium according to claim 19, wherein said analysis control information includes information indicative of respective classifications of said plurality of component elements.

21. A non-transitory computer readable storage medium according to claim 19, the a signal control program comprising a process of receiving rendering information for outputting said component elements to a plurality of output channels, wherein said signal control process controls said first signal or said second signal based upon said component element information, said analysis control information, and said rendering information.

22. A non-transitory computer readable storage medium according to claim 21, the signal control program comprising:

a process of receiving said signal control information indicative of a relation between said plurality of component elements; and a component element information correction process of correcting said component element information based upon said analysis control information and said signal control information, wherein said signal control process controls said first signal or said second signal based upon said corrected component element information and said rendering information.

23. A non-transitory computer readable storage medium according to claim 22 the signal control program comprising:

a suppression coefficient lower-limit value generation process of generating a lower-limit value of said suppression coefficient;

a suppression coefficient correction process of correcting said suppression coefficient based upon said lower-limit value of the suppression coefficient and said signal control information; and a component element information correction process of correcting the component element information based upon said inter-signal information, said corrected suppression coefficient, and said analysis control information, wherein said signal control process controls said first signal or said second signal based upon said corrected component element information and said rendering information.

24. A non-transitory computer readable storage medium storing a signal analysis program for causing a computer to execute:

a process of receiving a first signal, a second signal including objective sound and background sound as a plurality of component elements, and analysis control information including information indicative of a relation between said component elements and said second signal;

a component element information generation process of generating component element information indicative of a relation between said component elements based upon said first signal, said second signal, and said analysis control information an inter-signal information generation process of generating inter-signal information indicative of a relation between said first signal and said second signal based upon said first signal and said second signal; and a suppression coefficient generation process of generating a suppression coefficient for suppressing one part of said plurality of component elements based upon said first signal and said second signal, wherein said component element information generation process generates said component element information based upon said analysis information, said inter-signal information, and said suppression coefficient.

25. A non-transitory computer readable storage medium according to claim 24, wherein said analysis control information includes information indicative of respective classifications of said plurality of component elements.

26. A non-transitory computer readable storage medium storing a signal analysis control program for causing a computer to execute:

a process of receiving a first signal, a second signal including objective sound and background sound as a plurality of component elements, and analysis control information including information indicative of a relation between said component elements and said second signal;

a component element information generation process of generating component element information indicative of a relation between said component elements based upon said first signal, said second signal, and said analysis control information;

an inter-signal information generation process of generating inter-signal information indicative of a relation between said first signal and said second signal based upon said first signal and said second signal;

a suppression coefficient generation process of generating a suppression coefficient for suppressing one part of said plurality of component elements based upon said first signal and said second signal; and a signal control process of controlling said first signal or said second signal based upon said component element information and said analysis control information, wherein said component element information generation process generates said component element information based upon said analysis information, said inter-signal information, and said suppression coefficient.

27. A non-transitory computer readable storage medium according to claim 26, wherein said analysis control information includes information indicative of respective classifications of said plurality of component elements.

* * * * *